United States Patent [19]
Szkopek et al.

[11] Patent Number: 5,878,221
[45] Date of Patent: Mar. 2, 1999

[54] NETWORK FOR MULTIMEDIA ASYNCHRONOUS TRANSFER MODE DIGITAL SIGNAL TRANSMISSION AND COMPONENTS THEREOF

[75] Inventors: Lech A. Szkopek, Port Moody; Douglas A. Kind, Surrey, both of Canada

[73] Assignee: Xinex Networks Inc., New Westminster, Canada

[21] Appl. No.: 740,783

[22] Filed: Nov. 1, 1996

Related U.S. Application Data

[63] Continuation-in-part of Ser. No. 596,836, Feb. 5, 1996, Pat. No. 5,799,041.
[51] Int. Cl.⁶ ............................. G06F 17/22; H04L 12/16
[52] U.S. Cl. ..................... 395/200.48; 375/359; 370/488
[58] Field of Search ......................... 395/200.61, 210.17, 395/200.57, 200.58, 376, 80.36, 200.48, 820.36, 210.33; 370/342, 461; 455/5.1, 454, 3.3; 340/310.06; 348/388, 387; 324/DIG. 1, DIG. 2; 84/470 K; 375/259

[56] References Cited

U.S. PATENT DOCUMENTS

| | | | |
|---|---|---|---|
| 5,583,561 | 12/1996 | Baker et al. | 348/7 |
| 5,585,583 | 12/1996 | Owen | 84/470 R |

FOREIGN PATENT DOCUMENTS

| | | |
|---|---|---|
| 0222669A2 | 5/1987 | European Pat. Off. . |
| 0596523A2 | 5/1994 | European Pat. Off. . |
| 0596645A1 | 5/1994 | European Pat. Off. . |
| 0596523A3 | 3/1996 | European Pat. Off. . |

OTHER PUBLICATIONS

Ian Crayford, "Fast Ethernet" Alternatives for Client–Server Computing, XP000586595, Jul. 11, 1995, pp. 370–376.

John Grinham and Michael Spratt, IEEE 802.12 Demand Priority and Multimedia, XP000618394, Mar. 11, 1993, pp. 77–88.

*Primary Examiner*—Daniel H. Pan
*Attorney, Agent, or Firm*—Pillsbury Madison & Sutro LLP

[57] ABSTRACT

Apparatus and methods for transmitting digital multi-media signals in asynchronous transfer mode over unshielded twisted pair wiring in a multi-point topology in an improved cost-effective manner. The multi-media digital signals originate from and are received by a plurality of receiving stations connected via twisted pair wiring. The method comprises feeding input digital signals selected from the group consisting of voice, fax, video and data from signal nodes; controlling allocation of bandwidth to the input digital signals as between sending stations; providing a source data stream in binary format derived from allocated input digital signals; converting a source data stream into a digital symbol stream capable of being transmitted over the wiring; driving and filtering the digital symbol stream over the wiring; splitting the filtered digital symbol stream into a plurality of replicated digital symbol streams; amplifying and selecting each of the plurality of replicated digital symbol streams to provide an amplified and selected digital symbol stream; converting the amplified and selected digital symbol stream into a sink data stream in binary format; identifying and selecting desired digital signals of the sink data stream for the plurality of the receiving stations; and delivering the identified and selected digital signals to signal nodes.

71 Claims, 76 Drawing Sheets

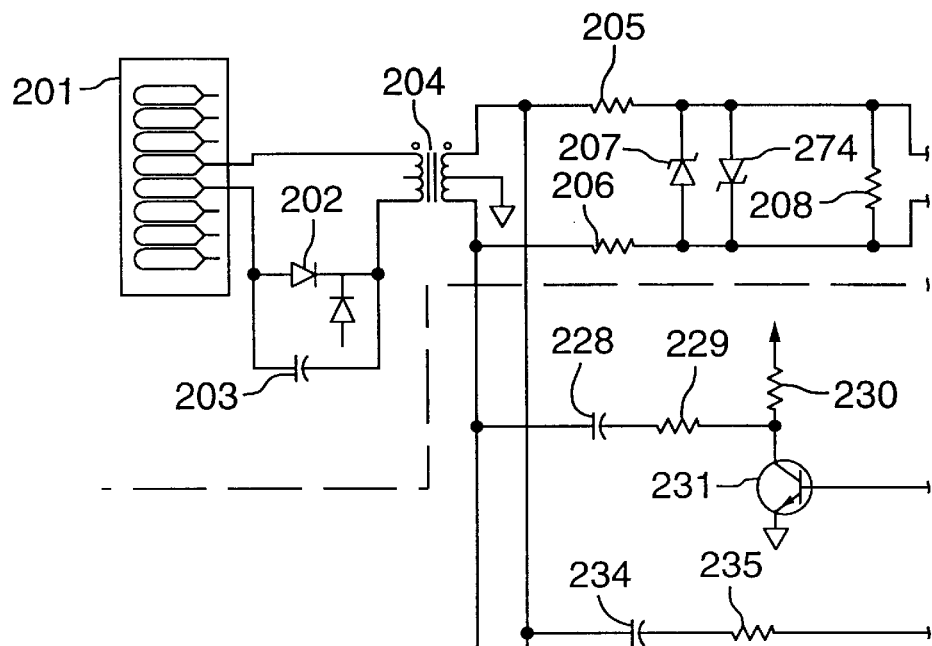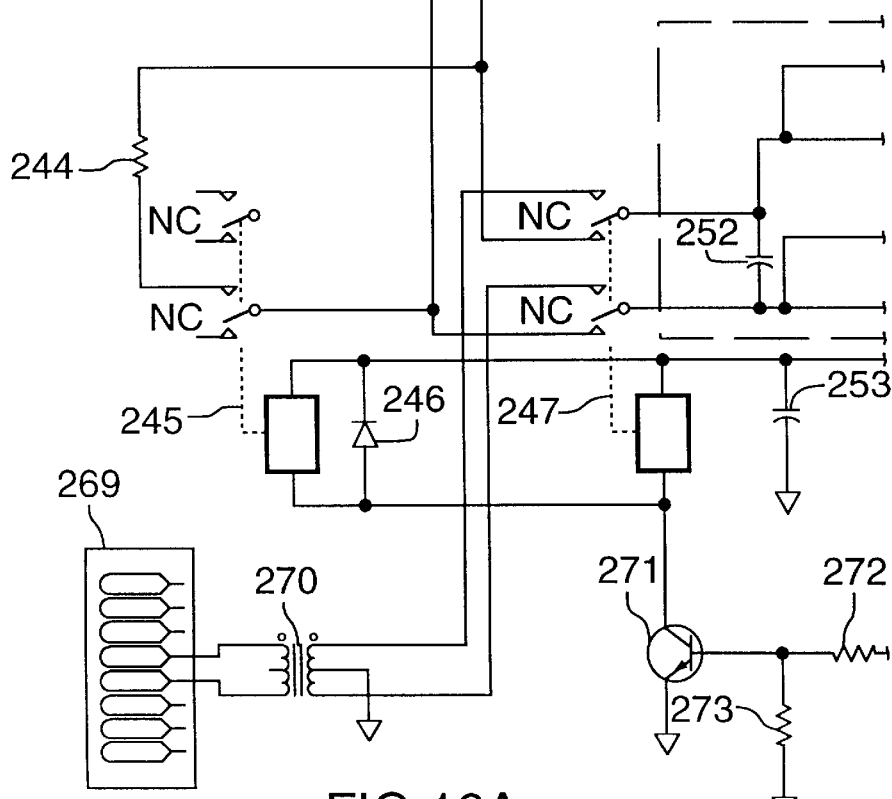
FIG.16A

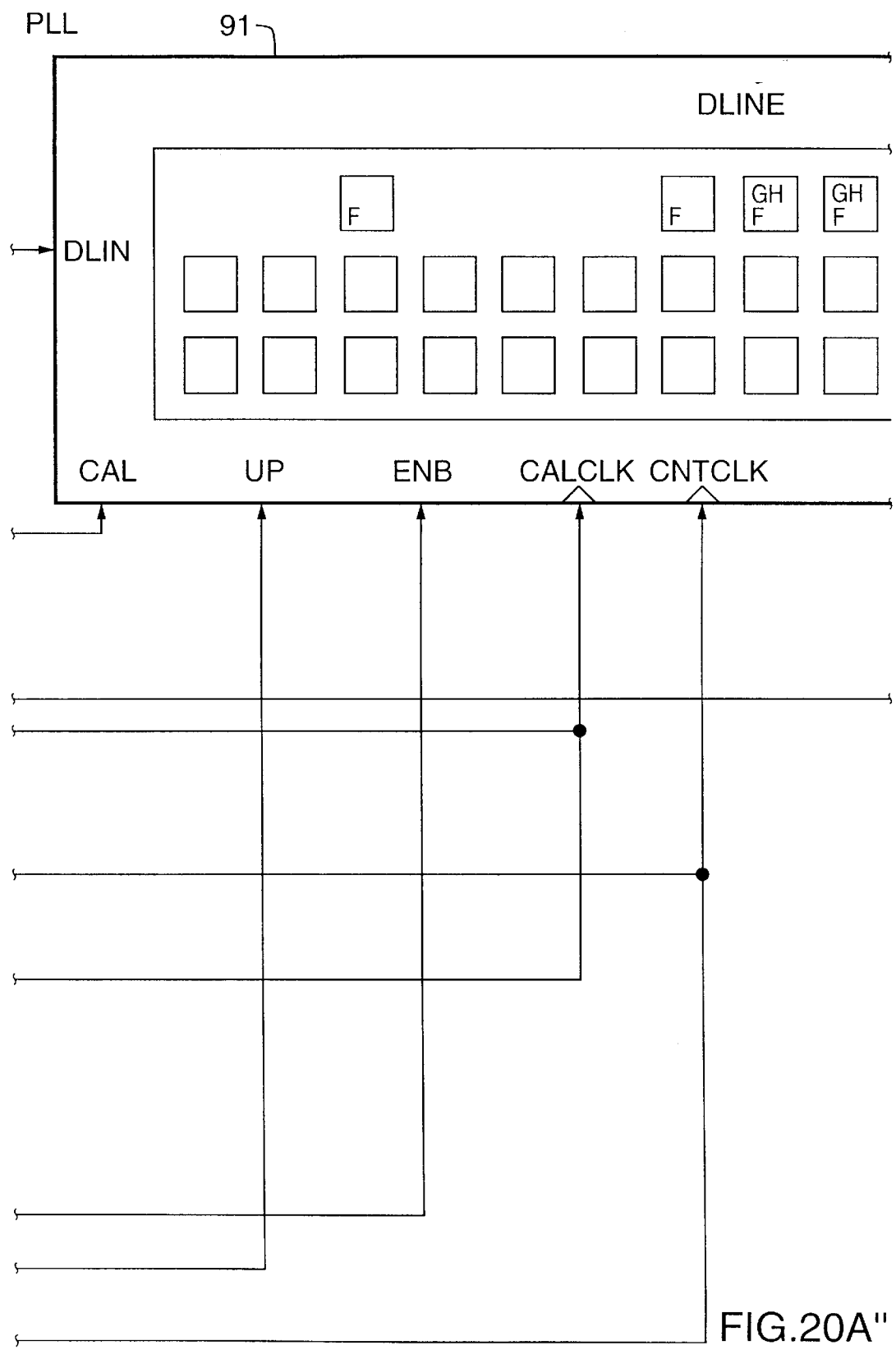
FIG.20A"

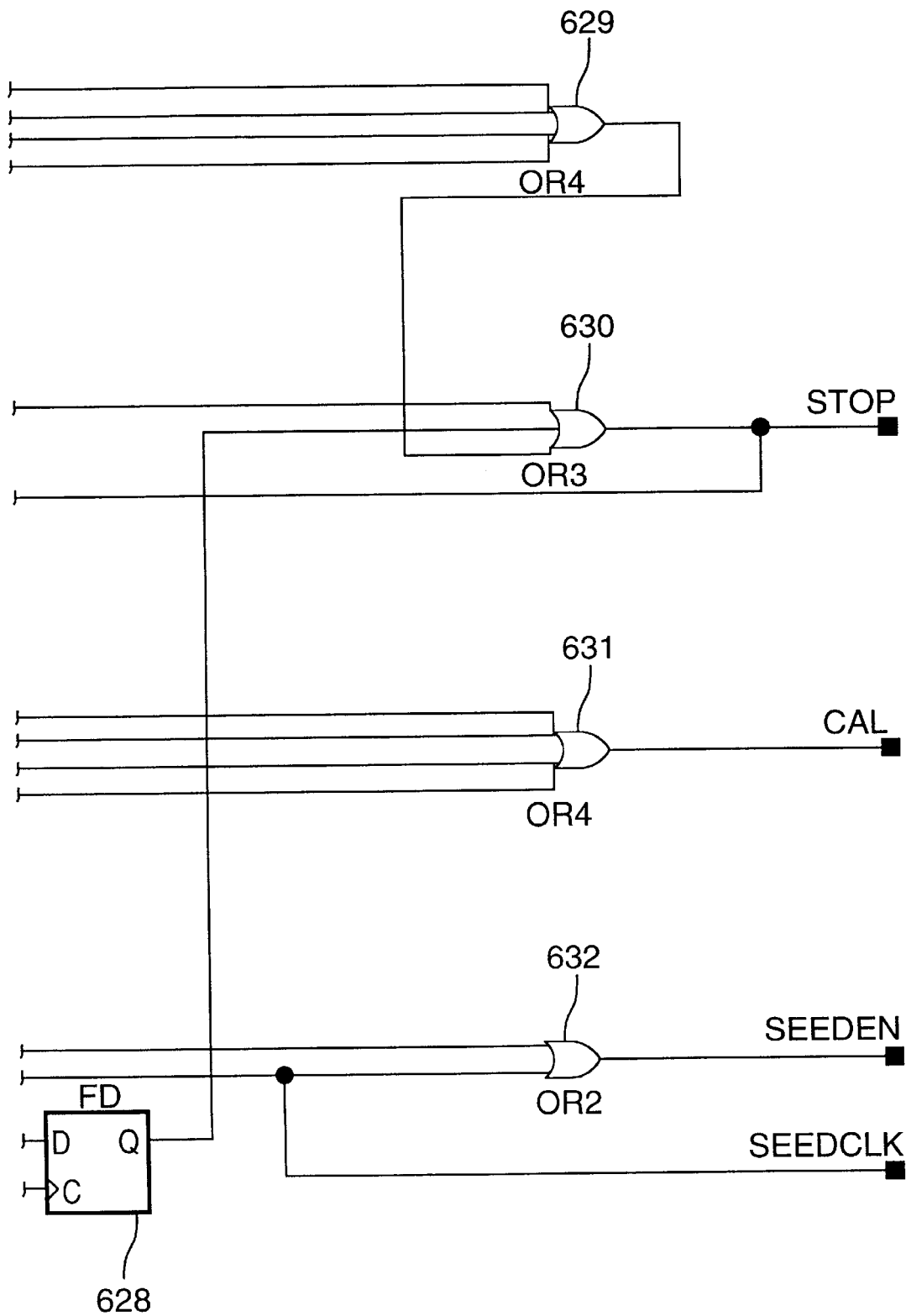
FIG.20C"

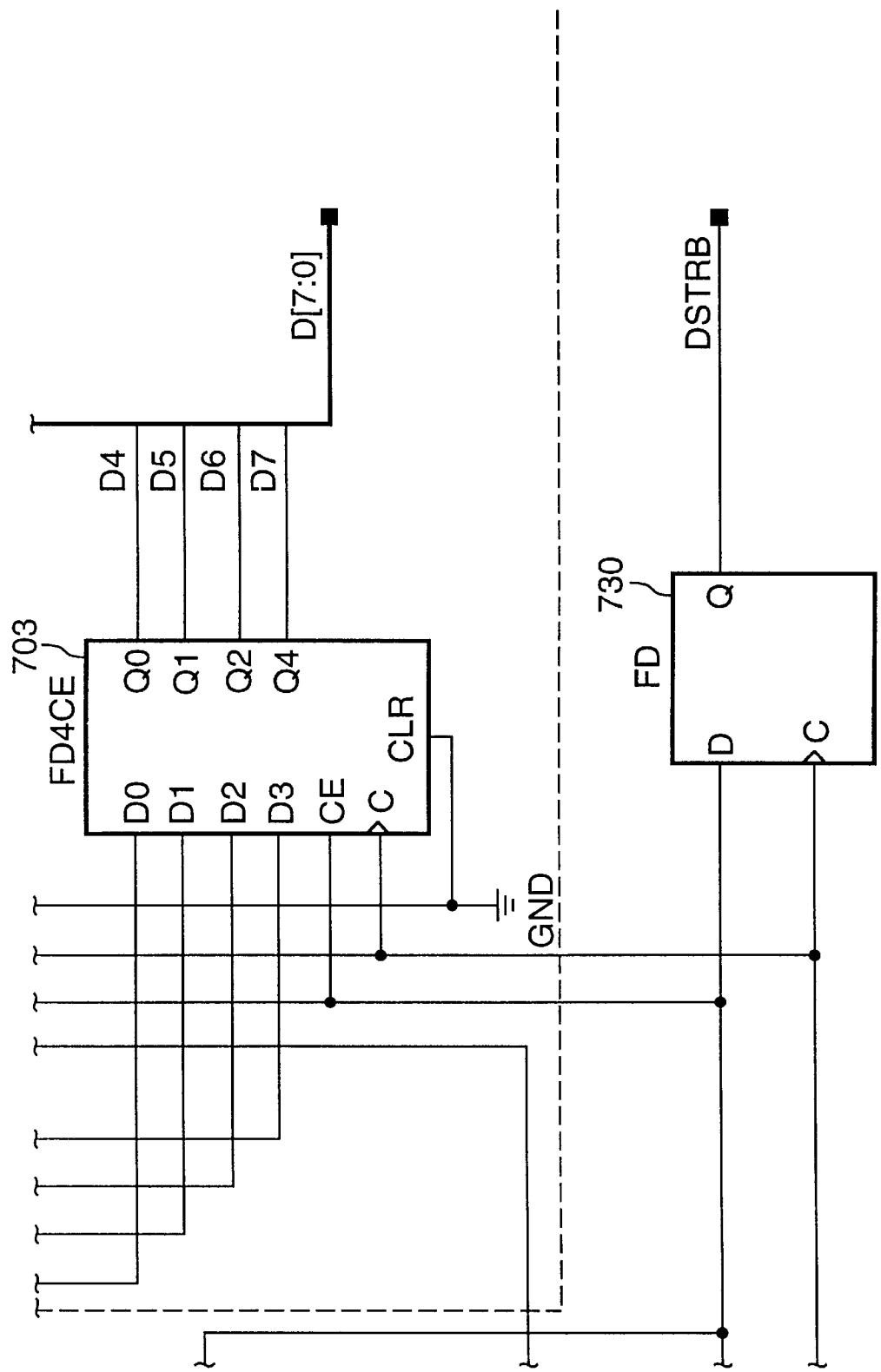
FIG. 21.I

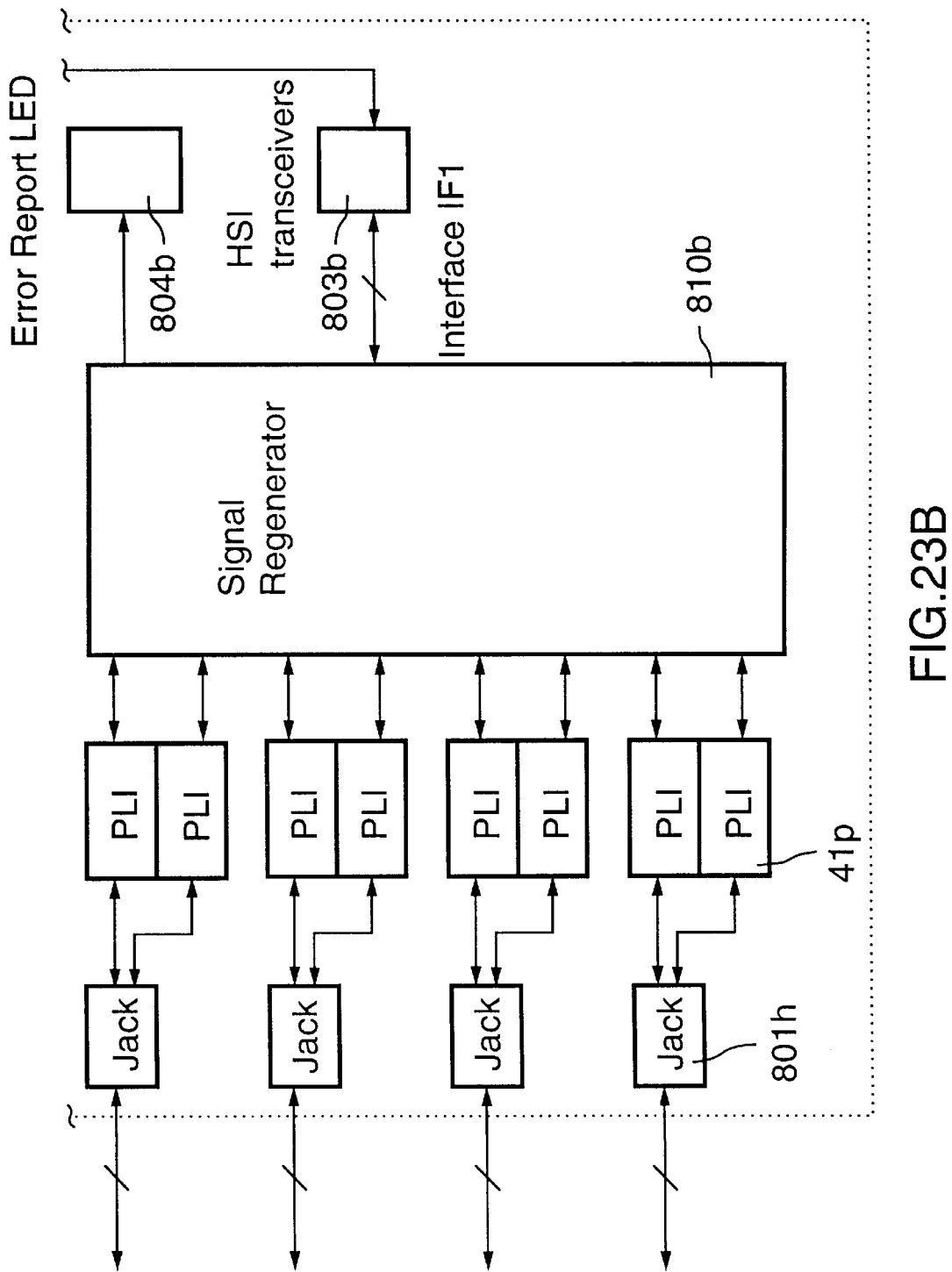

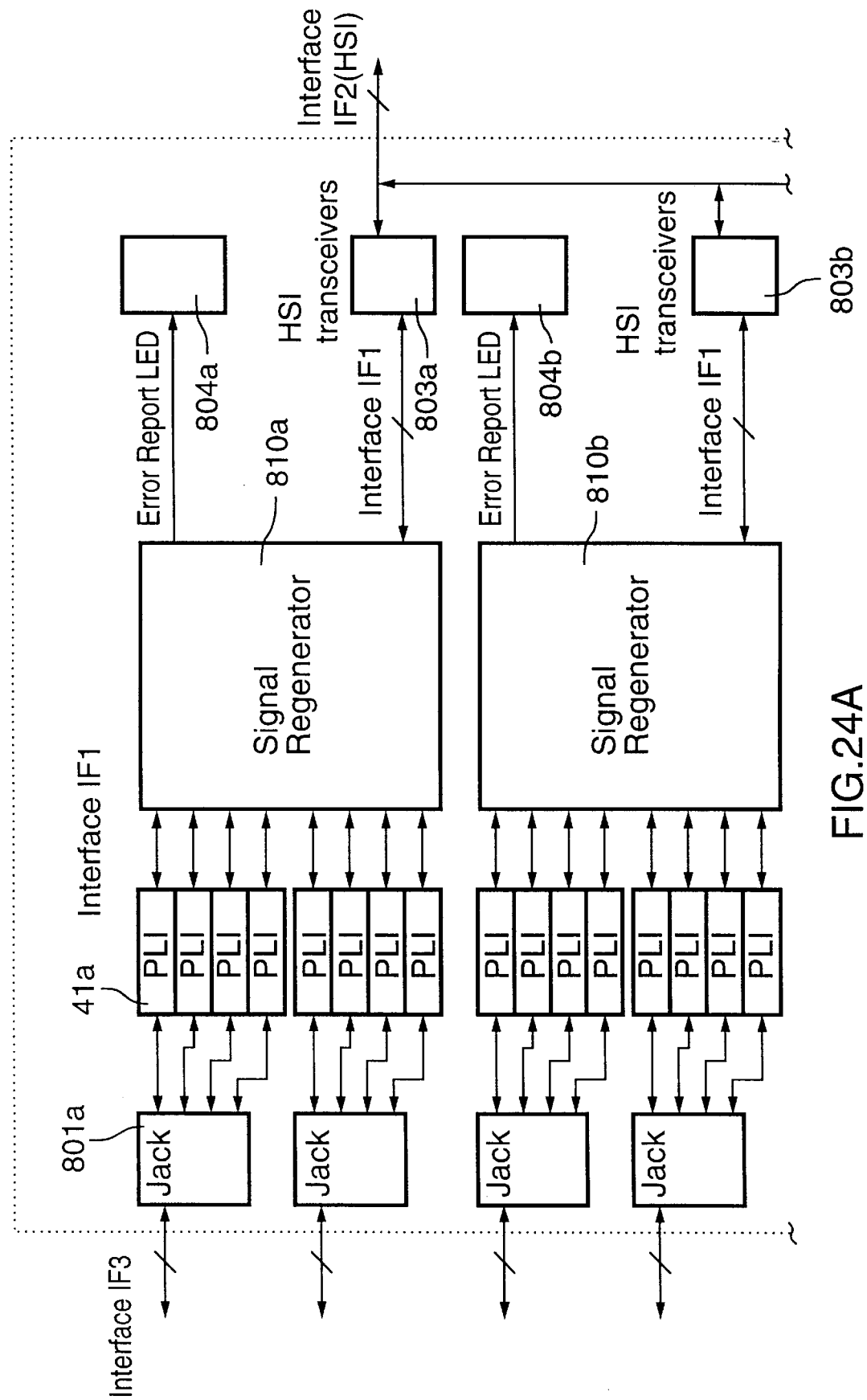

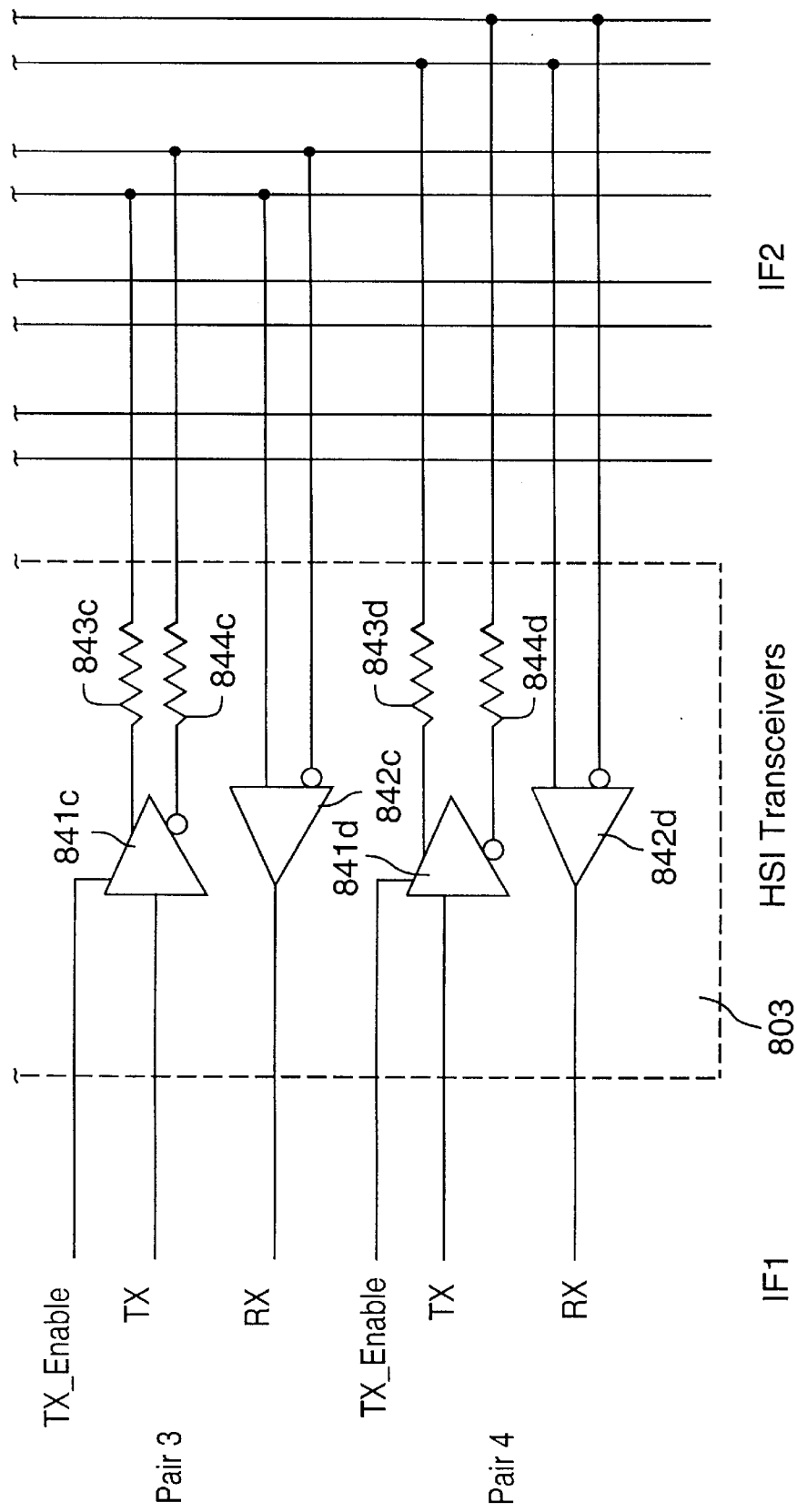

NETWORK FOR MULTIMEDIA ASYNCHRONOUS TRANSFER MODE DIGITAL SIGNAL TRANSMISSION AND COMPONENTS THEREOF

RELATED APPLICATIONS

This is a continuation-in-part application of Ser. No. 08/596,836, filed Feb. 5, 1996 now U.S. Pat. No. 5,799,041.

FIELD OF THE INVENTION

This invention relates to apparatus and methods for transmitting digital multi-media signals in asynchronous transfer mode over unshielded twisted pair wiring in a multi-point topology in an improved cost-effective manner.

BACKGROUND TO THE INVENTION

It is known to transmit multimedia signals, namely, video, voice, fax and data over unshielded twisted pair (UTP) conductor wiring in an asynchronous transfer mode. It is also known to configure UTP conductor in a multi-point topology.

In most modem offices, voice service is provided through a PABX (Private Automatic Branch Exchange), Key System, Centrex, or some combination of the above networks. Regardless of the equipment employed, communication to the desktop is provided over twisted pair wiring and the signal carried by this wiring is becoming increasingly digital in nature. However, the transmission rates used for digital transmission in this context rarely exceed 256 kb/s and although providing excellent voice quality, the technology represented by the PABX plus its distribution wiring is incapable of providing simultaneous data service at speeds greater than 128 kb/s. Accordingly, the traffic carried by the network is essentially at constant bit rate, i.e. isochronous in nature.

High speed data service is generally provided by some form of Local Area Network (LAN) wherein the wiring used for distribution may be coaxial cable or, in rarer cases, fibre optics. The data rates employed on these networks, typically, range from 10 Mb/s to 100 Mb/s. However, although the raw data rates provided by these networks far exceed that required for voice traffic, the networks are, in general, designed to support the "bursty" nature of data communications and are unable to guarantee the constant bit rate (CBR) service required for voice communications and other forms of isochronous traffic.

Video service, if it is available at all, requires both high bandwidth and CBR service and is often provided by a third separate distribution network, such as fibre optics. Some video networks take advantage of the fact that a structured wiring plan requires 4-pair distribution to each information outlet. If this information outlet is serviced by conventional 10BaseT ethernet, then only 2-pairs are required for said ethernet service, leaving a further 2-pairs unused. These unused pairs may be utilized by a video distribution system to create an entirely separate video network.

In summary, provision of each of the three services detailed above usually requires the installation of three separate networks in order to provide the grade of service required by each class of traffic at an economic cost that is acceptable. A number of newer technologies have been developed to meet the need for provision of multimedia services to the desktop. The most significant instances are:

isoEthernet: This technology permits 6 Mb/s of isochronous traffic to be transmitted concurrently with 10 Mb/s of conventional Ethernet traffic. However, the aggregate capacity of 16 Mb/s is modest by modern standards and its ability to adapt to varying mixes of isochronous and asynchronous traffic is limited. Provisioning of larger networks is complex since the demands of each type of traffic may dictate differing (or even incompatible) network topologies.

100VG-AnyLAN: This technology allows for 100 Mb/s traffic capacity over 4-pairs of UTP-3. Although it does permit any mixture of traffic types to be carried, scaleability is limited by the network delay and synchronization requirements.

ATM-25, ATM-155: These transmission systems are based on Asynchronous Transfer Mode technology and provide complete flexibility to build both local and wide area networks and possess sufficient bandwidth to support all known applications. The approaches taken by the aforementioned technologies are summarized in the following table:

TABLE 1

| | Local Area Network Technologies | | | | | | |
|---|---|---|---|---|---|---|---|
| | | Packet Length | | Topology | | Media Access Method | |
| | Isochronous | Fixed | Var'ble | Point-Point | Multi-point | Token | CSMA/CD | TDMA |
| Ethernet | | | ✓ | | ✓ | | ✓ | |
| Fast Ethernet | | | ✓ | | ✓ | | ✓ | |
| Token Ring | | | ✓ | | ✓ | ✓ | | |
| iso-Ethernet | ✓ | | ✓ | | ✓ | | ✓ | ✓ |
| 100VG-AnyLAN | ✓ | | ✓ | | ✓ | ✓ | | |
| ATM-25/155 | ✓ | ✓ | | ✓ | | — | — | — |
| The Invention | ✓ | ✓ | | | ✓ | ✓ | | |

The preceeding table indicates that Ethernet, Fast Ethernet and Token Ring technologies do not provide a capability to transmit isochronous information and are therefore unsuitable for the purpose intended herein. iso-Ethernet provides multi-media service by segregating isochronous and asynchronous traffic, using separate media access methods (Time Division Multiple Access—TDMA; and Carrier Sense Multiple Access with Collision Detection—CSMA/CD) for each traffic type.

100VG-AnyLAN utilizes a token-based system for guaranteeing response time to isochronous traffic, but is not compatible with the ATM Adaptation Layer formats required for national level internetworking. It also requires 4-pair wiring distribution. The various ATM physical layer distribution systems do not provide a multipoint mechanism for the construction of cost-effective Local Area Networks.

In addition to the aforementioned limitations, none of the above technologies provides a cost-effective solution for low data-rate and low-value applications, such as basic telephony. In particular, there are no known systems which are able to support all of the above services concurrently over shared twisted pair wiring at a cost that is comparable to that of state-of-the-art-voice-only systems.

However, there is a need for apparatus and methods which provide all of the aforesaid transmission features in an improved cost effective manner.

SUMMARY OF THE INVENTION

It is an object of the present invention to provide apparatus and method for the multi-media concurrent transmission of voice, data, fax, video and other traffic over a single pair of Category-3 or better UTP wiring.

It is a further object of the present invention to provide apparatus and method in a network which enables the bandwidth of said network to be increased, as a multi-path option, by the provision of additional wire pairs.

It is yet further an object of the present invention to provide apparatus and method which enables multi-rate information transmission at different instantaneous data rates over the same medium.

It is a still yet further object of the present invention to provide apparatus and method for the concurrent transmission of voice, data, fax, video and other traffic over communication media which is utilized by multiple (i.e. >2) end-points, without the requirement for an intermediary switch or control point.

It is a further object of the present invention to provide multi-protocol apparatus and method which enables the protocol used to encode the digital data for transmission to be changed without the need to upgrade or change-out the underlying network distribution hardware.

It is a further object of the present invention to provide cost-effective apparatus and method for the concurrent transmission of voice, data, fax, video and other traffic at an economic cost similar to that of voice alone.

Further objects of the invention provide subsystems and components of use in the apparatus and methods according to the invention.

The present invention relates to the physical distribution of local area digital communication systems. The standard for the wiring plant required to support such systems is established (R-1). The standard adopts a model wherein the telecommunications equipment is installed within a "Telecommunications Closet" which forms the Central Hub of a star-wired distribution network. "Station Equipment" located at the "Work Area" is connected to the Central Hub by means of "Horizontal Cabling". UTP is one of the media types recognized as compliant for use as horizontal cabling.

At the work area, the horizontal cabling is terminated in an "Information Outlet" of standard form. Station equipment such as a workstation, PC, telephone, fax machine and the like, is connected to the information outlet by up to 10 meters of Patch Cables. Each item of station equipment is directly connected by its own patch cord via its own horizontal cable to its own port on the central hub.

Thus, the apparatus of the invention in one aspect provides multi-point asynchronous transfer mode transmission of voice, data, video, fax and control traffic over UTP category 3 wiring to provide inter alia transmission speeds of 12.5, 25 and 50 Mb/s and multi-point access. The protocol stack used in the system of the invention supports the broad bandwidth demands of high performance data or video servers as well as low packet rate implementations for low speed terminals such as telephones and printer adapters at relatively low cost.

In one aspect, the system permits multiple nodes to be connected via a single pair of UTP-3 wire by means of a low cost cable splitter.

The methods and apparatus in one aspect of the invention provides for the regeneration and distribution of digital signals by analog means. In one embodiment, a plurality of multi-media devices are each connected by a single pair of twisted pair wiring to a Line Splitter as hereinafter described. When a digital signal is imposed on the line by any one of the multi-media devices or by a central hub as hereinafter described, the line splitter replicates said signals using analog means, and thereby presents said signal to all of the ports to which it is connected. A Media Access Control (MAC) mechanism is employed to ensure that only one device attempts to transmit a signal at any instant.

It is an aspect of the invention that all forms of traffic are transmitted over the system in fixed length packets wherein a guaranteed quality of service can be provided to certain traffic types. Since it is known that multi-media traffic can be encoded as digital signals and said signals assembled into data packets, the objective of Multi-media transmission is inherent in the capability of the invention to transport said fixed length packets with quality of service guarantees.

Multi-rate transmission is achieved in the invention at the physical layer by treating all digital waveforms as a set of analog waveforms possessing a particular frequency spectrum. Provided that the analog circuitry possesses sufficient bandwidth and frequency linearity to regenerate the applied digital input signal, the mechanism and apparatus is insensitive to the digital symbol rate (Baud rate) of said signal. In a preferred embodiment, the baud rate chosen is in excess of 30 MHz. The transmitted signal restricts the bulk of its spectrum to below 16 MHz in order to operate over Category-3 wiring. It will be apparent to those skilled in the art that these values are not limiting and that other baud rate and spectrum bandwidth values are possible.

In another embodiment of the invention, circuitry can be replicated a plurality of times, with each multi-media device being connected to a plurality of ports provided by a plurality of splitters. By this means, a plurality of independent paths may be established between individual devices, thereby increasing the connectivity available between said devices.

It is an aspect of the invention that analog methods are utilized at the physical layer to regenerate digital signals. This aspect of the invention presents several advantages over the prior art. First, the regeneration is insensitive to the digital symbol rate (Baud rate) of the input data stream. Second, the regeneration is insensitive to the encoding scheme used to represent digital information as digital symbols. The invention thereby provides multi-rate and multi-protocol data carriage by analog means, thereby eliminating the costly and complicated protocol conversion hardware required by earlier systems.

Thus, the invention provides in one aspect a method of transmitting multimedia digital signals originating from and being received by a plurality of signal nodes over a network having a plurality of transceiver stations, comprising a first plurality of sending stations and a second plurality of receiving stations connected via twisted pair wiring, the method comprising:

a) feeding input digital signals selected from the group consisting of voice, fax, video and data from the signal nodes;

b) controlling allocation of bandwidth to the input digital signals as between the sending stations;

c) providing a source data stream in binary format derived from the allocated input digital signals;

d) converting the source data stream into a digital symbol stream capable of being transmitted over the wiring;

e) driving and filtering the digital symbol stream over the wiring;

f) splitting the filtered digital symbol stream into a plurality of replicated digital symbol streams;

g) amplifying and selecting each of the plurality of replicated digital symbol streams to provide an amplified and selected digital symbol stream;

h) converting the amplified and selected digital symbol stream into a sink data stream in binary format;

i) identifying and selecting desired digital signals of the sink data stream for the plurality of the receiving stations; and j) delivering the identified and selected digital signals to the signal nodes.

Preferably, the signals are transmitted in Asychronous Transfer Mode (ATM).

The method may further comprise subjecting one or more of the replicated digital symbol streams to a further replication process as defined by step (f). Step (f) maybe repeated a finite number of times as would be understood to those skilled in the art. A maximum practical value of repetitions is 7.

Preferably, the methods as hereinbefore defined provide the splitting the filtered digital symbol stream into a plurality of replicated digital symbol streams of step (f) comprising:

feeding a first input digital signal at a selected first voltage and power to an amplifier;

amplifying the first input digital signal to a second voltage and power;

splitting the amplified digital signal to provide the plurality of replicated digital symbol streams at a third voltage and power; and feeding each of the replicated digital symbol streams to an output line.

In one aspect, each of the replicated digital symbol streams has substantially the same output voltage and power; and the first voltage and power is substantially the same as third voltage and power.

Further, each of the filtered and the replicated digital symbol streams may be conducted along coaxial cable, or unshielded twisted pair wiring.

In one embodiment, the amplification is effected by feeding the input signals at a selected voltage to an amplifier and feedback resistor, the feedback resistor having a preset resistance value substantially equal to the combined parallel resistance of the input and the output lines carrying the input and output signals, respectively. The amplification may be effected by feeding the input signals at a selected voltage to an amplifier and feedback resistor, the feedback resistor having a preset resistance value of about 20% greater than the combined parallel resistance of the input and the output lines carrying the input and output signals, respectively, the value of resistor providing protection from unstable operation under failure conditions.

In one embodiment, the splitting the filtered digital symbol stream into a plurality of replicated digital symbol streams of step (f) comprises:

a) feeding the input digital signal at the selected voltage and power to the primary coil of a transformer;

b) providing the transformer with a secondary coil possessing a centre-tap;

c) feeding the signal derived from each half of the secondary coil to an output transformer; and d) feeding an output digital signal derived from each of the output transformers to an output line.

Further embodiments may comprise repeating the method as hereinabove defined to further split the output digital signals comprising:

a) feeding the output digital signal at a selected second voltage and power to the primary coil of a second transformer having a secondary coil possessing a centre-tap;

b) feeding the signal derived from each half of the secondary coil to an output transformer; and c) feeding an output digital signal derived from each of the output transformers to an output line.

In one embodiment, each of the digital, the filtered and the replicated digital symbol streams of steps (e), (f) and (g), respectively, is transmitted at high symbol rate and wherein the transceiver stations share a common bandwidth, can receive a wide dynamic range of signal amplitudes, and can transmit and receive a wide range of signal bandwidths. Noise signals received by each of the transceiver stations may be squelched. The digital signals may be composed of packets of different symbol rates and compensated for variations in received packet amplitudes.

The methods as hereinbefore defined may further comprise the support of full duplex transmission.

The conversion of the source data stream into the digital symbol stream capable of being transmitted over the wiring of step (d), in one embodiment comprises:

a) synchronizing the symbol stream to a clock source;

b) encoding the data stream according to a pre-selected algorithm; and c) looping back the symbol stream for diagnostic purposes.

In a further embodiment the conversion of the amplified and selected symbol stream received over twisted pair wiring into a sink data stream in binary format of step (m), comprises:

detecting presence of activity in the symbol stream;

generating a clock rate from the symbol stream;

aligning sampling frequency and phase with the symbol stream; and decoding the symbol stream into a binary format according to a predefined algorithm.

In yet a further embodiment, the conversion of the source data stream into a digital symbol stream capable of being transmitted over the wiring of step (d) and the conversion of the digital symbol stream received over twisted pair wiring into a sink data stream in binary format of step (h), comprises:

synchronizing the symbol stream to a clock source;

encoding the data stream according to a pre-selected algorithm;

looping back the symbol stream for diagnostic purposes;

detecting presence of activity in the symbol stream;

recovering and regenerating a clock rate from the symbol stream;

aligning sampling frequency and phase with the symbol stream; and decoding the symbol stream into a binary format according to a pre-defined algorithm.

The symbol streams may comprise data packets originating from a plurality of data sending stations and have distinct symbol rates. The encoding and decoding may be effected with a plurality of the encoding and decoding algorithms.

One method of the invention may comprise digitally aligning sampling frequency and phase.

In a further embodiment, the splitting of the filtered digital symbol stream into a plurality of replicated digital symbol streams of step (f) comprises:

a) amplifying and selecting the filtered digital symbol stream to provide an amplified digital symbol stream;

b) regenerating the amplified digital symbol stream to provide a regenerated digital symbol stream;

c) splitting the regenerated symbol stream into a plurality of replicated digital symbol streams; and d) driving and filtering the replicated digital symbol stream over the wiring.

The regenerating of the amplified digital symbol stream of step (b) may comprise:

recovering a clock signal from the digital symbol stream;

sampling the data stream to acquire the original data content; and generating a digital symbol stream from the original data content; and may further comprise regenerating a plurality of digital symbol streams from a plurality of sending stations.

The transceiver stations may be arranged into a plurality of logical transceiver groups, preferably selected from 1 through 16. The plurality of replicated digital symbol streams may be an integer selected from 1 through 16.

The methods as hereinabove defined may further comprise applying arbitration to limit the number of the replicated digital symbol streams regenerated simultaneously; may further comprise providing a minimum guaranteed bandwidth and a maximum guaranteed response time to each of the sending stations; may further comprise detecting the addition or removal from the network of the sending and the receiving stations; yet further comprise negotiating the provision of additional guaranteed bandwidth to the sending stations; and may further comprise allocating unreserved bandwidth to the sending stations.

In a further aspect, the invention provides a network for transmitting multimedia digital signals originating from and being received by a plurality of signal nodes, the network having a plurality of transceiver means, comprising a first plurality of sending means and a second plurality of receiving means connected via twisted pair wiring, the network comprising:

a) circuitry constructed and adapted to feed input signals selected from the group consisting of voice, fax, video and data from the sending stations along the wiring;

b) circuitry constructed and adapted to control allocation of bandwidth to the digital signals as between the sending stations;

c) circuitry constructed and adapted to provide a source data stream in binary format derived from the allocated input digital signals;

d) circuitry constructed and adapted to convert the source data stream into a digital symbol stream capable of being transmitted over the wiring;

e) circuitry constructed and adapted to drive and filter the digital symbol stream over the wiring;

f) circuitry constructed and adapted to split the filtered digital symbol stream into a plurality of replicated digital symbol streams;

g) circuitry constructed and adapted to amplify and select each of the plurality of replicated digital symbol streams to provide an amplified and selected digital symbol stream;

h) circuitry constructed and adapted to convert the amplified and selected digital symbol stream into a sink data stream in binary format;

i) circuitry constructed and adapted to identify and select desired digital signals of the sink data stream for the plurality of the receiving stations; and j) circuitry constructed and adapted to deliver the identified and selected digital signals to the signal nodes.

A network as hereinabove defined further comprising circuitry constructed and adapted for subjecting one or more of the replicated digital symbol streams to a further replication process as defined by step (f).

The networks may further comprise circuitry constructed and adapted the repetition of step (f) a finite number of times. A practical maximum value for the number of repetitions is 7.

The network may comprise circuitry constructed and adapted to feed the replicated digital symbol stream directly to the circuitry (f).

The invention further provides a network as hereinabove defined wherein the circuitry (f) for splitting the filtered digital symbol stream into a plurality of replicated digital symbol streams comprises:

circuitry constructed and adapted to feed a first digital input signal at a selected first voltage and power to an amplifier;

circuitry constructed and adapted to amplify the first input digital signal to a second voltage;

circuitry constructed and adapted to split the amplified digital signal to provide the plurality of split output replicated digital signal streams at a third voltage and power; and circuitry constructed and adapted to feed each of the replicated digital symbol streams to an output line.

The network in one embodiment comprises circuitry constructed and adapted to provide each of the split output digital signal streams with substantially the same output voltage and power, comprising circuitry constructed and adapted to provide the first voltage and power to be substantially the same as the third voltage and power.

The network may comprise circuitry constructed and adapted to conduct each of the filtered and the replicated digital signals along coaxial cable and or unshielded twisted pair wiring.

The amplification circuitry (b) may be effected by circuitry constructed and adapted to feed the input signal at a selected first voltage to an amplifier and feedback resistor, the feedback resistor having a preset resistance value substantially equal to the combined parallel resistance of the input and the output lines, preferably the feedback resistor has a preset resistance value of about 20% greater than the combined parallel impedance of the input and the output lines, the value of resistor providing protection from unstable operation under failure conditions.

The circuitry (f) for splitting the filtered digital symbol stream into a plurality of replicated digital symbol streams may comprise:

- circuitry constructed and adapted to feed the input digital signal at the selected first voltage and power to the primary coil of a transformer;
- circuitry constructed and adapted to provide the transformer with a secondary coil possessing a centre-tap;
- circuitry constructed and adapted to feed the signal derived from each half of the secondary coil to an output transformer; and
- circuitry constructed and adapted to feed an output digital signal derived from each of the output transformers to an output line.

The network may further comprise repeating the circuitry as hereinbefore defined to further split the output digital signals comprising:

- circuitry constructed and adapted to feed the output digital signal at a selected second voltage and power to the primary coil of a second transformer having a secondary coil possessing a centre-tap;
- circuitry constructed and adapted to feed the signal derived from each half of the secondary coil to an output transformer; and
- circuitry constructed and adapted to feed an output digital signal derived from each of the output transformers to an output line.

The network preferably comprises circuitry for transmitting each of the digital, the filtered and the replicated digital symbol streams at high symbol rate and wherein the transceiver station circuitry share a common bandwidth, wherein each transceiver station circuitry can receive a wide dynamic range of signal amplitude a wide range of signal bandwidths and further comprising circuitry for squelching of noise signals received by each of transceiver station circuitry.

The network may comprise further circuitry for providing the digital signals composed of packets of different symbol rates, circuitry for compensating for variations in received packet amplitudes and circuitry for the support of full duplex transmission.

The circuitry (d) for converting the source data stream into a digital symbol stream capable of being transmitted over the wiring, preferably comprises:

- circuitry constructed and adapted to synchronize symbol stream to clock source;
- circuitry constructed and adapted to encode the data stream according to a pre-selected algorithm; and
- circuitry constructed and adapted to loop back the symbol stream for diagnostic purposes.

Further, the circuitry (m) for converting amplified and selected said digital symbol stream received over twisted pair wiring into a sink data stream in binary format, may comprise:

- circuitry constructed and adapted to detect presence of activity in the symbol stream;
- circuitry constructed and adapted to generate a clock rate from the symbol stream;
- circuitry constructed and adapted to align sampling frequency and phase with the symbol stream; and
- circuitry constructed and adapted to decode the symbol stream into a binary format according to a pre-defined algorithm.

The circuitry (d) for converting the source data stream into a digital symbol stream capable of being transmitted over the wiring and circuitry (h) for converting the digital symbol stream received over twisted pair wiring into a sink data stream in binary format, may comprise:

- circuitry constructed and adapted to synchronize the symbol stream to clock source;
- circuitry constructed and adapted to encode the data stream according to a pre-selected algorithm;
- circuitry constructed and adapted to loop back the symbol stream for diagnostic purposes;
- circuitry constructed and adapted to detect presence of activity in the symbol stream;
- circuitry constructed and adapted to generate a clock rate from the symbol stream;
- circuitry constructed and adapted to align sampling frequency and phase with the symbol stream; and
- circuitry constructed and adapted to decode the symbol stream into a binary format according to a pre-defined algorithm.

Circuitry (f) may comprise:

(i) circuitry constructed and adapted to amplify and select the plurality of replicated digital symbol streams to provide a first amplified and selected digital symbol stream;

(ii) circuitry constructed and adapted to regenerate one of the first amplified and selected digital symbol streams to provide an enhanced replicated digital symbol stream to extend transmission wiring distance;

(iii) circuitry constructed and adapted to split the enhanced replicated digital symbol stream into a plurality of replicated enhanced replicated digital symbol streams;

(iv) circuitry constructed and adapted to drive and filter the enhanced replicated digital symbol stream over the wiring.

Preferably, circuitry (ii) comprises:

- circuitry constructed and adapted to recover a clock signal from the digital symbol stream;
- circuitry constructed and adapted to sample the data stream to acquire the original data content; and
- circuitry constructed and adapted to generate a digital symbol stream from the original data content.

A method of converting a source data stream into a digital symbol stream for transmission over twisted pair wiring comprises:

- synchronizing the symbol stream to clock source;
- encoding the data stream according to a pre-selected algorithm; and
- looping back the symbol stream for diagnostic purposes.

The invention in a further aspect provides a method of converting a digital symbol stream received over the twisted pair wiring into a sink data stream in binary format comprising:

- detecting presence of activity in the symbol stream;
- generating a clock rate from the symbol stream;
- aligning sampling frequency and phase with the symbol stream; and
- decoding the symbol stream into a binary format according to a predefined algorithm.

In a further aspect the invention provides circuitry for converting a source data stream into a digital symbol stream capable of being transmitted over the wiring, comprising:

- circuitry constructed and adapted to synchronize the symbol stream to clock source;
- circuitry constructed and adapted to encode the data stream according to a pre-selected algorithm; and circuitry constructed and adapted to loop back the symbol stream for diagnostic purposes.

In a yet further aspect, the invention provides circuitry for converting a digital symbol stream received over twisted pair wiring into a sink data stream in binary format, comprising:

circuitry constructed and adapted to detect the presence of activity in the symbol stream;

circuitry constructed and adapted to generate a clock rate from the symbol stream;

circuitry constructed and adapted to align sampling frequency and phase with the symbol stream; and circuitry constructed and adapted to decode the symbol stream into a binary format according to a pre-defined algorithm.

In a further aspect the invention provides a method of splitting a digital symbol stream into a plurality of output replicated digital symbol streams comprising;

feeding a first digital input signal at a selected first voltage and power to an amplifier;

amplifying the first input digital signal to a second voltage; and splitting the amplified digital signal to provide the plurality of split output replicated digital signal streams at a third voltage and power.

In a further aspect the invention provides a method of splitting a digital symbol stream originating from a member of a first plurality of transceiver stations connected via twisted pair wiring into a plurality of replicated digital symbol streams and providing the replicated digital symbol streams to a second plurality of transceiver stations, the method comprising;

separating AC and DC signals present at a port and protecting from excessive or reversed voltages;

generating a regulated DC supply voltage from the DC signal;

amplifying the AC signal using positive feedback in a single port amplifier;

distributing the amplified AC signal to a plurality of input/output ports;

matching the impedance of the input/output ports to that of the attached twisted pair wiring; and maintaining correct termination of each port when stations are disconnected from the twisted pair wiring.

In a further aspect the invention provides circuitry for splitting a digital symbol stream into a plurality of replicated digital symbol output streams comprises;

circuitry constructed and adapted to feed a first digital input signal at a selected first voltage and power to an amplifier;

circuitry constructed and adapted to amplify the first input digital signal to a second voltage; and circuitry constructed and adapted to split the amplified digital signal to provide the plurality of split output replicated digital signal streams at a third voltage and power.

In a further feature the invention provides a method of regenerating a digital symbol stream to extend transmission wiring distance, comprising;

recovering a clock signal from the digital symbol stream;

sampling the data stream to acquire the original data content; an generating a digital symbol stream from the original data content.

In a further aspect the invention provides a method of regenerating a digital symbol stream present at any one of a plurality of input/output ports and distributing the regenerated digital symbol stream to a plurality of input/output ports, the method comprising;

recovering a clock signal from the digital symbol stream;

sampling the digital symbol stream to acquire the original data content; and generating a regenerated digital symbol stream from said original data content.

The invention also provides a signal regenerator for regenerating a digital symbol system to extend transmission wiring distance comprising;

circuitry constructed and adapted to recover a clock signal from a digital symbol stream;

circuitry constructed and adapted to sample the data stream to acquire the original data content; and circuitry constructed and adapted to generate a digital symbol stream from the original data content.

Also provided is a method of driving and filtering a digital symbol stream for transmission over twisted pair wiring, the method comprising;

providing power amplification of the digital symbol stream;

limiting the bandwidth of the transmitted signal; and selecting the number of wire-pairs used for transmission.

In yet a further aspect the invention provides a method of amplifying and selecting a digital symbol stream being received over twisted pair wiring, the method comprising;

providing correct termination of the transmission system;

amplifying the digital symbol stream with equalization of frequency-dependent attenuation;

detecting the amplified digital symbol stream in the presence of noise; and regenerating a clock frequency from the amplified digital symbol stream..

BRIEF DESCRIPTION OF THE DRAWINGS

In order that the invention may be better understood, preferred embodiments will now be described by way of example only with reference to the accompanying drawings wherein.

DETAILED DESCRIPTION OF PREFERRED EMBODIMENTS

Figure 1:
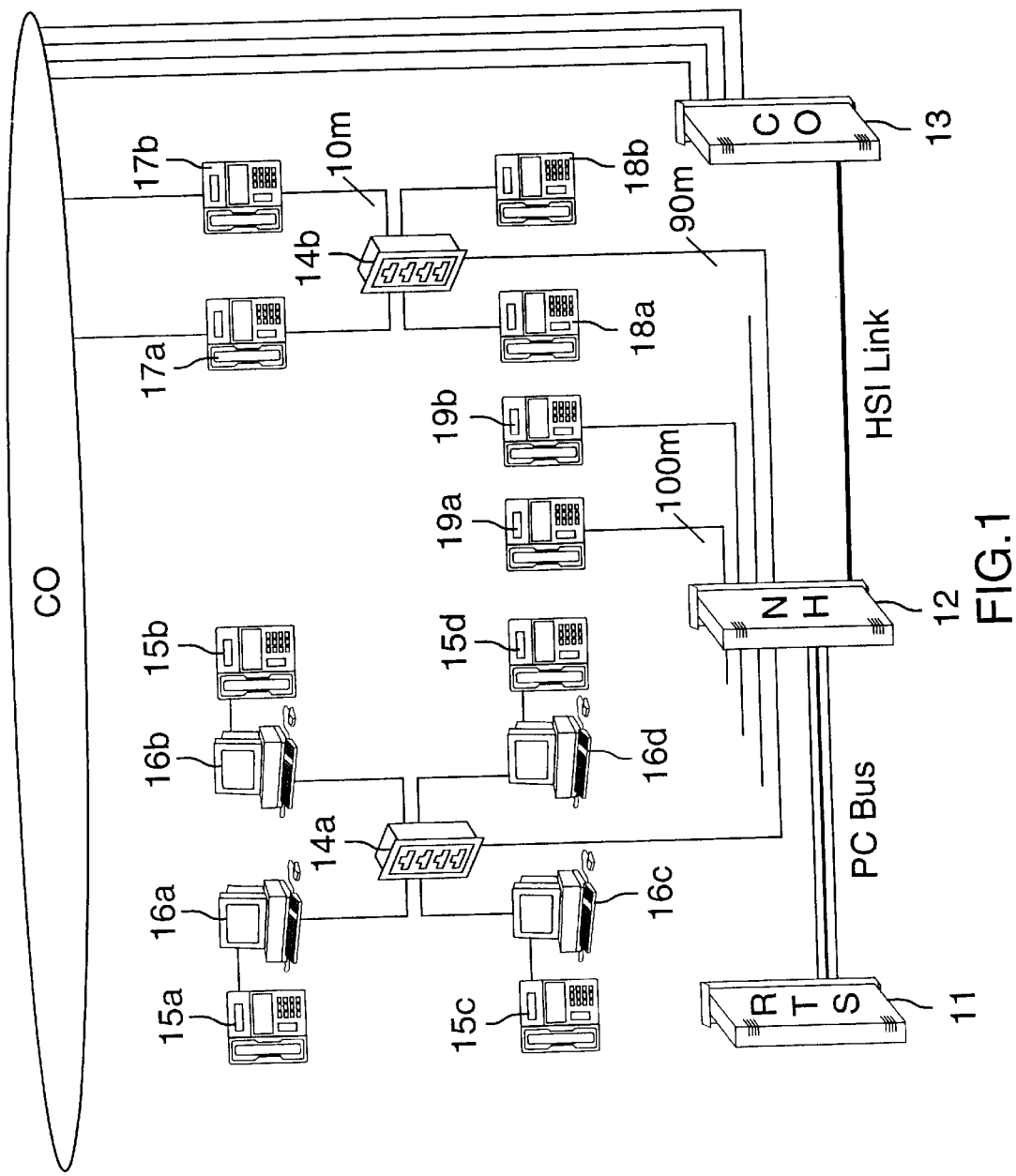
FIG. 1 is a diagrammatic representation of a network according to the invention.

Networks and components thereof are now described in detail with reference to the drawings as follows.

FIG. 1

This diagram presents a simple illustration of one of the many possible communication system configurations that can be constructed from the apparatus of the current invention. This figure is not intended to be representative of any realistic commercial package, but rather serves to describe the method by which such systems can be constructed.

Network Hub 12 forms the nucleus of the system from the point of view of physical wiring distribution. Each desktop device supported by the system is connected to unit 12, either directly or indirectly, via one of the eight UTP wiring runs supported by the hub.

Telephones 19a and 19b are directly connected to hub 12 by up to 90 m of UTP-3 wiring. Telephones 17a, 17b, 18a and 18b are connected to passive splitter 14b by up to 10 m of UTP-3 wiring. Splitter 14b is in turn connected to hub 12 by up to 90 m of UTP-3 wiring. The use of splitters enables the connectivity of the system to be increased by a factor of 4 and provides a convenient method for connecting several devices located in close proximity to one another. The appearance to the network of every telephone is identical, each device occurring as an independent source or destination of information packets.

Splitter 14a illustrates a third method of connection. Here a splitter is again used to permit four desktop devices to be connected to a single wiring run. In this case, the devices 16a–d are PC's equipped with Network Interface Cards. Each NIC is in turn equipped with its own expansion port which permits a single external device to share the network connection provided to the PC. In the diagram, each PC is shown as supporting an external telephone 15a–d by taking advantage of the NIC expansion port capability. Thus in this case, each wiring run can support eight devices in total.

In summary, each Network Hub can support eight wiring runs. If telephones are directly connected to each run, then a maximum of eight telephones can be supported by each hub. If splitters are used on each run, then a maximum of 8 splitters and 32 telephones can be supported. If splitters are used on each run, and each desktop run is connected to a PC, then a maximum of 8 splitters, 32 PC's and 32 telephones can be supported. Any combination of configurations which conforms to the above maxima can also be supported.

It must be remembered, however, that all of the devices so connected share access to a common communication medium of finite bandwidth. (In one particular embodiment of the invention said bandwidth is set at 25 Mb/s.) Although connection of 32 PC's to a single hub is physically supported, performance is likely to be inadequate for high traffic users. Higher bandwidth configurations which address this problem are discussed later.

Turning now to external connectivity, there are two methods by which Central Office (CO) lines may be brought into the system. The first method is to bring one or more CO-lines into individual telephone sets. This arrangement is illustrated by telephones 17a and 17b. Under normal operation, there is no logical connection between telephone 17a and the CO-line that it terminates. The telephone set merely provides a convenient physical resource in which to house the CO interface. Any other telephone may gain access to this CO-line, and telephone 17a is no more likely to use this line than is any other set.

Both analog CLASS and ISDN-U interfaces can be supported in this manner.

Under power failure or network isolation conditions, however, a special relationship between telephone set 17a and the CO-line that it houses does exist. The analog CO-line and the telephone handset are equipped with power-fail POTS capability. In this situation, the CO-line is under the exclusive control of its host telephone and both incoming and outgoing calls may continue to be handled under power failure conditions.

The second method of terminating CO-lines is with a dedicated CO-Interface Hub 13. Multiple CO-line interfaces are enclosed within a single physical unit. The hub converts each CO signal to 64 kb/s PCM, encapsulates the media stream in 48-byte packets and inserts the resultant data onto the common HSI (Hub Serial Interface) link. This link runs between all hubs that are co-located, and operates at the same data rate as the UTP wiring runs driven from the Network Hub. The HSI link is, in fact, just a different physical extension of the same local area network supported by the Network Hub 12. Any packet written to the HSI link is visible to every desktop device on the network, and vice-versa.

The final module shown in the above diagram is Real Time Server 11. This module has two main functions. Firstly, it provides microprocessor resources for the operation, administration and maintenance of the system. It is equipped typically with a x86 family microprocessor and at least 512 kbyte Flash and 256 kbyte RAM. The second function performed by the Real Time Server is to serve as the master for the Media Access Control layer of the shared-media protocol. In this role, the hub provides clock synchronization to the network and manages the poll/response access to the common transmission media.

Figure 2:
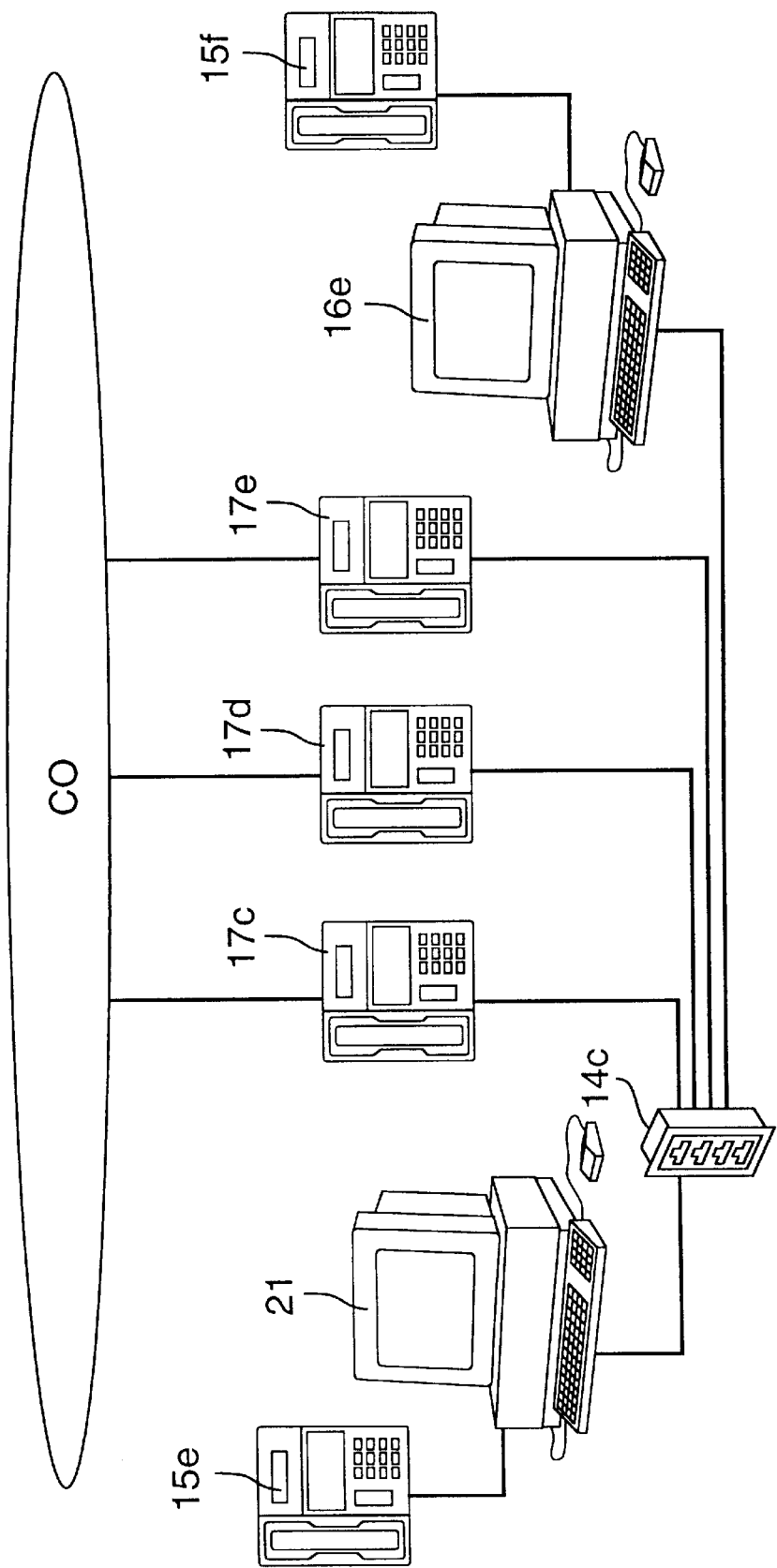
FIG. 2 is a diagrammatic representation of a network according to the invention for use in a small business or home office.

FIG. 2 illustrates a multimedia communication system optimized for a SOHO application. Since the requirements for the maximum number of devices supported and the maximum distance between devices are considerably lower in this situation, the Network Hub 12 utilized in FIG. 1 is eliminated. Connectivity is provided by splitter 14c. Central Office lines are terminated directly in telephones 17c–e, but are available to any telephone on the system. Additional stations are provided by PC-connected telephones 15e–f. The system also supports data communication between PCs 16e and 21. Computer 21 performs additional functions in this system beyond that performed by computer 16e. In this configuration, computer 21 replaces the Real Time Server 11 used in FIG. 1, thereby providing call control and media access management services to the system.

Figure 3:
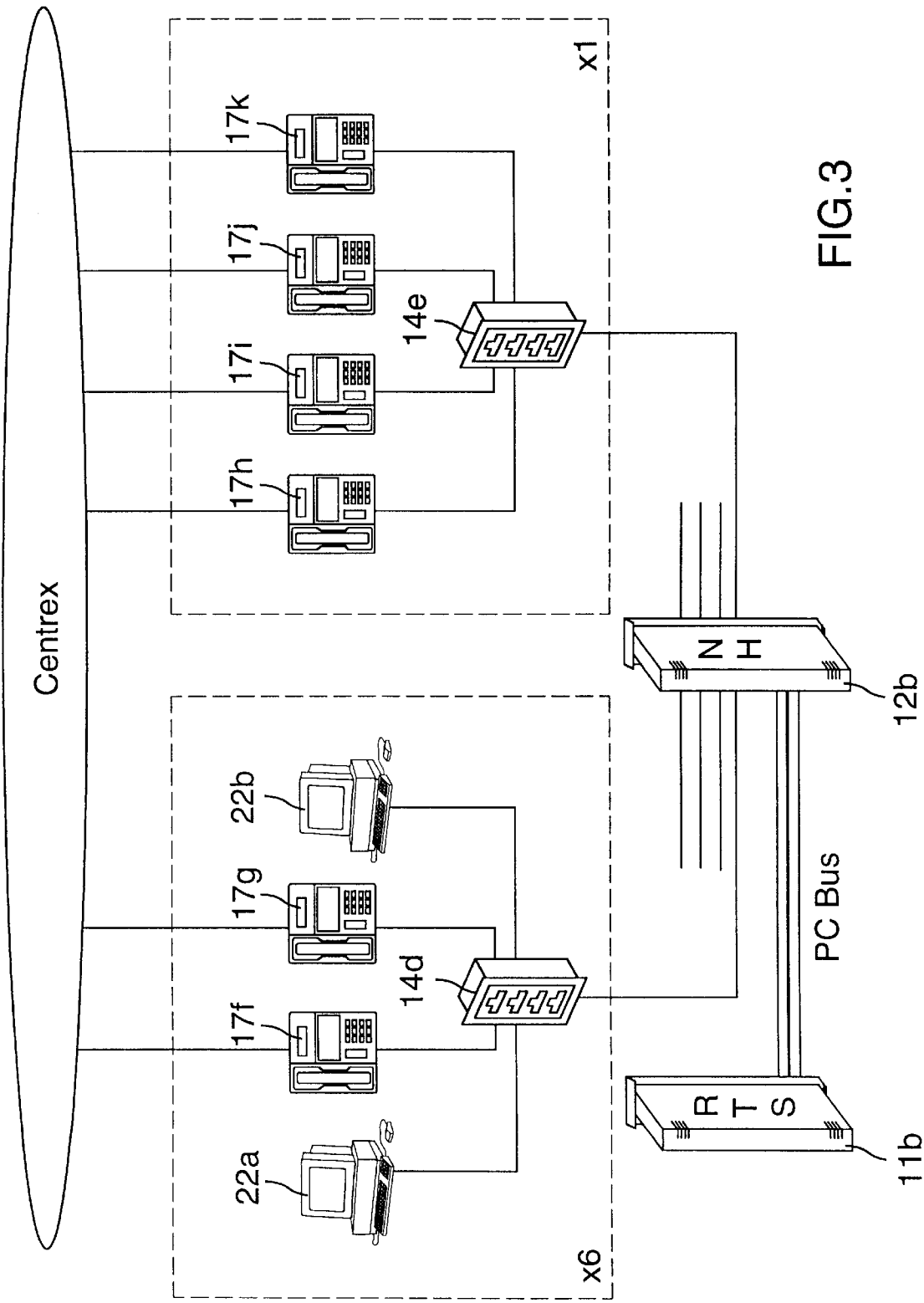
FIG. 3 is a diagrammatic representation of a network according to the invention for use in a centrex network.

FIG. 3 illustrates a multimedia communication system optimized for deployment in a centrex environment. In such a system, the telephone company provides a separate Central Office line for each telephone. Termination of these lines is provided by telephones 17f–k. PCs may also be connected to the system as in FIGS. 1 and 2, and are represented here by units 22a and 22b. Communications is provided by Splitters 14d–e and Hub 12b. As in FIG. 1, call control and media access management is provided by a dedicated Real Time Server 11b.

Figure 4:
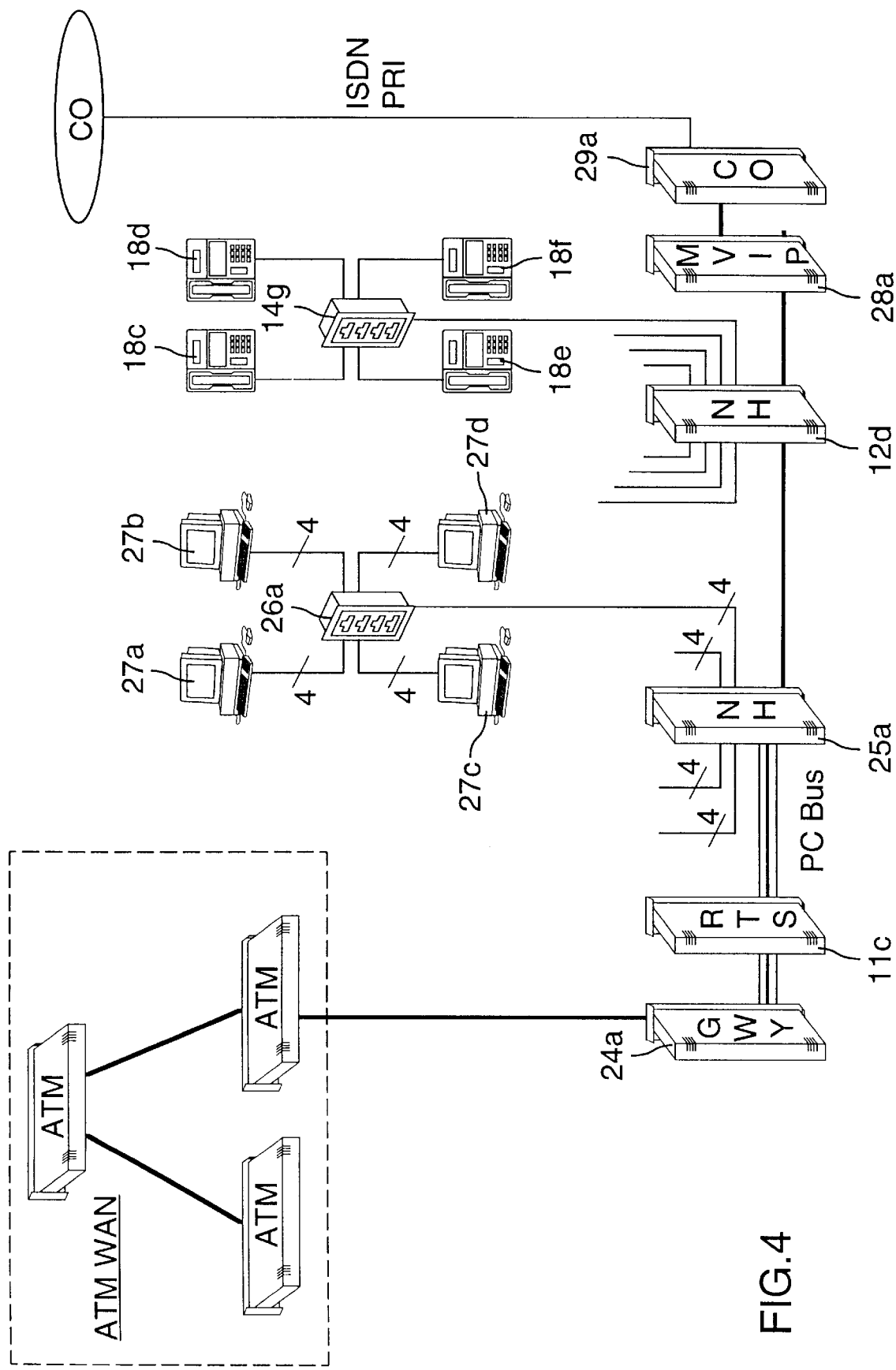
FIG. 4 is a diagrammatic representation of a network according to the invention for use as a LAN for connection to an ATM backbone, i.e. an ATM edge network.

FIG. 4 represents a system configured to operate as the "last mile" distribution mechanism for a wide-area ATM network. Such a system is referred to as an "ATM Edge Network". Information packets (cells) are received from the ATM backbone by Gateway 24a and placed on the PC bus for distribution to the appropriate destination. Network Hub 25a acts as a switching hub by accepting from the bus only those packets addressed to devices which it is responsible for serving. In order to provide increased bandwidth for high demand applications such as Computer Aided Design, hub 25a is configured to drive four wire-pairs to each client. As in previous configurations, each set of wire-pairs may be split to serve up to four clients. This function is performed by splitter 26a which supports a 4-pair connection to the hub and a 4-pair connection to each of its four client PCs. Said client PCs 27a–d are in turn equipped with Network Interface Cards which support 4-pair operation.

Telephone service is provided by hub 12d, splitter 14g and telephones 18c–f. Access to the PSTN is provided by MVIP adaptor 28a and a commercially available digital trunk interface card 29a.

Figure 5:
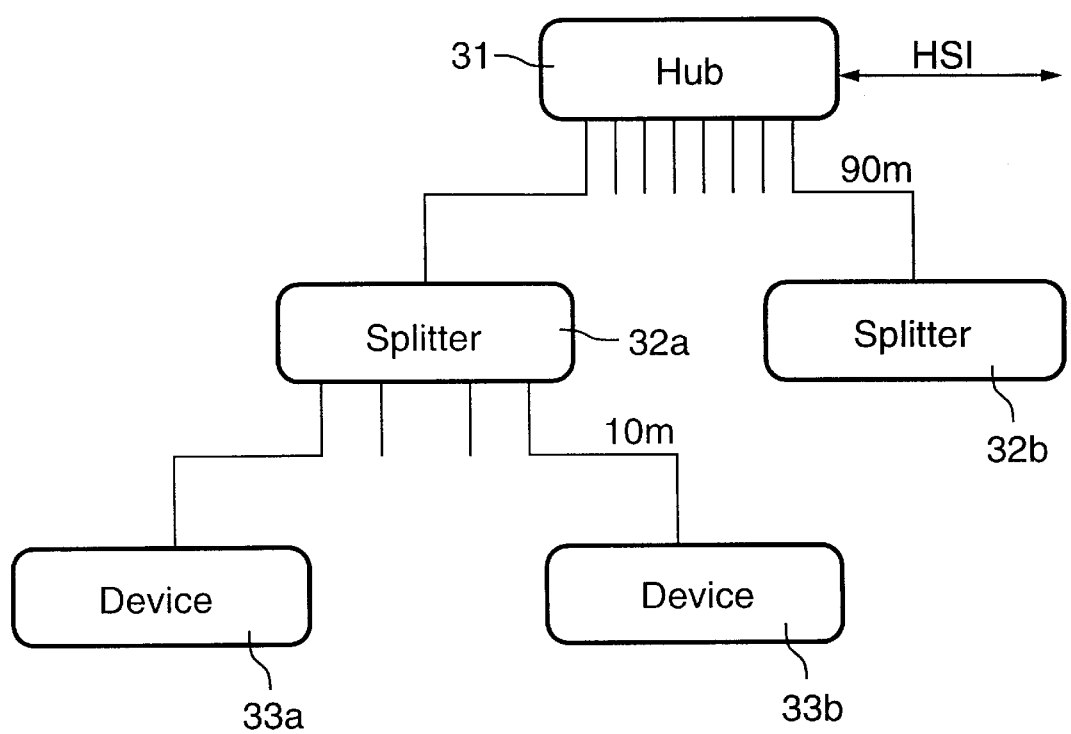
FIG. 5 represents a block diagram of the general or logical topology of a network according to the invention showing major components.

The communication systems illustrated in FIGS. 1–4 conform, in general, to the network topology described in FIG. 5. The network shown in FIG. 5 possesses the following characteristics.

A plurality of peripheral devices 33 (shown here as 33a and 33b) are each connected by a single pair of UTP cable to a Line Splitter 32a. A plurality of Line Splitters 32a–b are in turn each connected by a single pair of UTP cable to a Central Hub 31. The maximum length of cable used for this connection is 10 m per device. Signals present on the individual wiring runs are transmitted by the splitter to the Central Hub 31. The maximum length of UTP cable between each Line Splitter 32 and the Central Hub 31 is 90 m.

Each Line Splitter may be connected to a single wiring run to a Central Hub and up to 4 wiring runs to peripheral devices (other values are possible). In addition to increasing the number of devices that may be connected to each Hub wiring run, the Line Splitter provides a level of isolation from undesirable interactions between devices. The Line Splitter ensures that the signal generated by a device does not reach other devices connected to the same Line Splitter at such a level that such devices are unable to detect signals from more remote devices. It also ensures that disconnection of a device does not render additional locally connected devices inoperative.

The Central Hub receives the signal from each of its ports, regenerates the signal to remove the effects of noise and retransmits the same signal on all of its other ports. A typical Central Hub may be equipped with 8 such ports (but other values are possible).

The net effect of both the Central Hub and the Line Splitter is to provide a broadcast-style medium whereby the signal generated by any device connected to the system is potentially available to any other device similarly connected. At least one device connected to the network must arbitrate access to the shared media in order to prevent competing requests for service from colliding with one another.

The signals generated by each device are encoded in digital format and assembled into packets of data which are gated on to the shared media by the media access protocol. This protocol enables both isochronous and asynchronous information to be transmitted over the same media by use of a token passing mechanism. This mechanism ensures regular access to the media for constant bit rate traffic classes.

Figure 6:
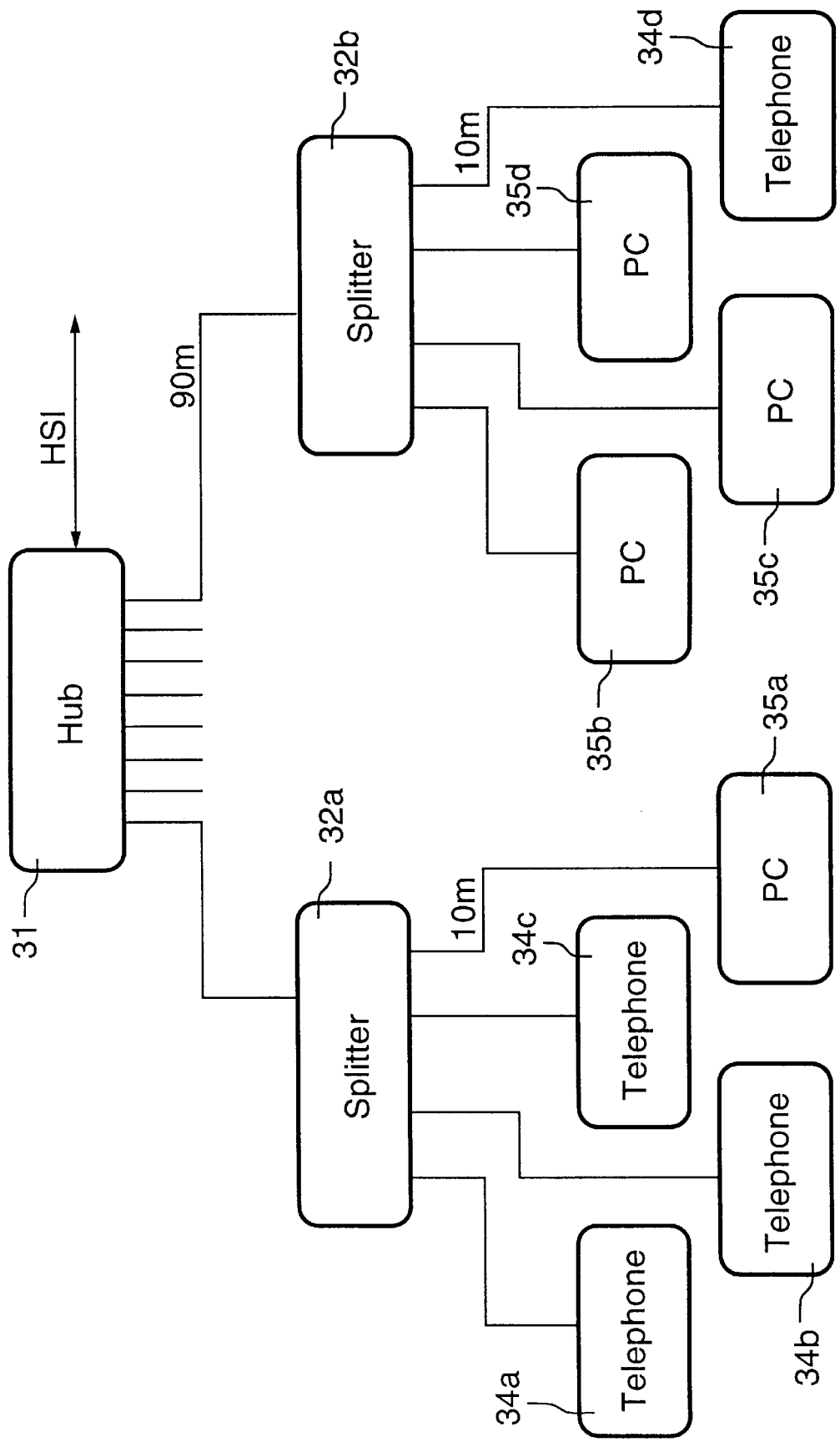
FIG. 6 illustrates the topology of FIG. 5. when populated with specific device instances such as telephones and PCs.

The diagram of FIG. 6 provides an expansion of FIG. 5 wherein the Device level 33 is populated with real instances of said devices such as telephones 34a–d and PCs 35a–d. Note that no restriction is placed on the type or mixture of types of devices connected to each Line Splitter. Any combination of telephones, PCs and other information source/sinks may be connected to each splitter, limited only by the maximum port capacity of said splitter.

Note also that the diagram represents the topology of the native network only. Many other connections may be made to the peripheral devices, e.g. CO-lines may be brought in to the telephones, telephones may be directly connected to PC's, other networks may be connected to gateway PC's, etc.

FIG. 7

Figure 7:
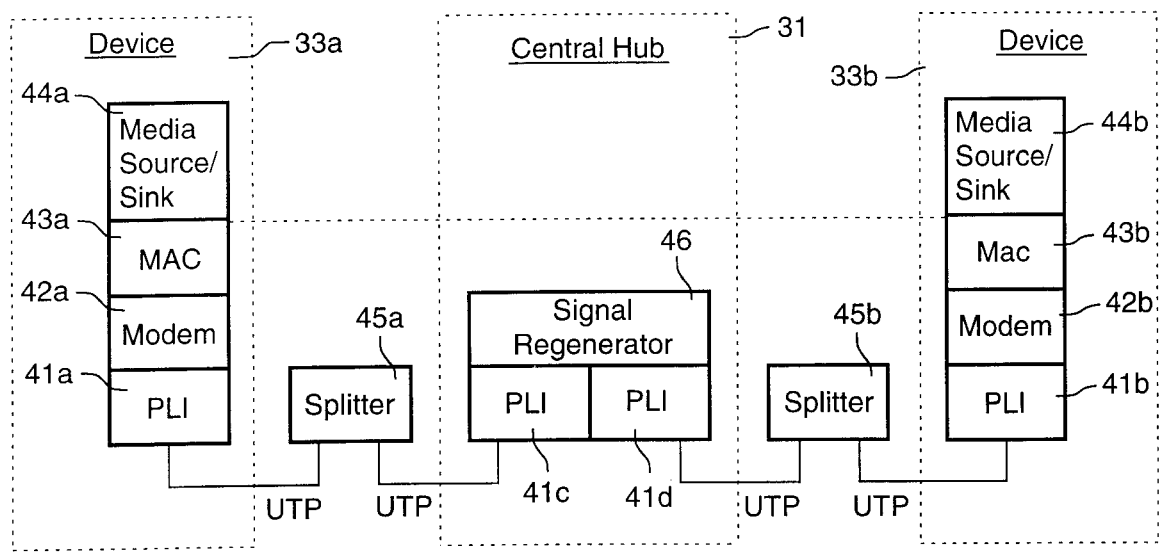
FIG. 7 represents a block diagram of the hierarchy of communication subsystems of use in a network according to the invention.

FIG. 7 defines a hierarchy of communication subsystems required to create a multimedia communications link.

At the bottom of the communications stack within the central hub 31 and peripheral devices 33a–b is the physical layer interface 41a–d. This subsystem is responsible for driving the digital signal onto the physical wire (UTP). One or more Line Splitter subsystems 45a–b may optionally be placed in the path to increase the number of devices supported by each port of the Central Hub. The splitter operates entirely at the physical layer, serving only to amplify and properly terminate the received signal. The splitter has no knowledge of the information represented by the digital signal.

Each device subsystem 33a–b conforms to a common architecture. Device 33a will be used as example. Above the PLI 41a within device subsystem 33a is the Modem 42a. The major function of this subsystem is to convert a pure digital signal presented by the MAC 43a into a waveform suitable for transmission over physical wiring (and vice-versa).

Sitting above the PLI 41c–d within the central hub 31 is the signal regenerator 46. This subsystem, like the splitter, serves to regenerate the signal. Whereas the splitter is an analog device, the signal regenerator reconstructs the signal as digital pulses, before converting back to analog for transmission over the external wiring. The subsystem also performs an arbitration function to ensure that only one external device at a time may broadcast its information.

The aforementioned subsystems (41, 42, 43, 45 & 46) constitute the physical and data link layers of the present invention. The invention defines a system for the transportation of multimedia information. The source and sink of said multimedia information is represented in the figure by the Media Source/Sink subsystems 44a–b.

FIG. 8

Figure 8:
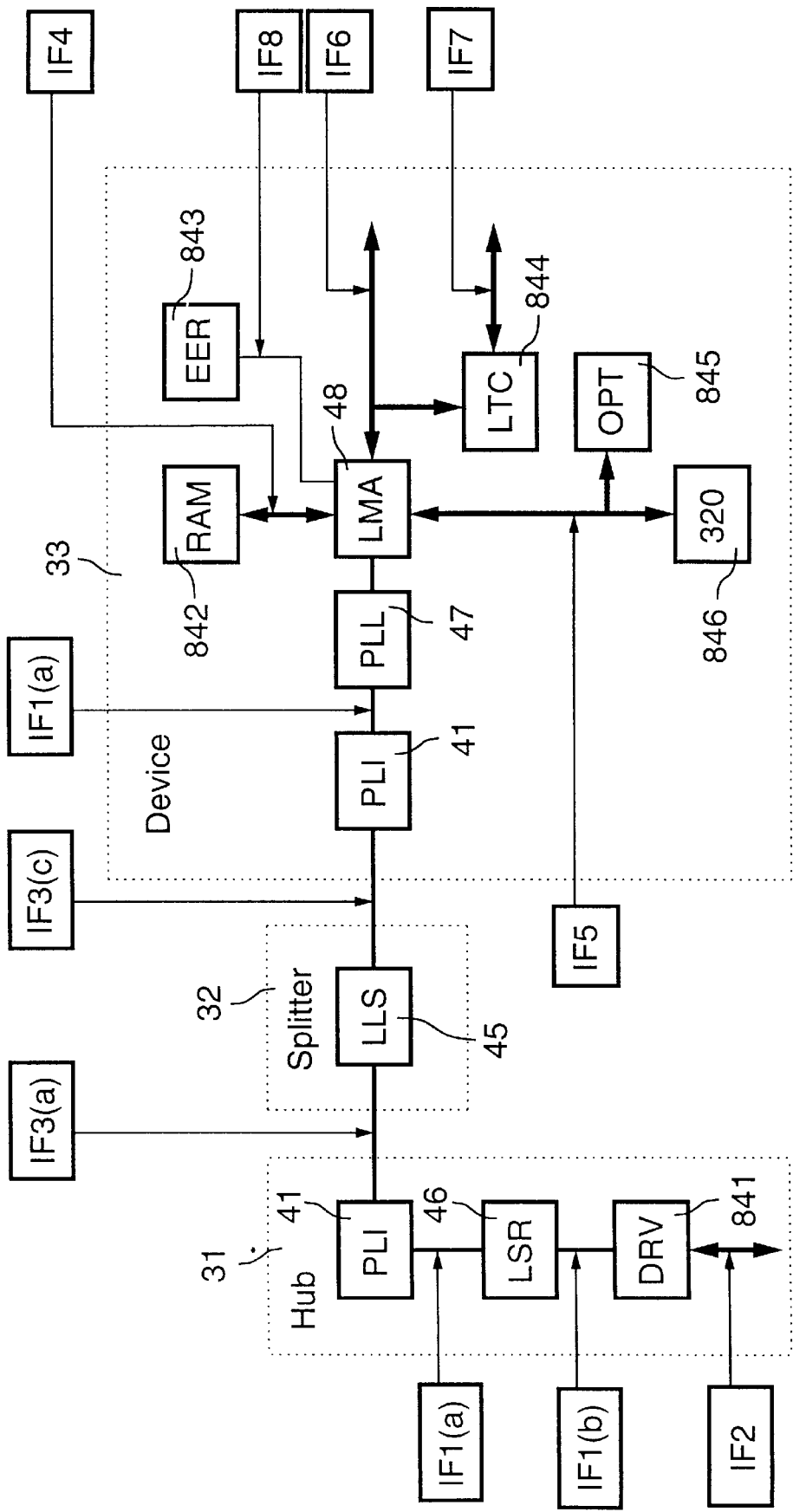
FIG. 8 is a block diagram of a network according to the invention showing major components in more detail.

FIG. 8 is a block diagram of the preferred embodiment of the communication subsystems of the present invention. This diagram illustrates the manner in which the logical subsystems defined in FIG. 7 are mapped onto the physical hardware.

Within the physical embodiment of the Central Hub 31, the PLI 41 is implemented using discrete components mounted on a printed circuit board. In the preferred embodiment this circuit is replicated 8 times (other values are possible). Each PLI is connected to a port on the LSR module 46 which implements the Signal Regenerator function of FIG. 7. An additional port is provided on the LSR for the interconnection of individual co-located hubs. This port feeds a limited distance version of the PLI, 841, labelled DRV in the figure.

The physical splitter 32 is essentially identical to the logical splitter 45, additional components consisting only of physical packaging and connectorization.

The physical structure of the preferred embodiment of a Device 33 is somewhat different from the logical structure. The physical wire is terminated at a physical PLI 41 consistent with FIG. 7. However the Modem 42 is implemented in two parts, which will be referred to as the Phase Lock Loop or PLL 47 and the Modem Core. The Modem Core is combined with the MAC 43 and implemented within a custom ASIC, named the LMA 48.

Said ASIC 48 is operated upon by digital signal processor 846 which is optionally provided with external program or data store 845. The functions of ASIC 48 are augmented by buffer ram 842 which provides temporary storage for data packets in transit between the ports of ASIC 48. Non-volatile memory 843 is provided for storage of configuration parameters such as the unique identity of the device. The figure also shows an example of additional hardware that may be required to interface with particular types of multimedia nodes. In this instance, LTC 844 provides the functions necessary to interface with a telephony node, said functions comprising voice codec interfaces and scan and drive point interfaces.

FIG. 9

Figure 9:
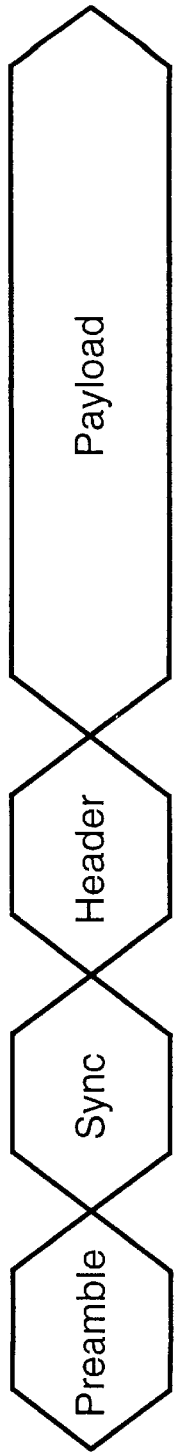
FIG. 9 is a diagrammatic representation of a typical data packet of use in the invention at the physical layer.

FIG. 9 demonstrates the structure of a typical data packet at the physical layer. The first section (preamble) is a sequence of bits used to detect presence of a signal. The second section (sync) is used to acquire clock synchronization with the incoming signal. The third section (header) is used to direct the packet to the correct destination (MAC Address). The fourth section (payload) contains the actual media information.

FIG. 10

This figure shows a block diagram of a preferred embodiment of the Line Splitter subsystem. The main features of its operation are as follows:

The signal from the Hub subsystem 31 is received by the Filter section 191. The AC and DC components of the signal are separated from one another, the AC component being distributed to bus CD, while the DC component is passed to voltage regulator 192, which in turn supplies regulated DC power to distribution bus AB.

The AC signal present on bus CD is boosted by the amplifier circuit of section 193. This boosted signal is presented to the input of each of the 4 identical line driver sections 194–197.

In the reverse direction, the signal present on any one of the line driver sections 194–197 is amplified by section 193 and presented to each of the remaining line driver sections as well as to the Hub subsystem via filter 191.

FIG. 11

This figure provides a block diagram of an alternative implementation of the Line Splitter subsystem. The main features of its operation are as follows:

The signal from the Hub subsystem 31 is received by input transformer module 56. This transformer is equipped with a centre-tapped secondary coil which provides separate inputs for intermediate transformer modules 57a and 57b. These transformers are similarly equipped with centre-tapped secondary coils which provide separate inputs for output transformer modules 58a–d.

FIG. 12

Figure 10:
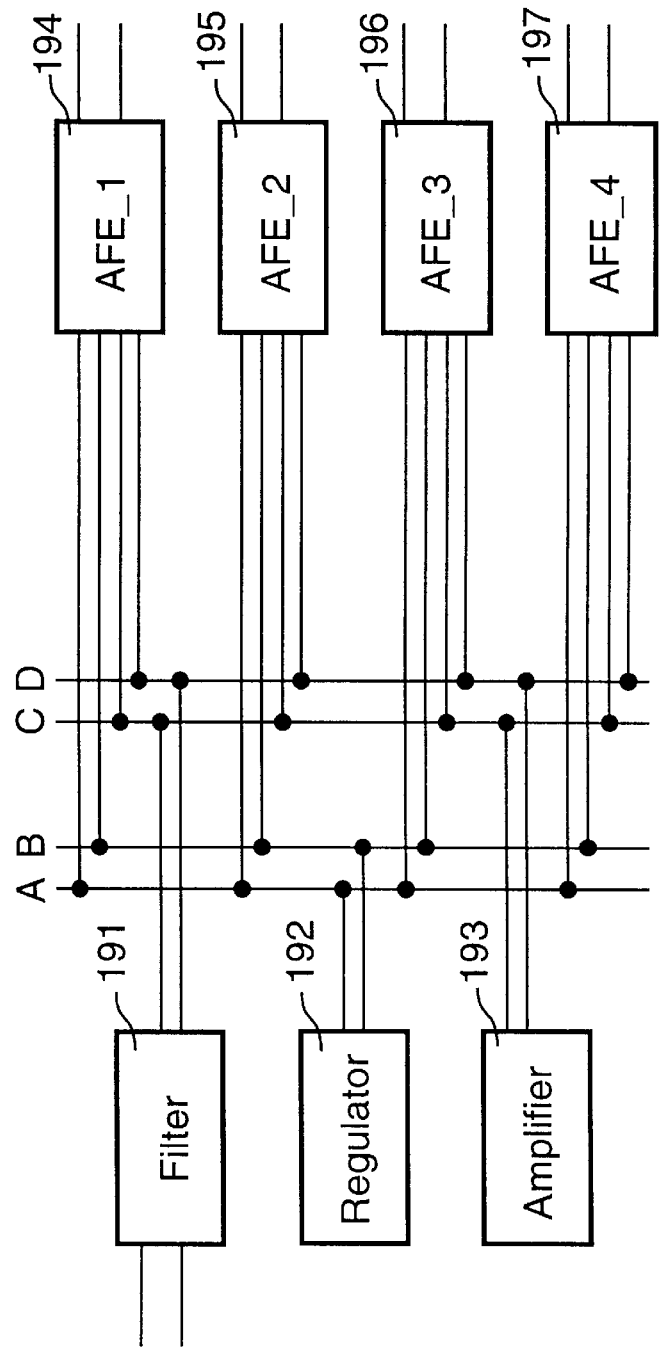
FIG. 10 represents a block diagram of a preferred embodiment of a line splitter subsystem according to the invention.

This figure shows the circuit diagram corresponding to the block diagram of FIG. 10. Its operation is as follows:

Section 191 performs a filtering function on the signal received at connector 101. This signal is composed of a wideband digital signal superimposed on a DC offset signal. The AC component is capacitively coupled to the AC distribution bus by the RC network comprised of resistors 103 & 105 and capacitors 102 & 104.

The DC component is conducted to the voltage regulator section 192 by forward biasing diodes 106 & 107, which provide protection against an improper (reverse) connection of terminals 4 and 5 on connector 101. The AC component is blocked by inductors 108 & 109. Diode 110 also provides protection against DC reversals, in this case occurring at terminals 4 and 5 of connectors 176, 177, 178 or 179.

Section 192 provides regulation of the DC component. The current source is provided by Darlington pairs 115 and 116. The output voltage is clamped by Zener diode 117 and smoothed by capacitors 121, 122 & 123. It is then utilized as the supply voltage by the signal boost section 193.

Section 193 boosts the AC signal present on distribution bus CD. The gain of this differential amplifier is carefully controlled by applying a limited amount of positive feedback through resistors 119 & 120. The value of these resistors is chosen to be equal to the effective resistance of the amplifier load. This load is comprised of the parallel connection of sections 191, 194, 195, 196 & 197. Since each of these blocks utilizes a 16Ω resistor in each leg, the effective load presented by 5 such circuits is 2.2Ω.

The operation of sections 194, 195, 196 & 197 is identical. Section 194 will be used as an example. In this section, the amplified digital signal which is present on distribution bus CD is required to be transmitted out on to the wire via connector 176. This function is performed by the RC coupling network 129, 130, 138 & 139. Section 194 also performs the function of maintaining an adequate termination impedance independent of whether an external device is actually connected to 176.

When a device is connected to 176, said device is required to provide a DC impedance close to 0Ω measured across terminals 4 and 5. This arrangement has the effect of providing a forward bias to diodes 131 & 135, thereby allowing the AC signal present at capacitors 130 & 139 to be conducted to said 176 terminals. Since the impedance of resistor 134 is much greater than 0Ω (i.e. 82Ω), no current flows through this path and LED 133 is extinguished. When no device is connected to 176, diodes 131 & 135 are open circuit, and no current flows to the connector. In this case, the DC voltage present on distribution bus AB has the effect of forward biasing diodes 133 & 180, thereby allowing the AC signal present at 130 and 139 to flow through resistor 134. By these two means, the AC signal is always presented with a finite load, thereby maintaining the stability of the circuit.

FIG. 13

Figure 12A:
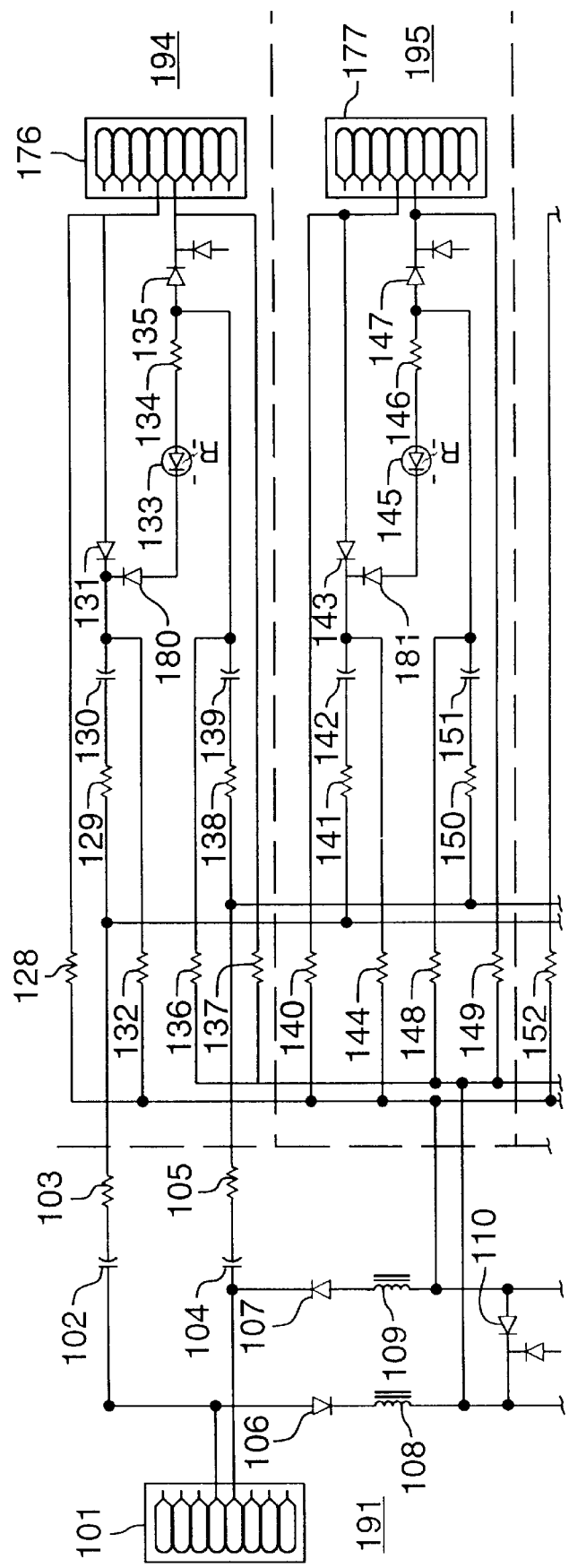
FIG. 12 represents a circuit diagram of a preferred embodiment of a line splitter subsystem according to the invention.
Figure 12B:
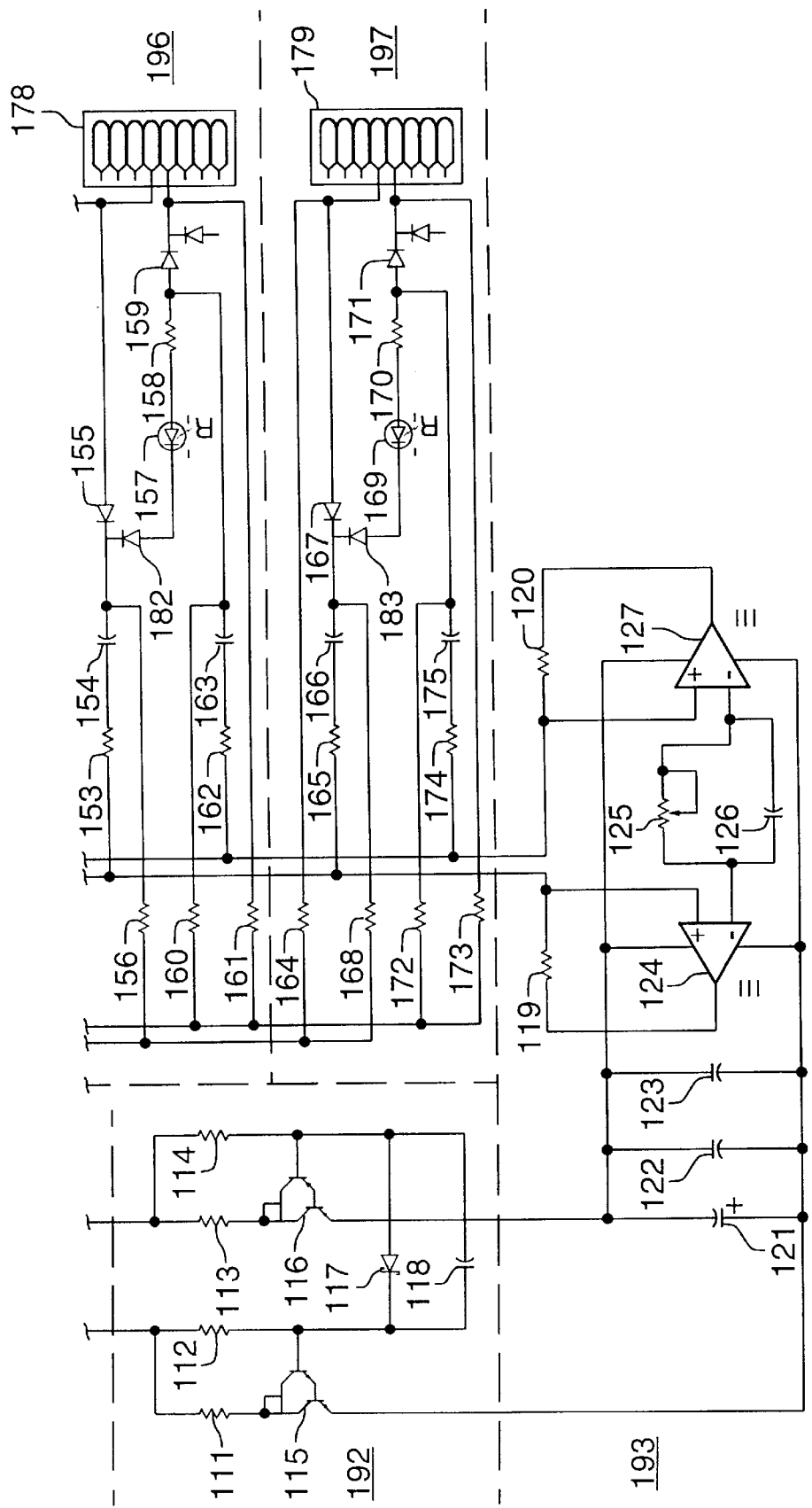
Figure 13A:
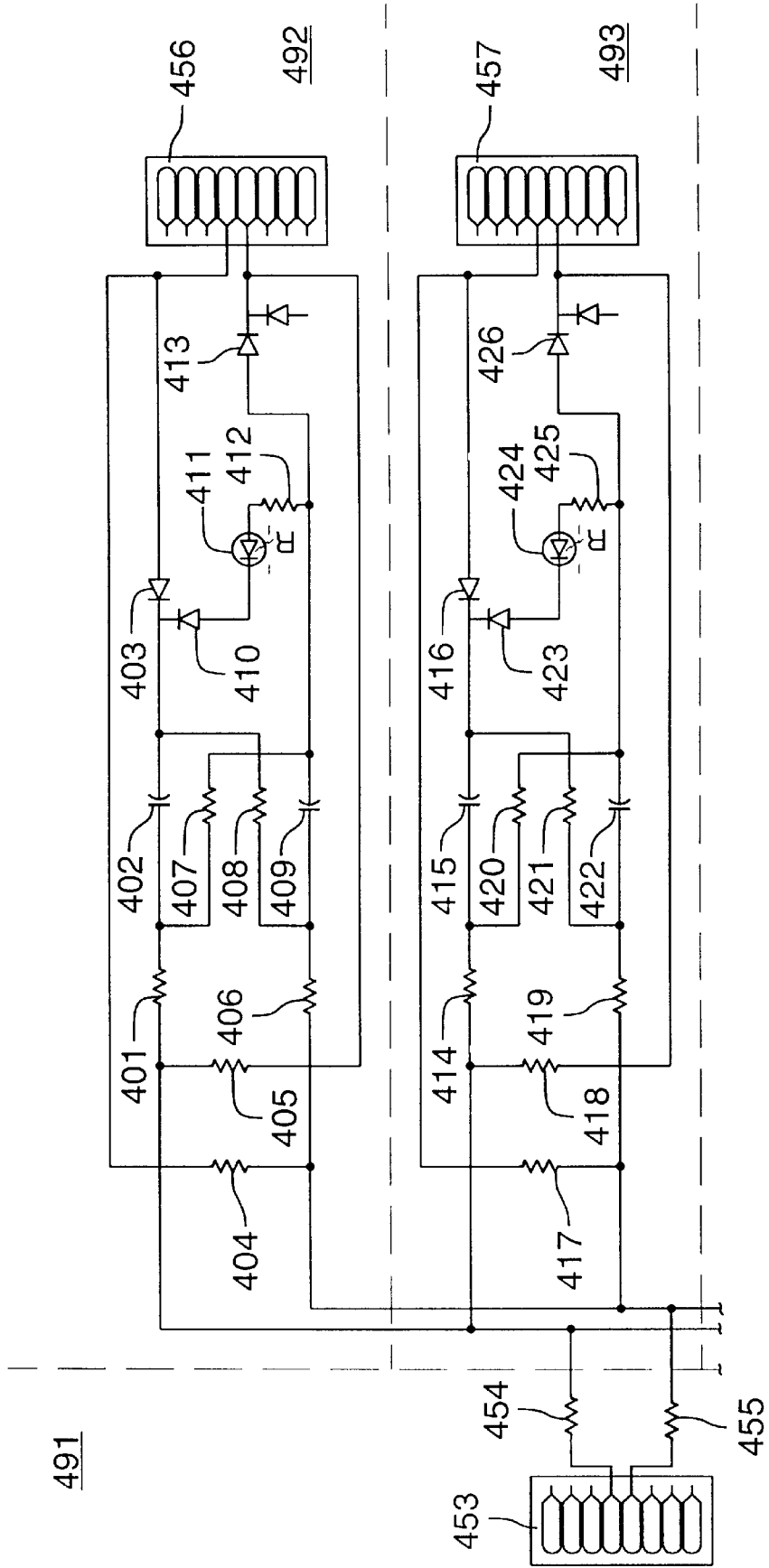
FIG. 13 represents a circuit diagram of a passive alternative embodiment of a line splitter subsystem according to the invention.
Figure 13B:
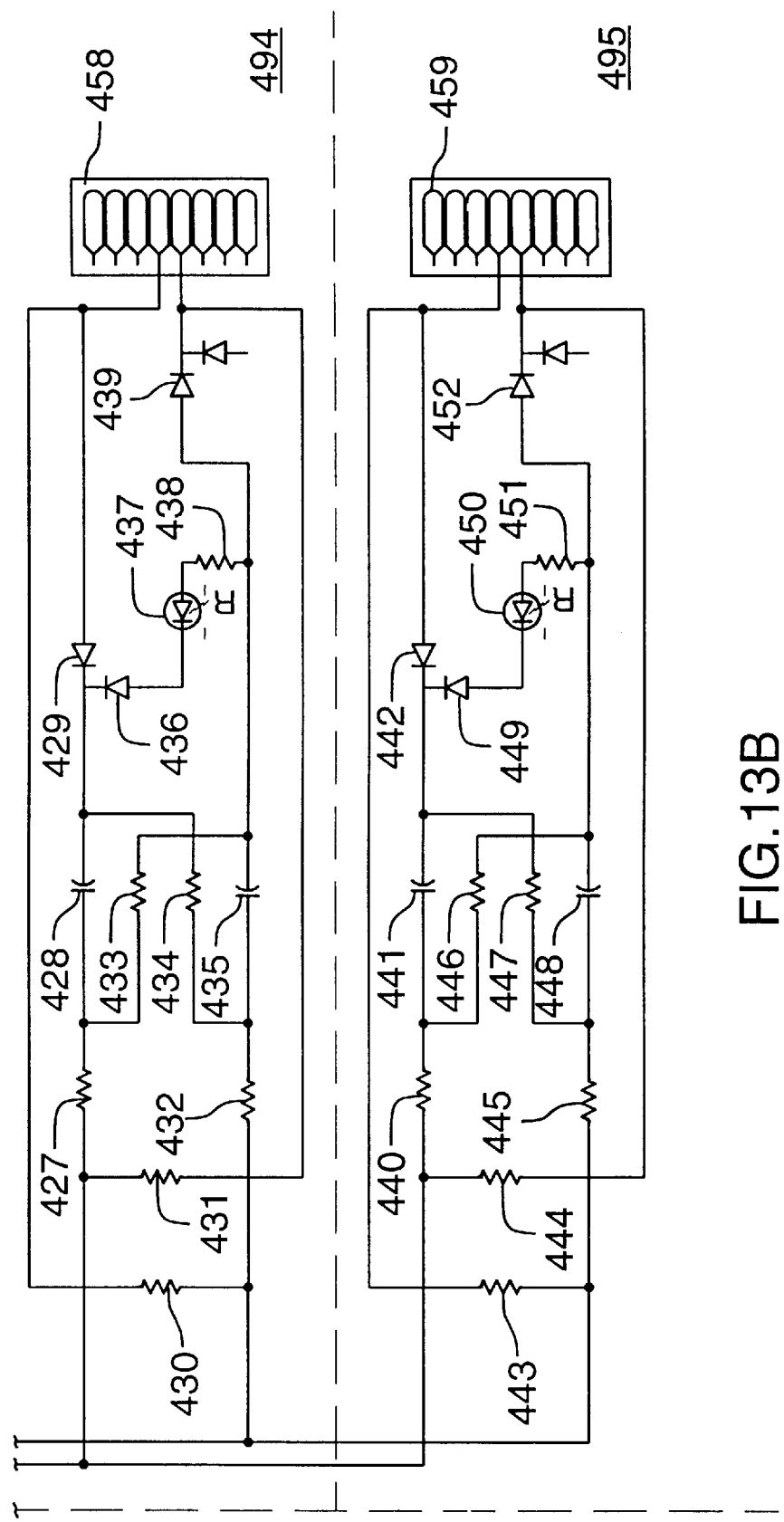
Figure 14:
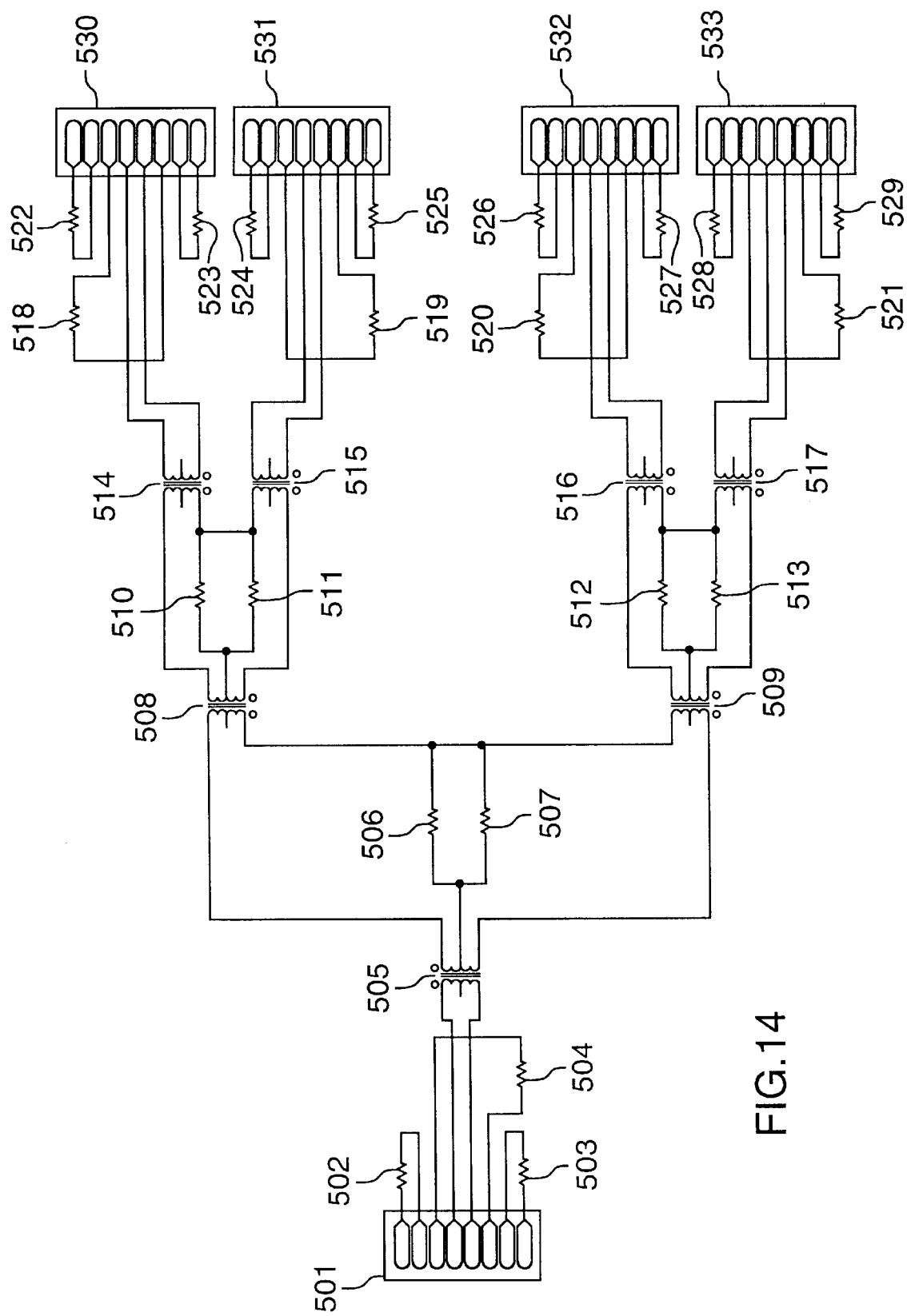
FIG. 14 represents a circuit diagram of a transformer-based alternative line splitter subsystem according to the invention.

FIG. 13 shows the circuit diagram of an alternative embodiment of the Line Splitter subsystem which does not provide amplification of the signal. Its structure is similar to that of FIG. 10, with the omission of sections 191, 192 and 193. The implementation and operation of the remaining sections 492–495 is identical to that described above for FIG. 12, sections 194–197.

FIG. 14

Figure 11:
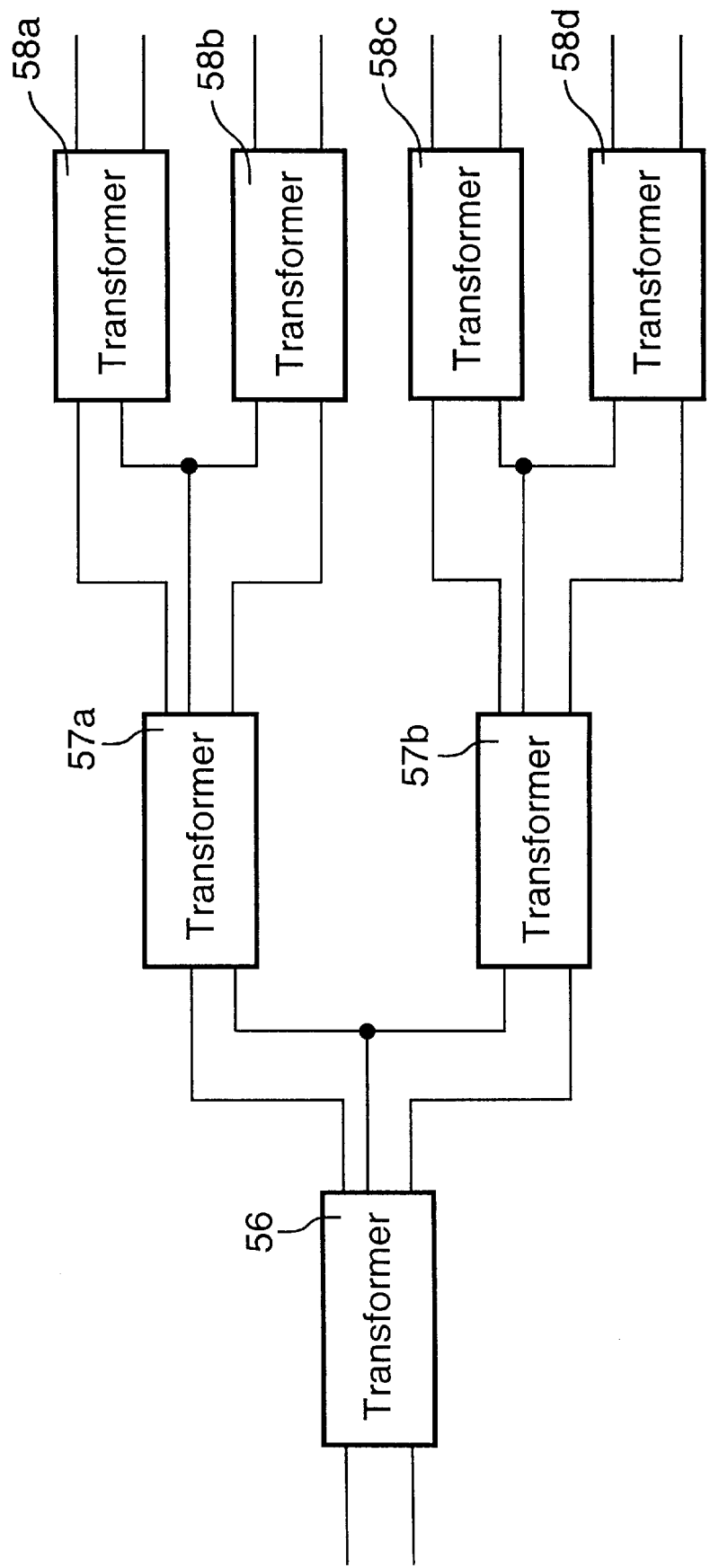
FIG. 11 represents an alternative block diagram of a preferred embodiment of a line splitter subsystem according to the invention.

This figure shows the circuit diagram corresponding to the block diagram of FIG. 11. Its operation is as follows:

The circuit provides means to split power received at Port A and distribute it equally over Ports B, C, D and E. Similarly, power received at Ports B, C, D and E is combined and delivered to Port A. The design is implemented for 100Ω characteristic impedance and balanced with respect to ground.

The power applied to Port A is split equally among Ports B, C, D and E, and can be expressed as follows:

$$P_B = P_C = P_D = P_E = IL * P_A / 4$$

where IL represents the Insertion Loss and is dependent on transformer losses. When used as a combiner, the power appearing at Port A is the sum of all signal powers applied to Ports B, C, D and E, and can be expressed as follows:

$$PA = IL_1 \cdot P_B + IL_2 \cdot P_C + IL_3 \cdot P_D + IL_4 \cdot P_E$$

where $IL_1$ to $IL_4$ are the corresponding power losses due to energy transfer between Ports B, C, D and E and associated transformer losses.

The amount of power transfer between Ports B, C, D and E depends on the value of resistors connected to the centre-taps of $T_1$, $T_2$ and $T_3$. When these resistors are equal to one half of the characteristic impedance, there is no power transfer between Ports B, C, D and E.

The design uses wide-band transformers with an impedance transformation ratio of 1:2 for transformers 505, 508 and 509, and 1:1 for transformers 514–517. The values of resistors 506–507 and 510–513 are calculated for approximately −16 dB of power transfer between Ports B, C, D and E. The insertion loss is approximately equal to 0.7 dB.

Unused ports on connectors 501 and 530–533 are terminated by resistors 502–504 and 518–529.

This design permits power splitters or combiners to be constructed for any even number of output ports.

Figure 15:
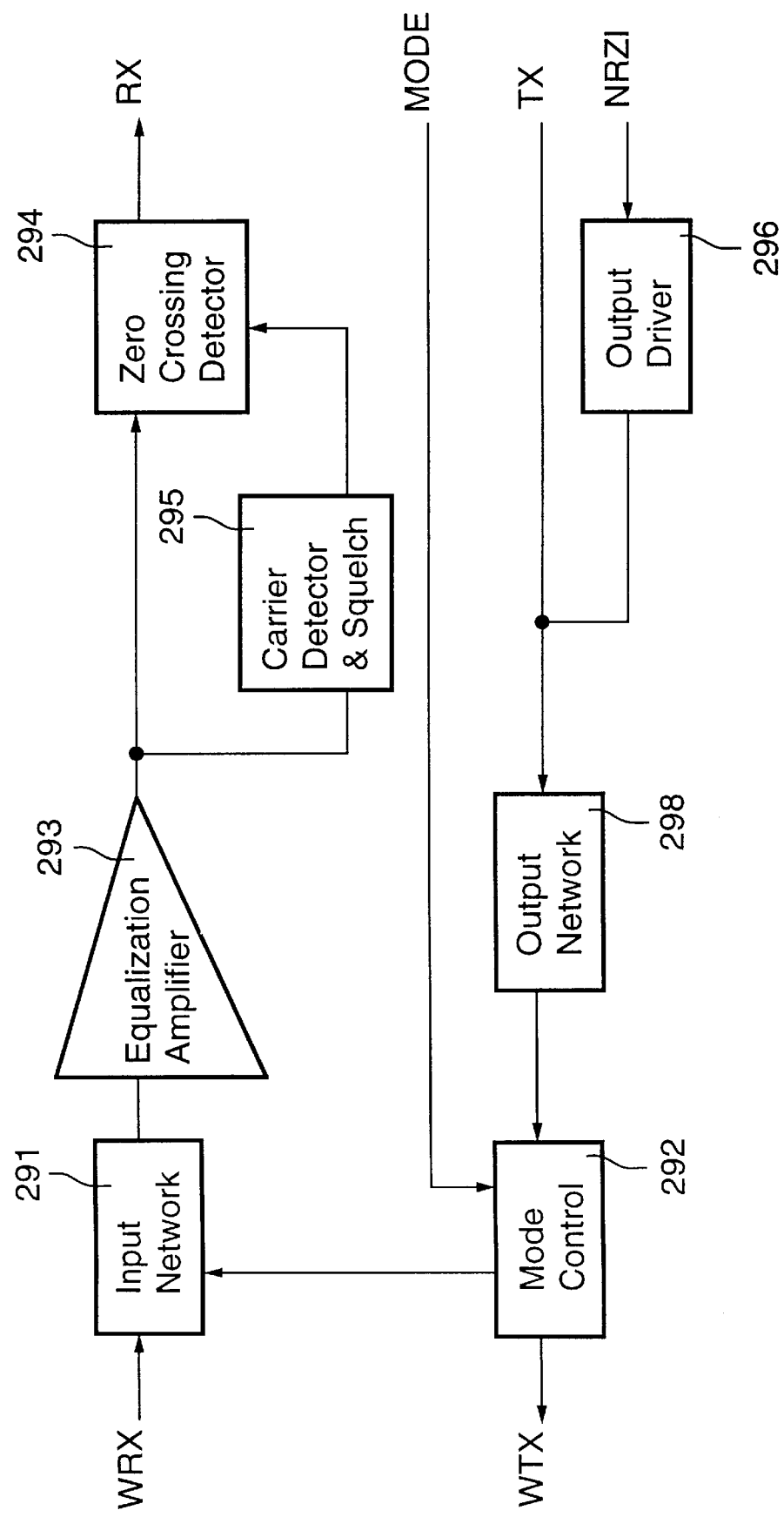
FIG. 15 represents a block diagram of a preferred embodiment of the physical layer interface subsystem according to the invention.

FIG. 15 is a block diagram of the preferred embodiment of the Physical Layer Interface subsystem of the present invention. Its operation is described below.

Signals received from the wire (WRX) are presented to the Input Network 291. This circuit provides the correct termination impedance to the line and passes the received signal to the Equalization Amplifier 293. This circuit amplifies the received signal and applies equalization to compensate for the frequency dependent attenuation characteristics of UTP wiring.

The amplified signal is then passed to a Zero Crossing Detector 294 and to a Carrier Detector & Squelch circuit 295. The Zero Crossing Detector 294 reconstructs a digital waveform from the received analog signal. The Carrier Detector & Squelch circuit 295 serves to mute the digital output when carrier is not detected on the line. This helps to prevent undesirable noise signals from being passed to the output (RX).

In the transmit direction, the Output Driver section 296 provides power amplification of the digital signal (NRZI). If an off-board line driver is available, then an option is provided to bypass the internal Output Driver. In either case the resultant signal is passed through the Output Network 298 in order to provide the correct impedance to the wire and to shape the frequency spectrum of the transmit signal (WTX) to comply with FCC spectral emission regulations.

A Mode Control section 292 is provided to support the selection of either half duplex (single pair) or full duplex (2-pair) transmission mode. This functionality is optional, being included in the embodiment of FIG. 16 and omitted from the embodiment of FIG. 17.

Figure 16B:
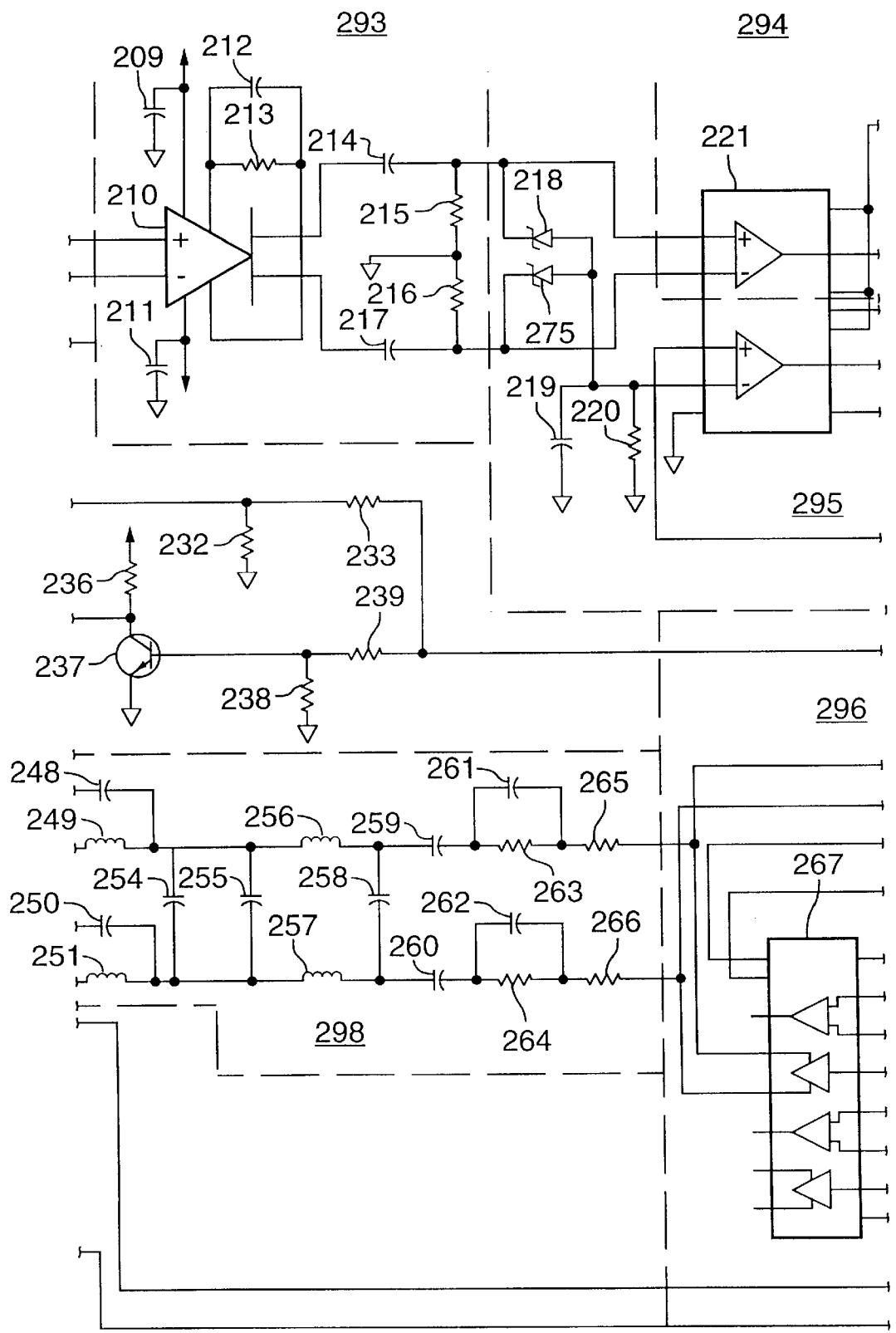
FIG. 16 represents a circuit diagram of a preferred embodiment of the physical layer interface subsystem according to the invention.
Figure 16C:
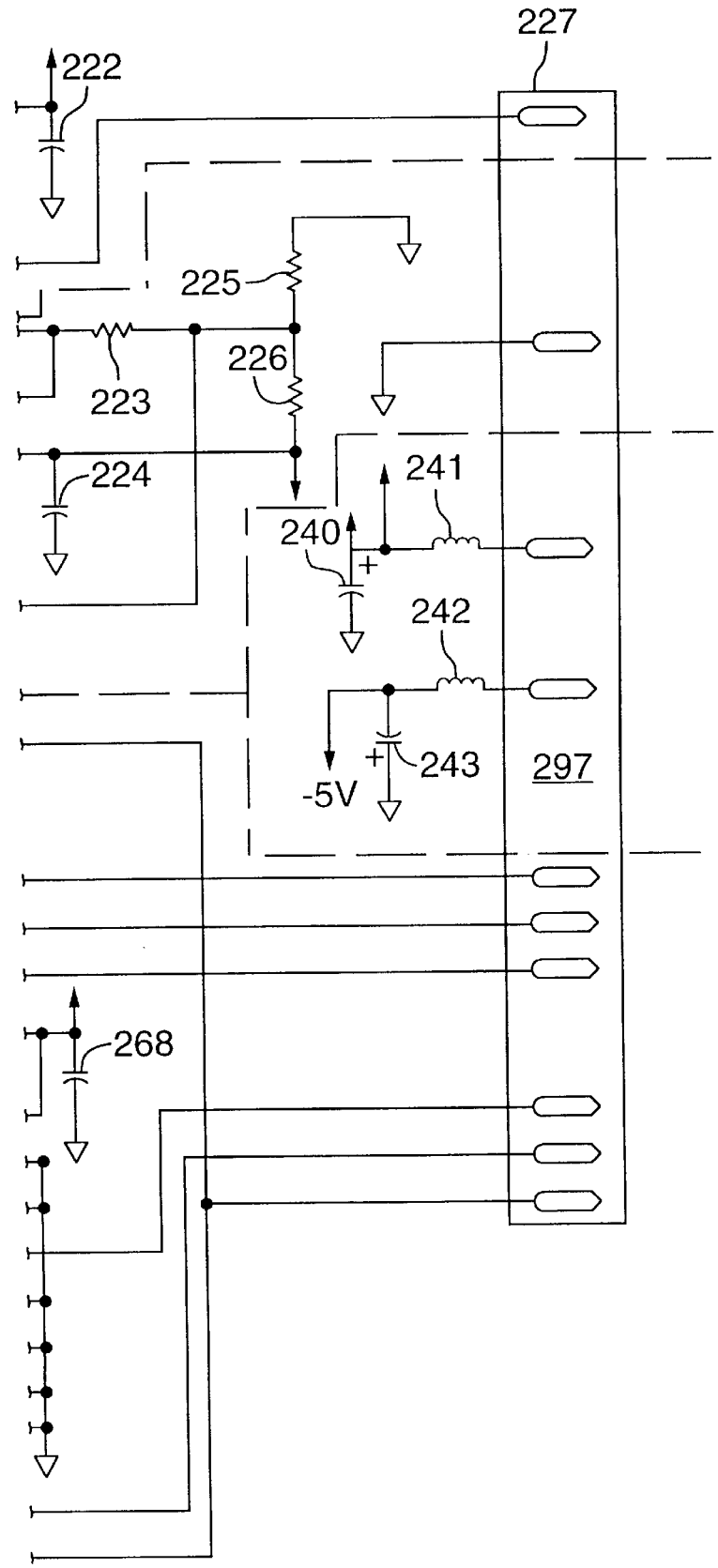

FIG. 16 is a circuit diagram of the preferred embodiment of the Physical Layer Interface subsystem of the present invention. Its operation is described below.

The signal on the wire is received by section 291. Within this element, the AC component of the signal is conducted by capacitor 203 and inductively coupled into the secondary of transformer 204. The AC impedance required to match the 100106 characteristic impedance of UTP is provided by resistors 265 & 266 contained in section 298.

If the PLI is attached to an external splitter, then a positive DC voltage is present on terminal 201-5 which causes forward biasing of diode 202 and permits DC current to flow. This current flow is used by the splitter to determine that a correct termination of the line is present. If, however, the PLI is directly connected to a central hub, then the DC voltage on terminal 201-5 is negative. In this case, diode 202 is reverse biased and no DC current is drawn. This operation prevents the unnecessary flow of DC current over the horizontal cabling and an undesirable drain on the DC power capacity of the central hub.

Diodes 207 & 274 provide a voltage clipper for use as a development and debug tool.

Section 293 implements an amplifier with frequency equalization. Amplification is provided by amplifier 210. The gain of this amplifier is controlled by the RC feedback circuit of 212 & 213. The fall in impedance of this circuit with increasing frequency causes increased amplifier gain at higher frequencies, thereby providing the equalization necessary to compensate for the higher attenuation of UTP at these frequencies. The amplified output is passed to sections 294 & 295 by coupling capacitors 214 & 217.

Section 294 is a zero crossing detector which is implemented by amplifier 221.

Section 295 provides carrier detection, whose inverse is used to mute noise output in the absence of carrier (squelch). The received signal is full-wave rectified by diodes 218 & 275, and envelope detection is provided by the smoothing network 219 & 220. This signal is compared with a reference voltage provided by divider network 223, 225 & 226. The resultant signal is applied to the Strobe_1 input of 221 which gates the output of the upper amplifier carrying the desired received signal.

Section 296 provides output drive current via amplifier 267. The signal to be transmitted is required to be in NRZI format at the input to 267. If more sophisticated processing of the generation of the transmit signal is desired, then 267 may be bypassed using inputs P1, P7 of connector 227.

Section 298 implements a Cauer filter in order to suppress unwanted frequencies above 30 MHz. This 5-pole filter has a bandwidth of approximately 17 MHz.

Section 292 provides the mechanism to switch the PLI from single-pair (half-duplex) mode to dual-pair (full-duplex) mode. The normal situation shown is single-pair mode. Activation of dual-pair mode is effected by applying a positive voltage to terminal P2 of connector 227. Such voltage causes current to flow through drive transistor 271 which in turn activates relays 245 & 247. When relay 247 is activated, the output of section 298, which is normally connected to the secondary of transformer 204 in section 291, is switched to the secondary of transformer 270, thereby causing transmission to occur on the wire connected to 269. When relay 245 is activated, the termination resistor 244 is connected across the secondary of transformer 204, taking the place of terminating resistors 265 & 266 which are now disconnected from the input circuit.

Also included in section 292 is an alternative method of providing the termination implemented by relay 245 and resistor 244. This alternative method is provided by resistors 229 & 235. A positive voltage at P2 of connector 227 causes DC current to be drawn by transistors 231 and 237, thereby creating an AC path through RC circuits 228, 229 and 234, 235.

Figure 17A:
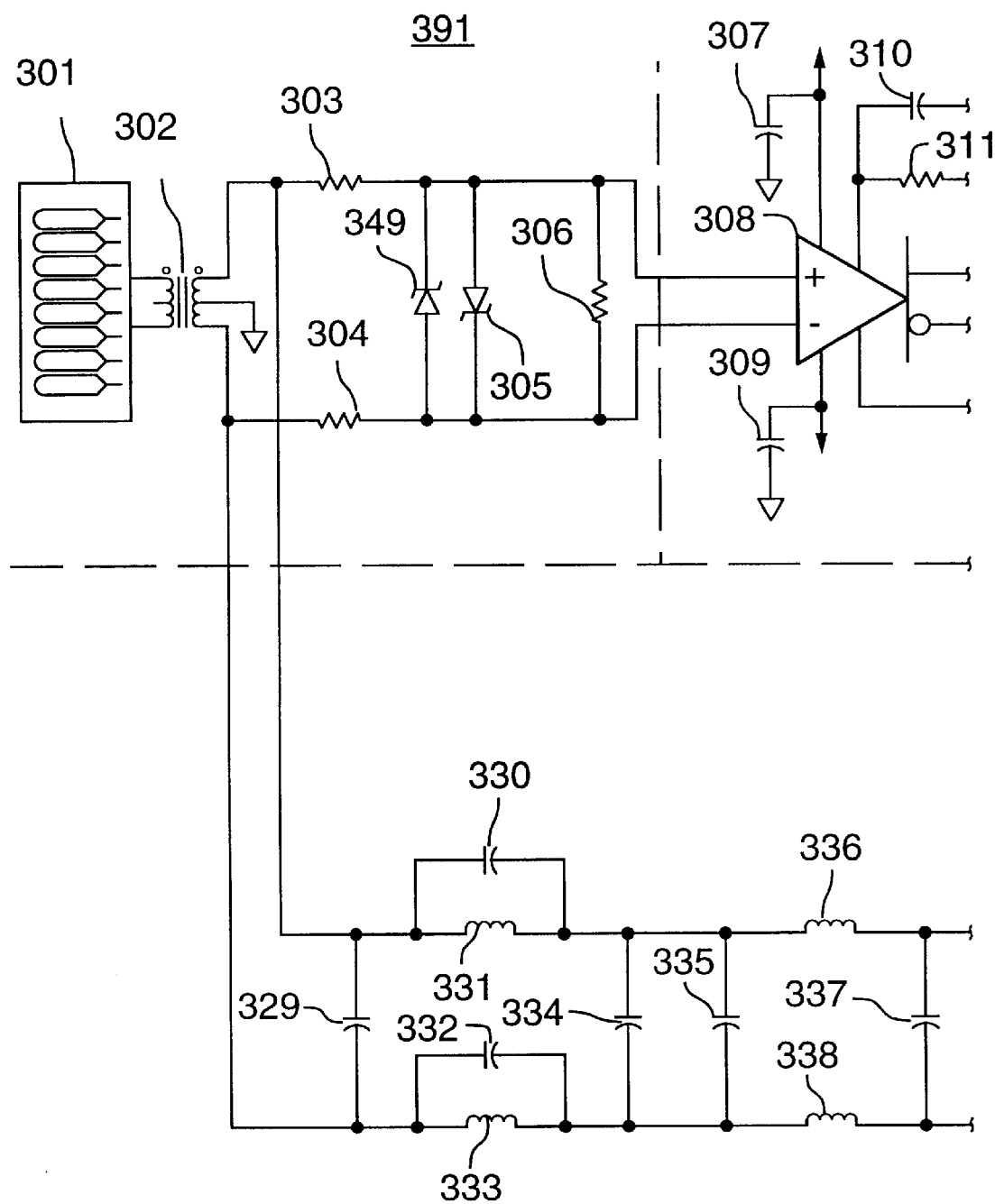
FIG. 17 represents a circuit diagram of an alternative embodiment of the physical layer interface according to the invention.
Figure 17B:
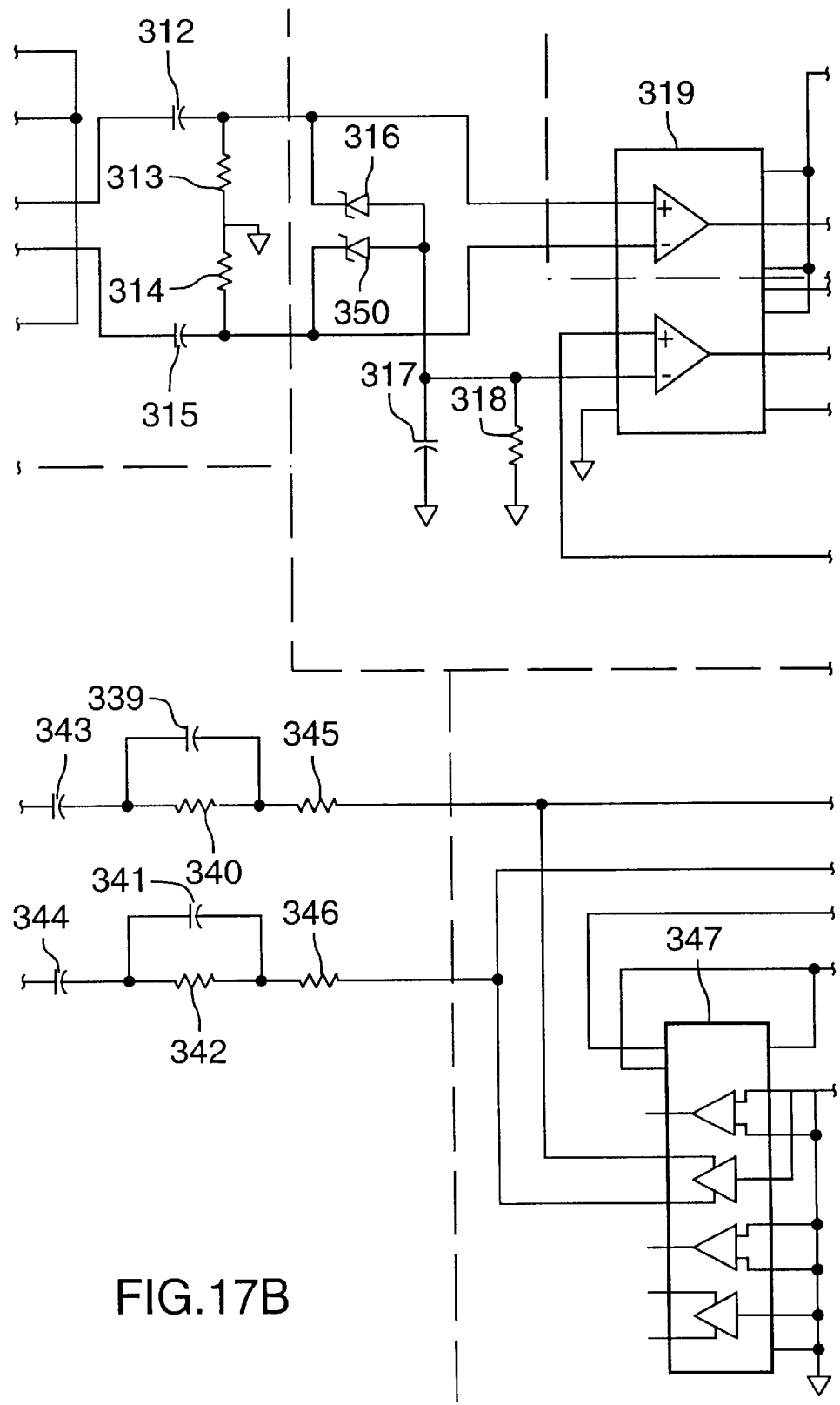
Figure 17C:
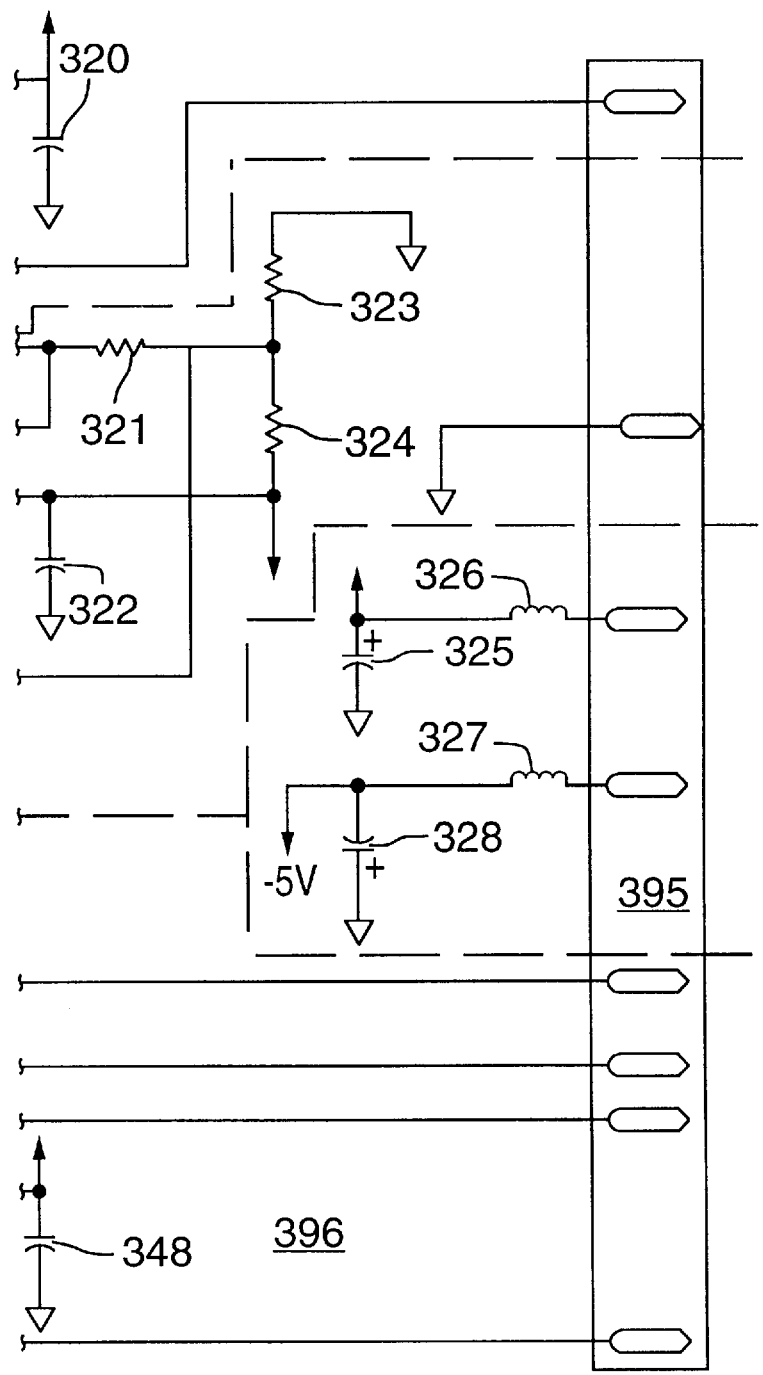

FIG. 17 is a circuit diagram of an alternative embodiment of the Physical Layer Interface subsystem of the present invention. Its operation is identical to that described for FIG. 15, with the exception that dual-pair mode is omitted, resulting in the elimination of section 292 described above. This variant is appropriate where low cost is of prime concern. One application of this variant is to provide a low cost telephone connection.

Figure 18A:
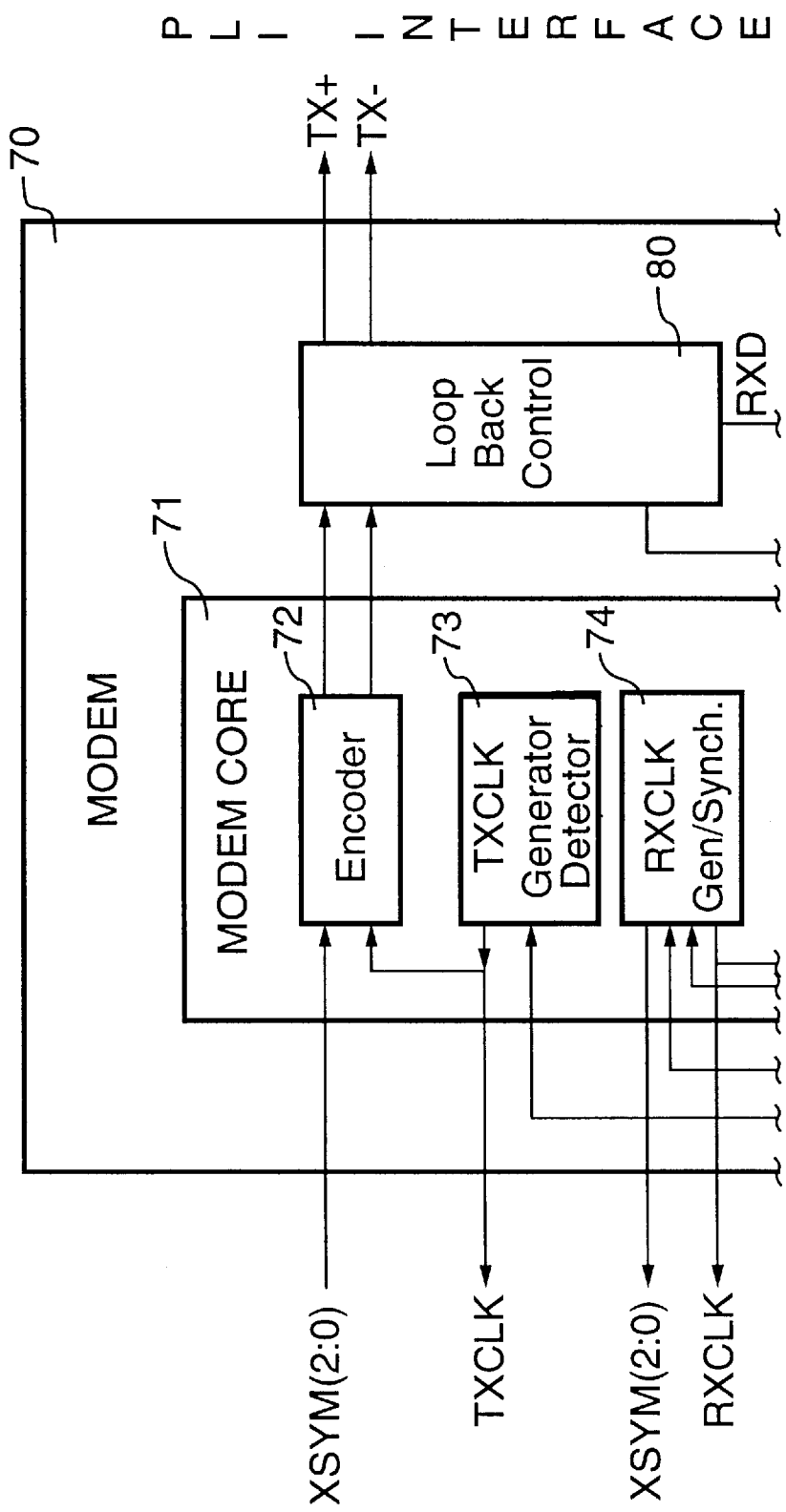
FIG. 18 represents a block diagram of a modem subsystem according to the invention.
Figure 18B:
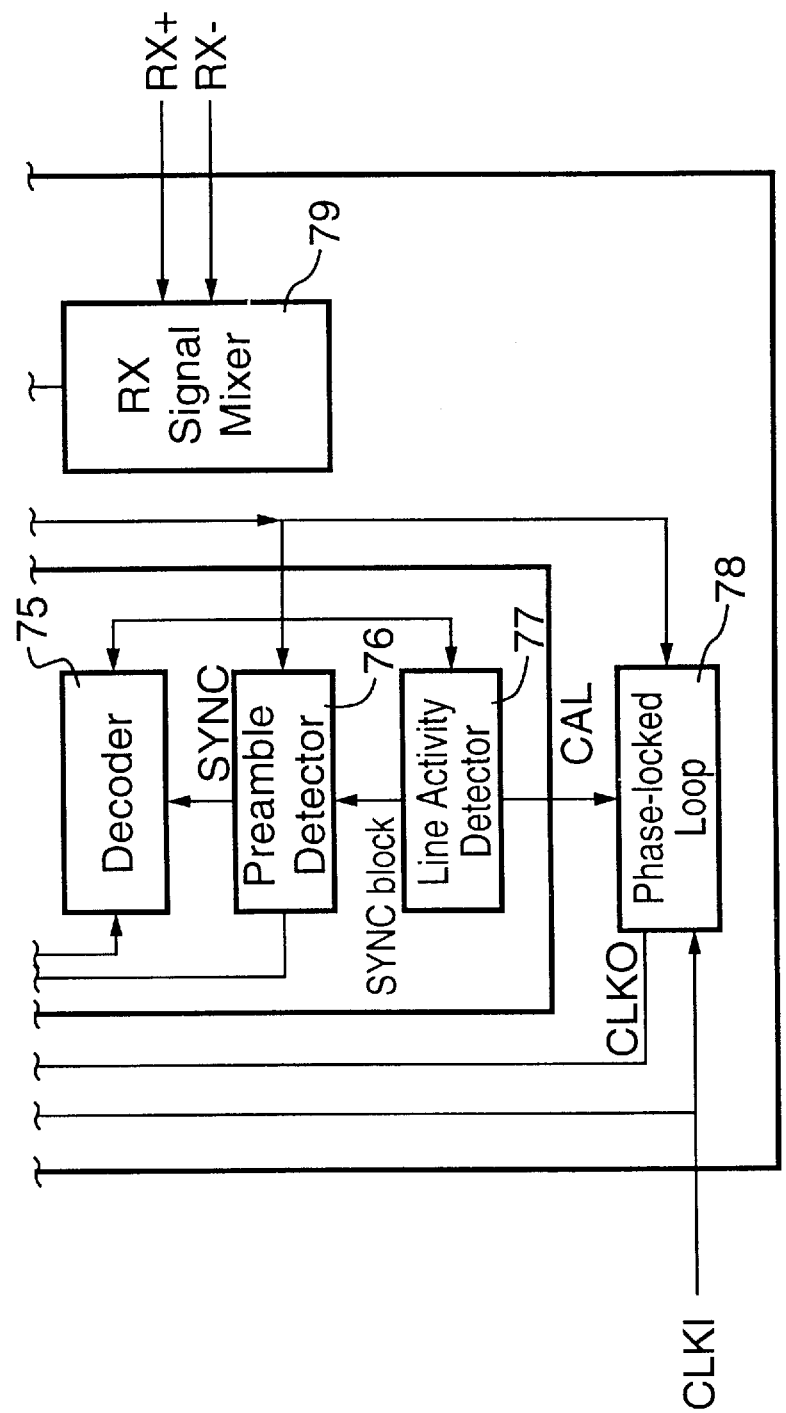

FIG. 18 is a block diagram of the preferred embodiment of the Modem subsystem 42 of the present invention. Its operation is described below.

The transmit direction is the mode in which binary data is received by the Modem from the MAC and transmitted to the line via the PLI. In this mode, a clock source (CLKI) is provided by the MAC to the Transmit Clock Generator 73 at twice the required bit rate. Said Clock Generator 73 produces the transmit clock (TXCLK) by dividing CLKI by two. Said TXCLK is supplied back to the MAC to be used as a clock enable signal. Data transmission from the MAC to the Modem is thereby enabled on rising edges of CLKI while TXCLK is high.

Data from the MAC is presented to the Encoder section 72 of the Modem in NRZ symbol form, encoded in 3 bits (TXSYM[2,0]). One bit is used to carry the actual binary data (0/1), the second is used to indicate the Silence condition (no transmission) and the third is used to indicate a Non Data Symbol (e.g. pre-amble). The Encoder 72 clocks in the data to be transmitted using signal TXCLK as a clock enable.

The Encoder 72 converts the data received from the MAC into a stream of digital symbols suitable for transmission over the physical medium. In one of the embodiments of the invention, the encoding scheme utilized is defined as "4B5B". This scheme represents 4-bit symbols as a selected set of 5-bit symbols chosen to ensure that the resultant data stream contains sufficient "edges" to reliably recreate the original clock frequency. In another embodiment of the invention, the encoding scheme utilized is referred to as "RLL(2,7)" wherein the maximum number of consecutive bits that does not contain a transition is limited to 7.

The output of Encoder 72 is fed to Loop Back Control 80 wherein, under software control, the transmit symbol stream may be looped back to the input of the Modem in order to verify correct functioning of the unit. Under normal conditions Loop Back Control merely passes on the signal to the output of the Modem which is connected to the PLI.

In the receive direction, data is passed from the PLI to the MAC. In this mode, the received symbol stream first passes through the RX Signal Mixer 79. This unit ORs together RX+ an RX− in order to convert a possible bipolar signal into unipolar. The resultant signal (RXD) is passed through the Loop Back Control Unit 80 to the Phase Lock Loop 78, the Line Activity Detector 77, the Preamble Detector 76 and the Decoder 75. The operation of these units will be described by assuming that initially there is no activity on the line and the receive section of the Modem is in the idle state.

The Line Activity Detector 77 monitors the received signal to determine the presence or absence of a valid signal. Once it detects that a valid signal is present, the Preamble Detector 76 is enabled This unit monitors the received signal over a predefined period to determine the presence of a valid preamble signal. Once this signal is detected the receiver clock 74 is enabled and RXCLK is generated. This signal is used as an enable signal for received data sampling.

While the Preamble Detector is operating, the Phase Lock Loop 78 is also active. This unit generates a double frequency clock (CLKO) by oversampling the received data stream and adjusting the phase of CLKO to obtain the optimum sample point.

Figure 19:
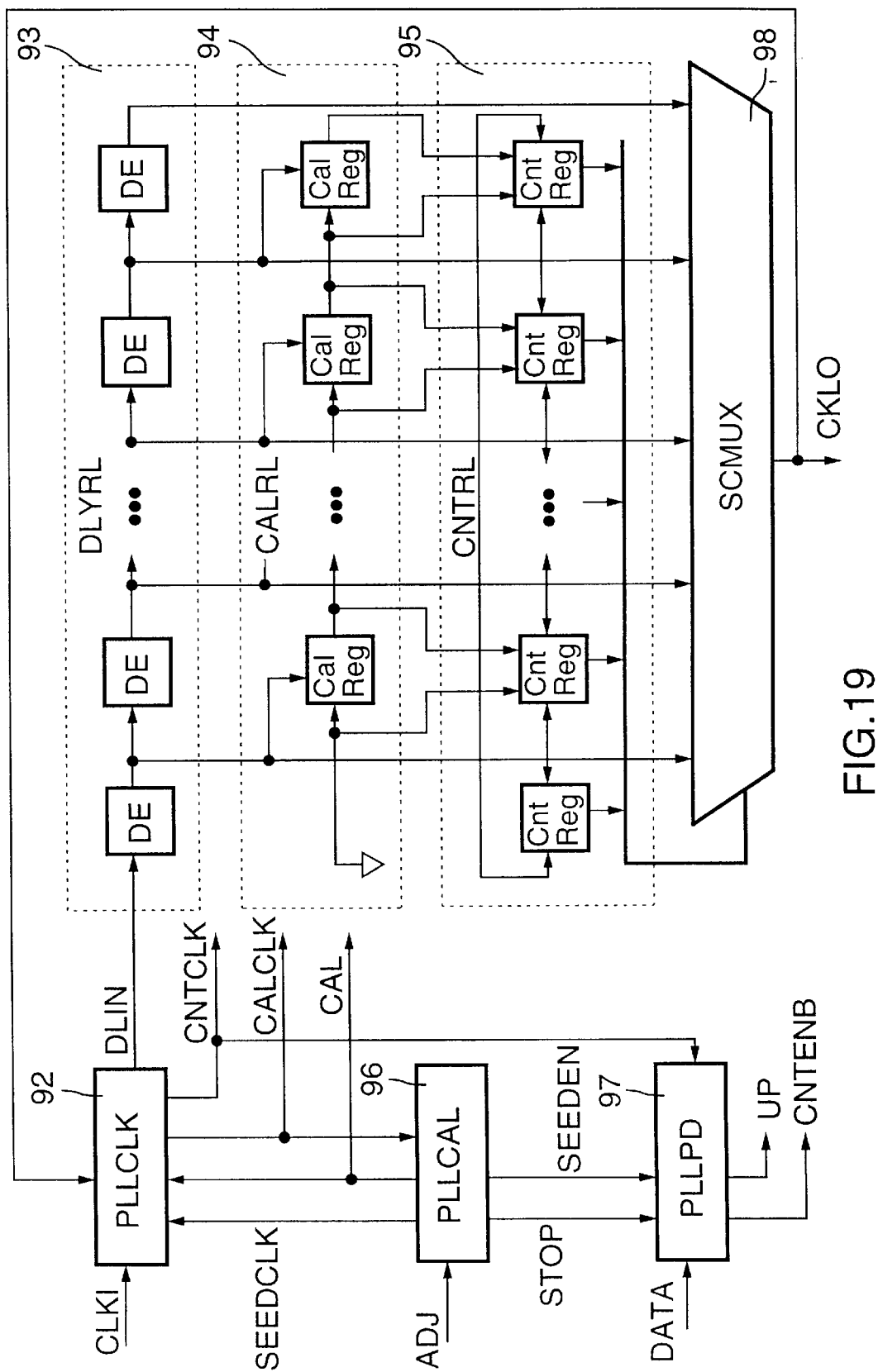
FIG. 19 represents a block diagram of a phase lock loop block of the modem subsystem according to the invention.
Figure 20A:
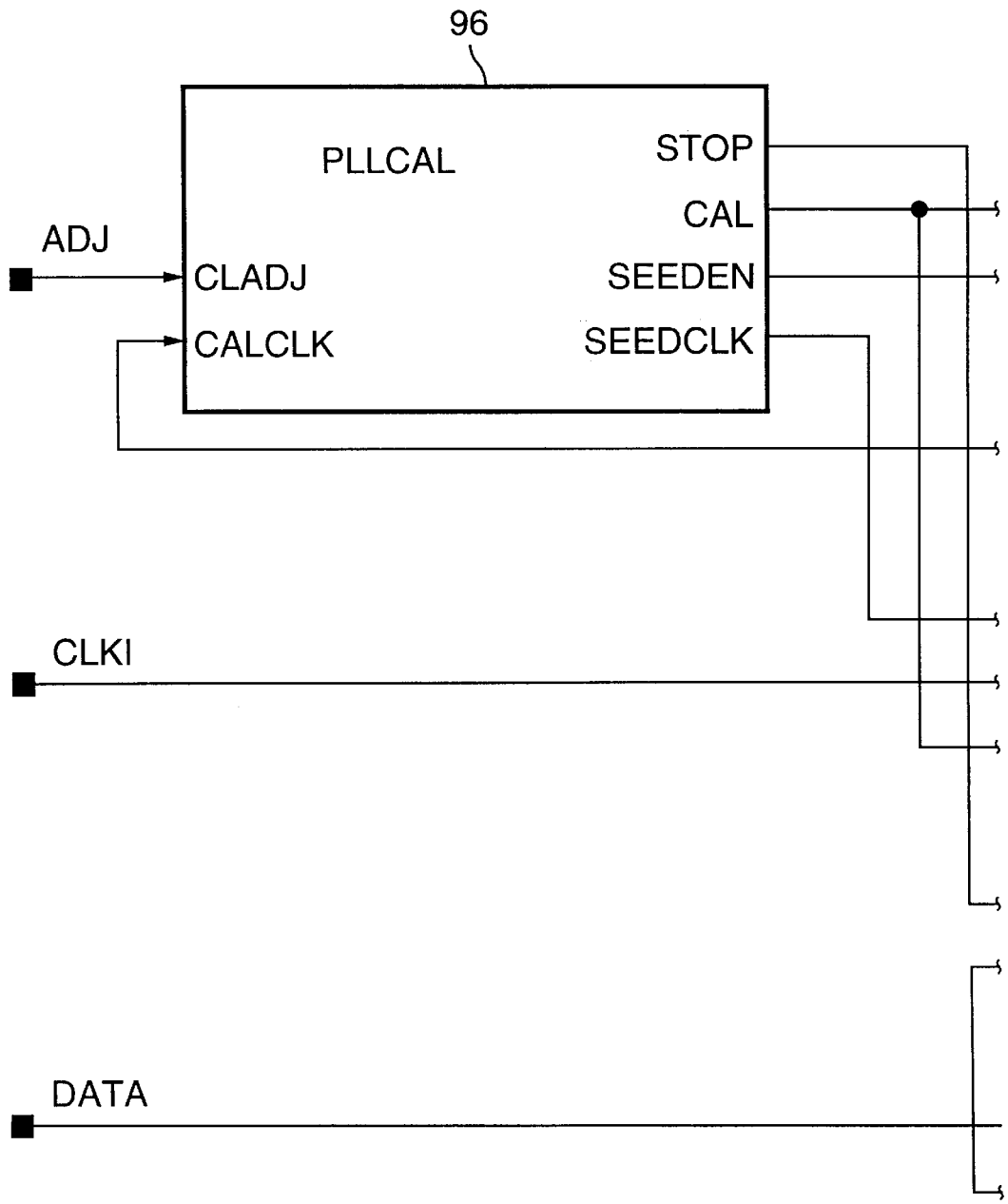
FIG. 20A–20E represent a circuit diagram of a phase lock loop block of the modem subsystem according to the invention.
Figure 20A:
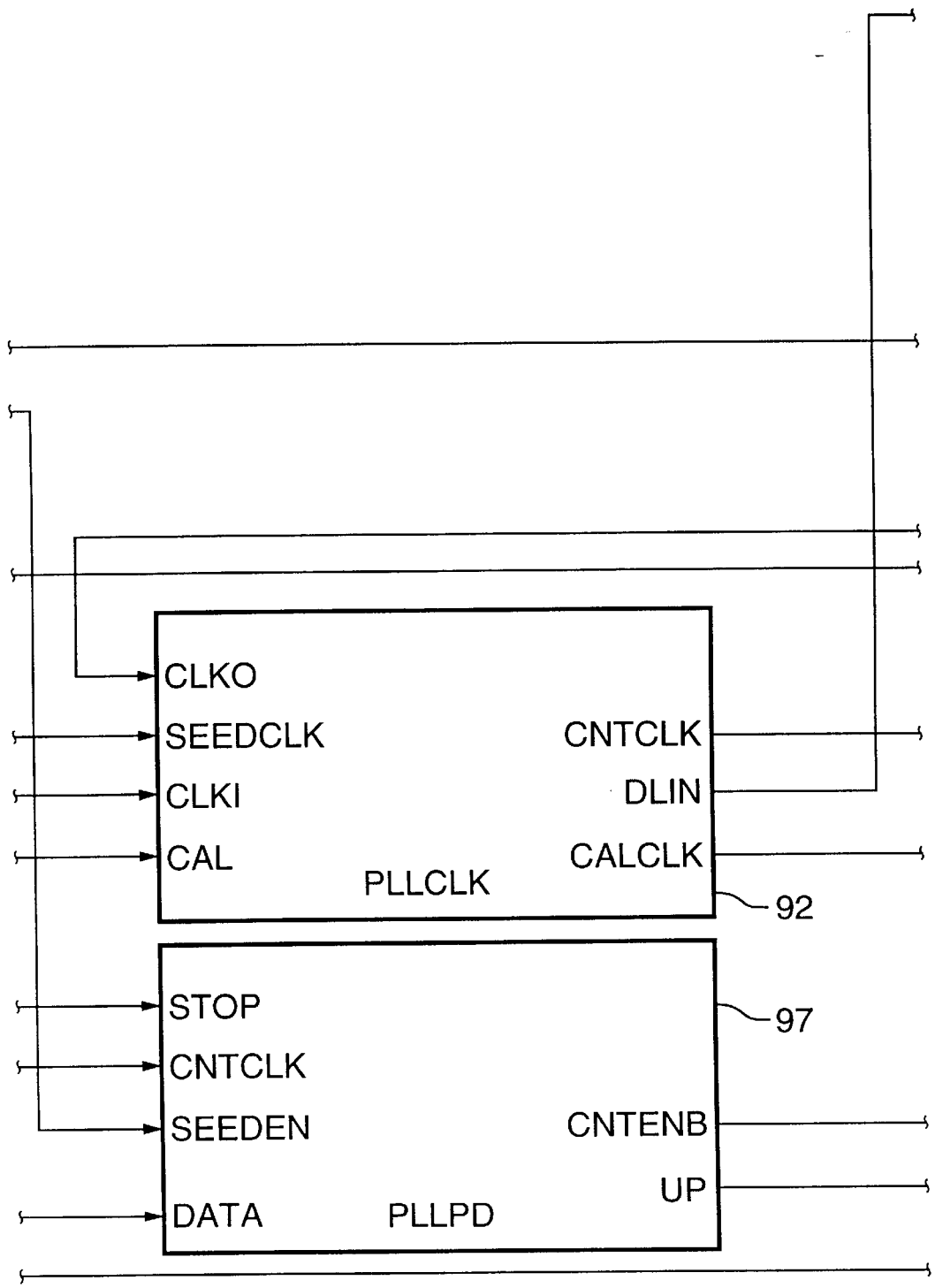
Figure 20A:
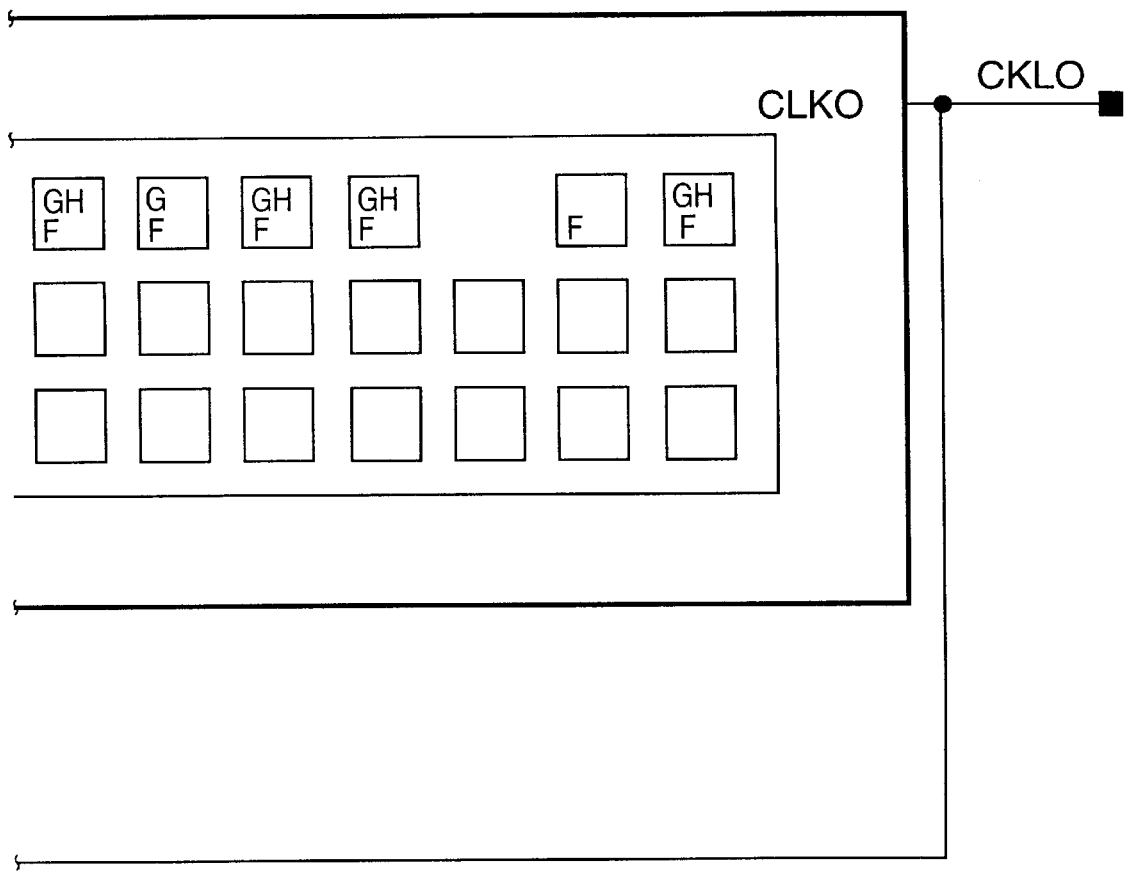
Figure 20B:
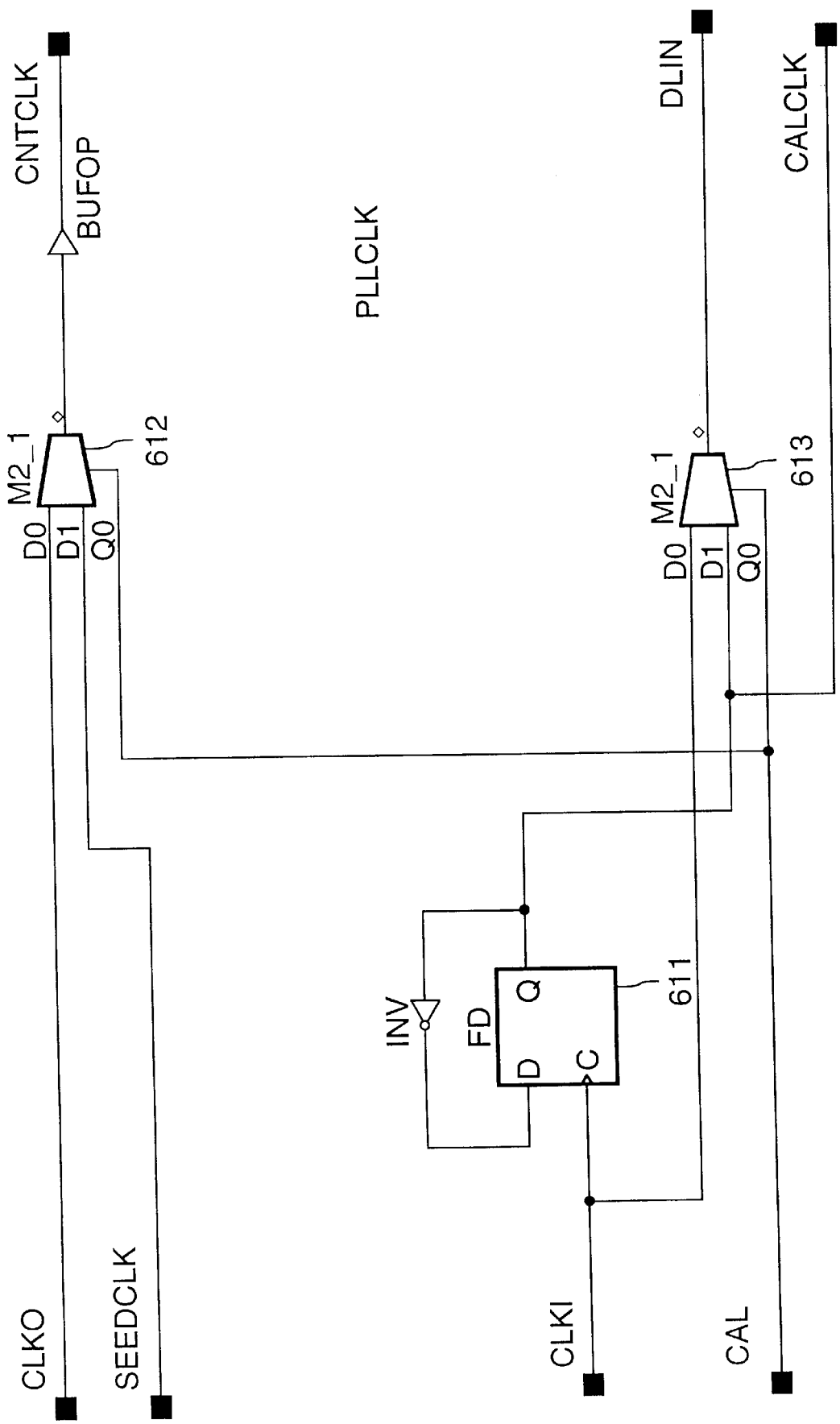
Figure 20C:
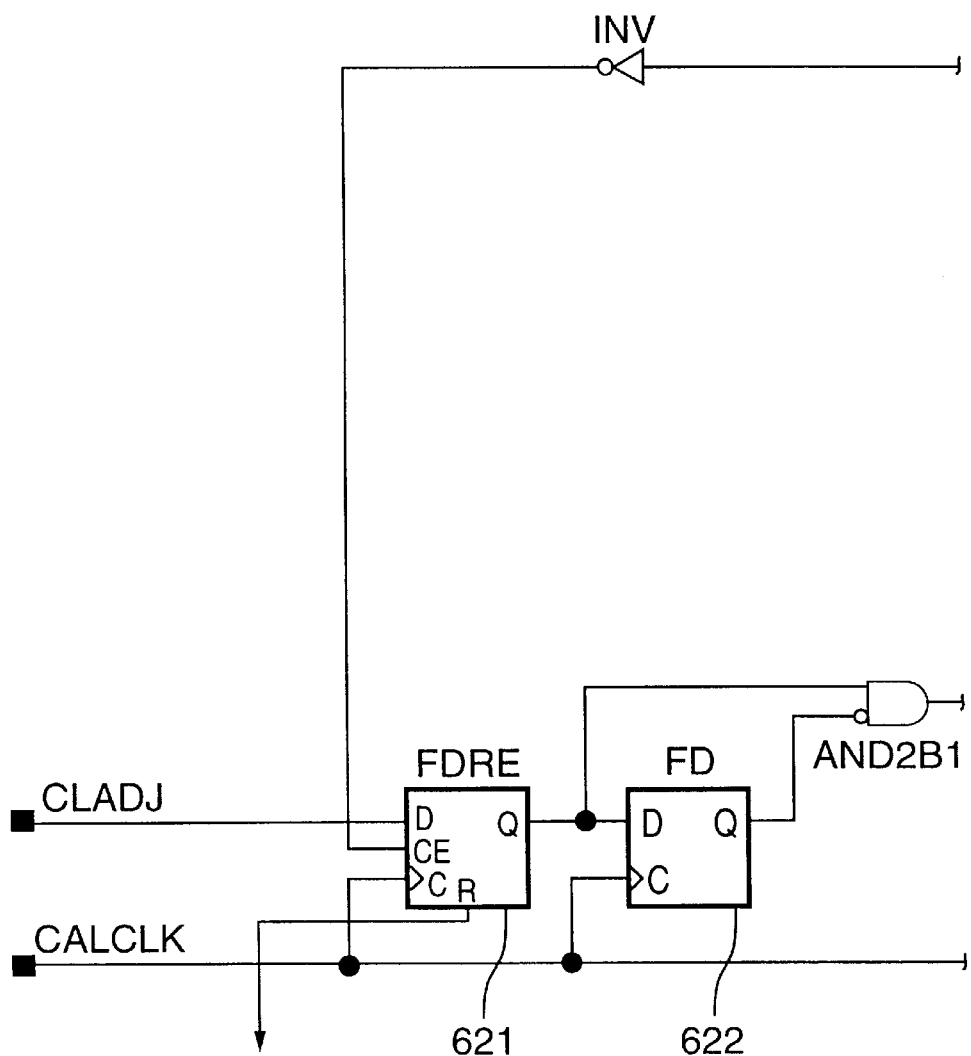
Figure 20C:
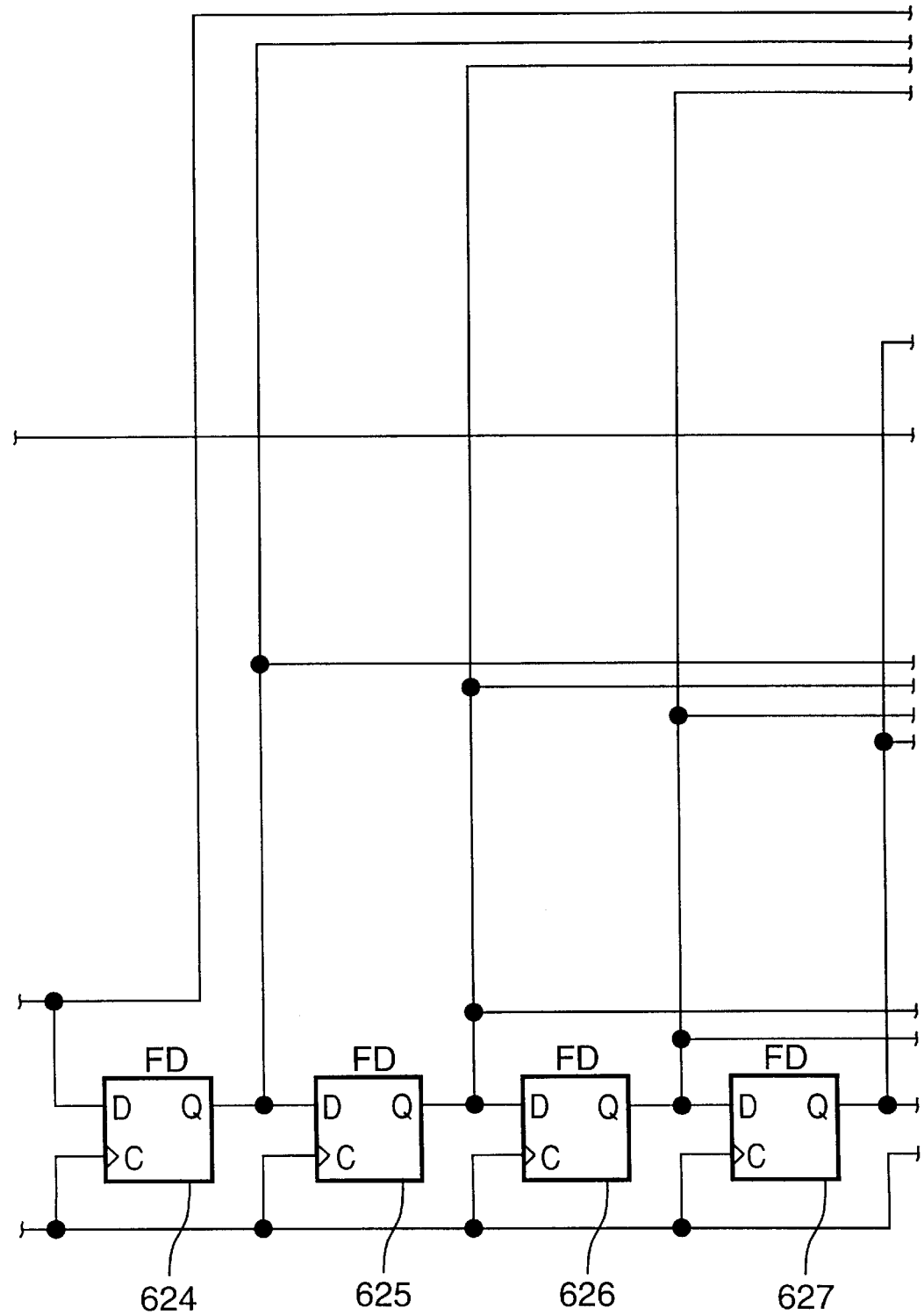
Figure 20D:
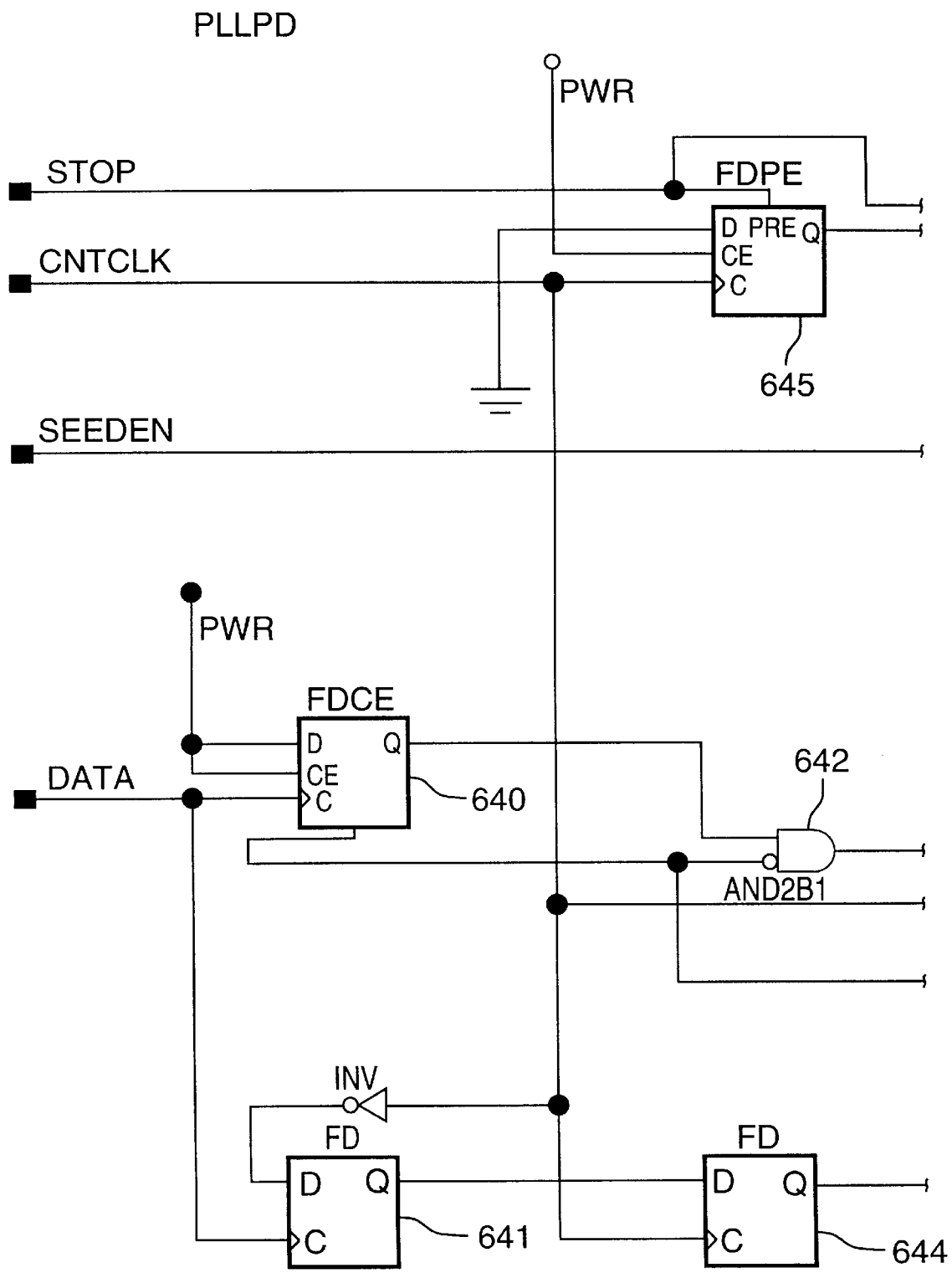
Figure 20D:
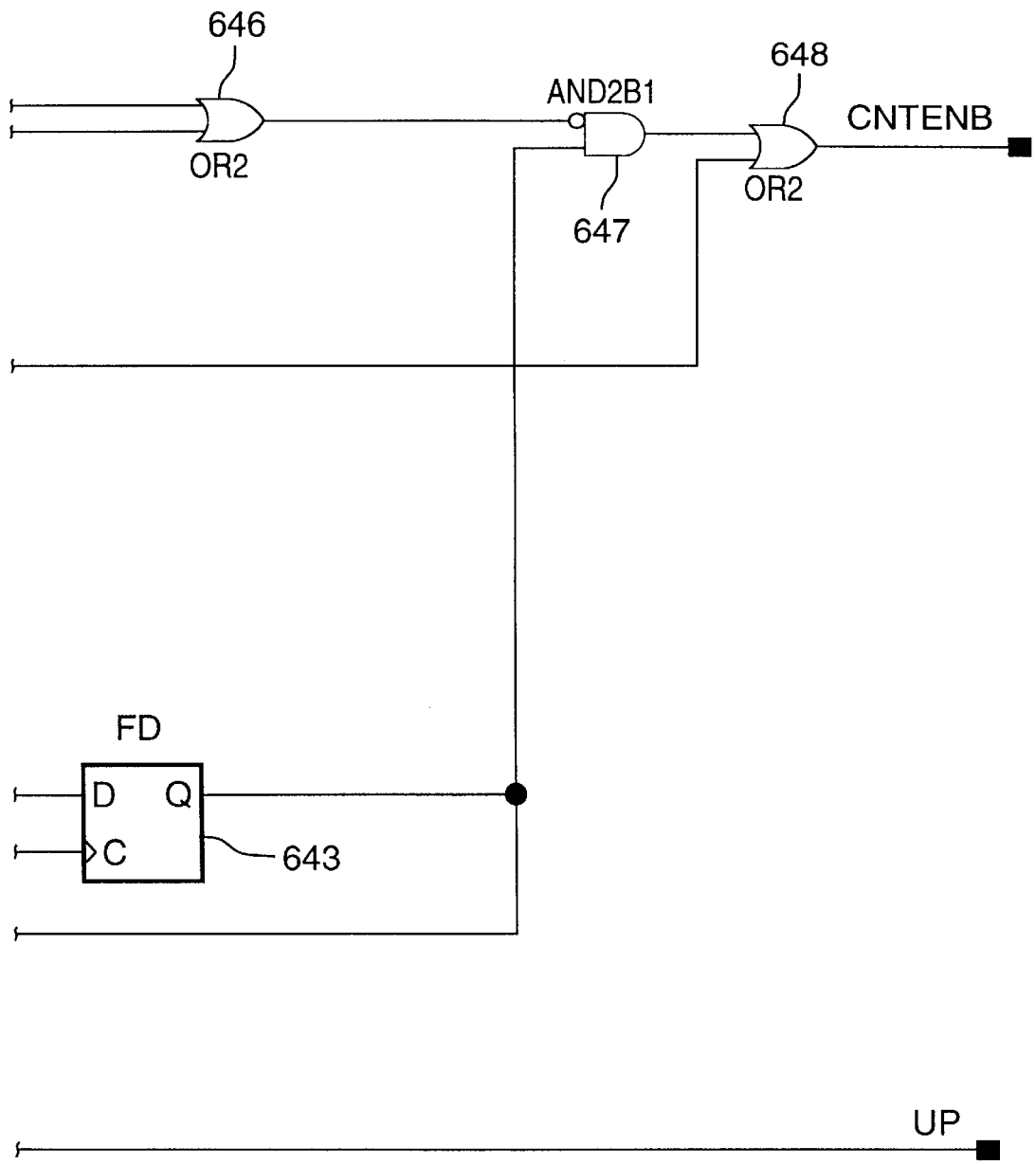
Figure 20E:
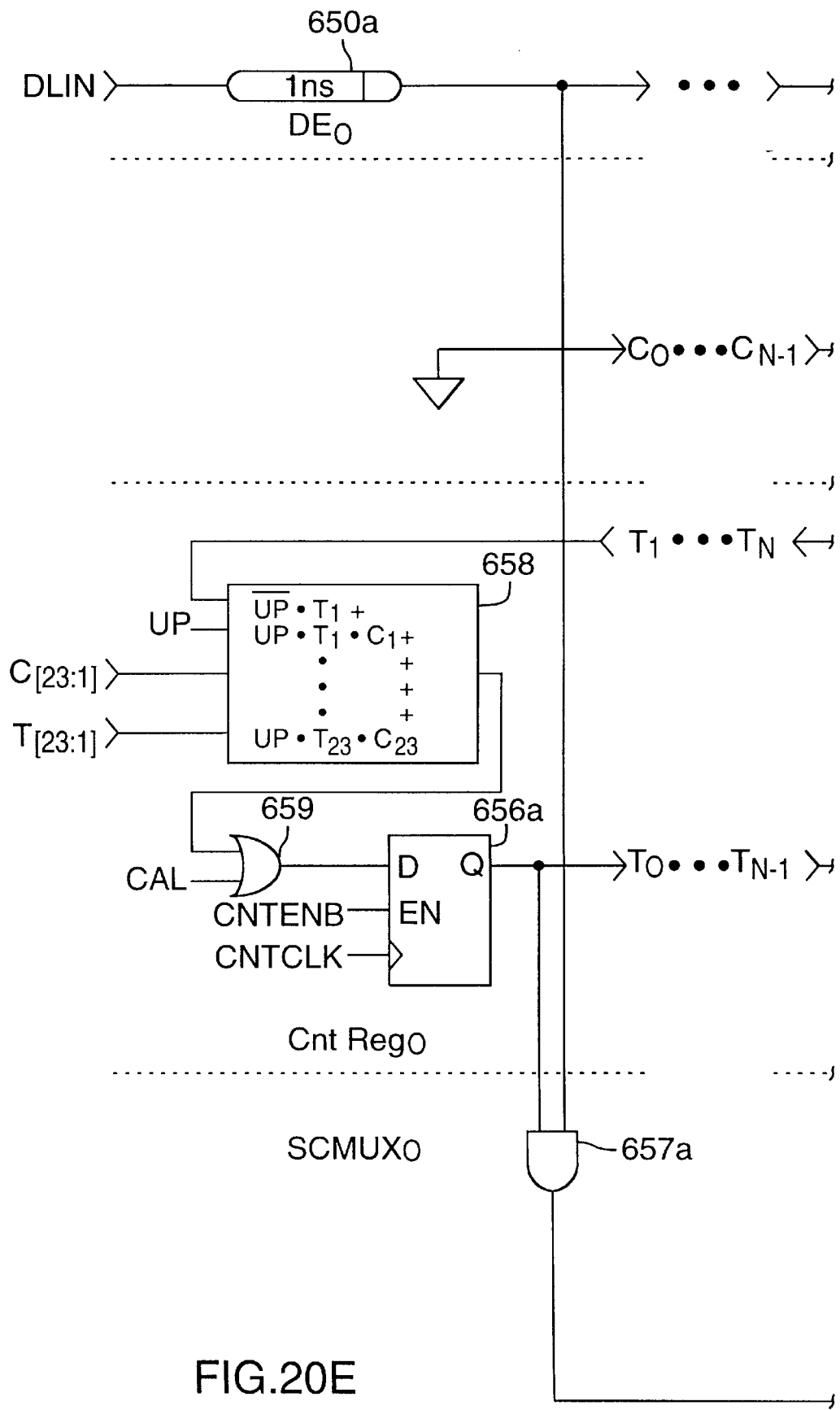
Figure 20E:
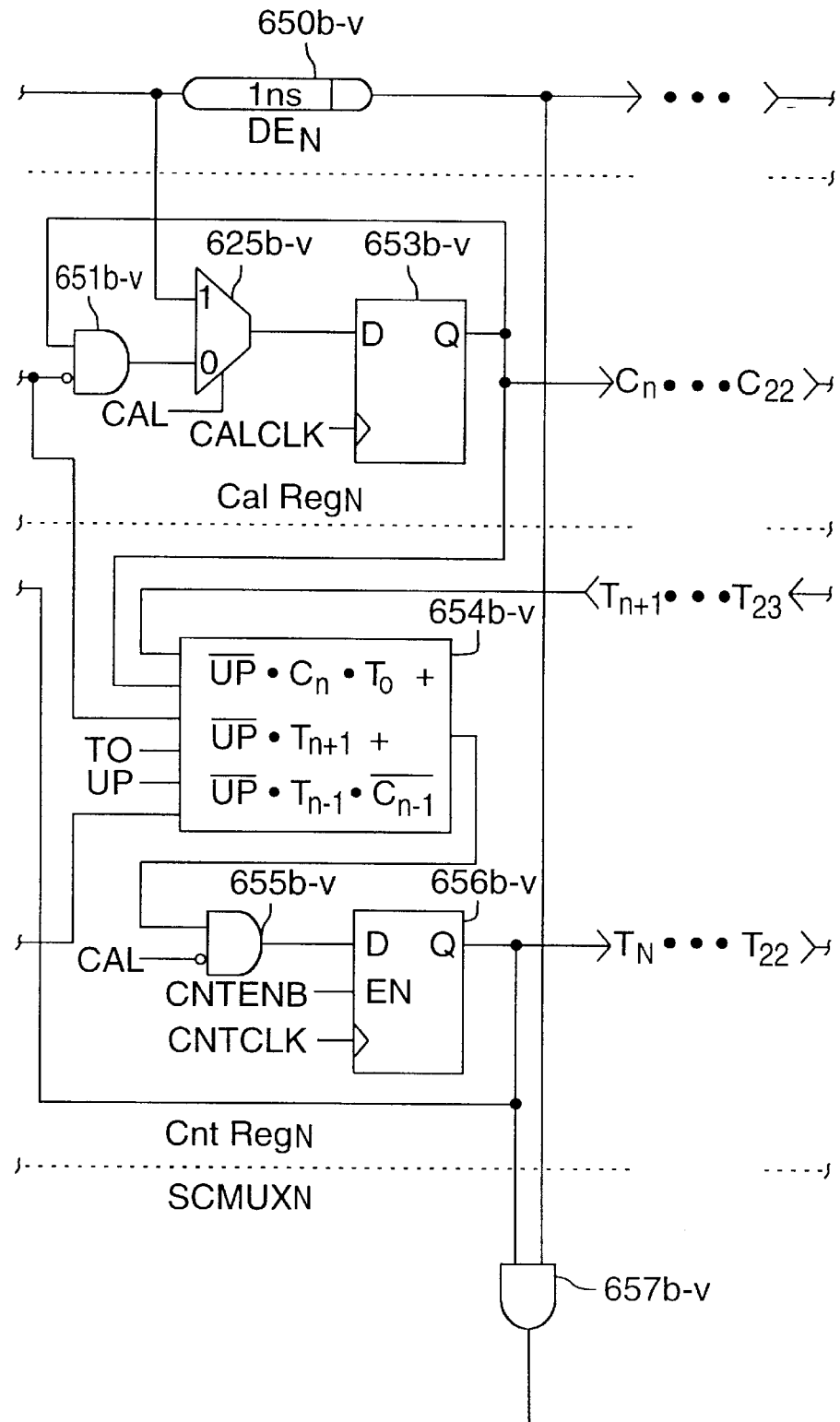
Figure 20E:
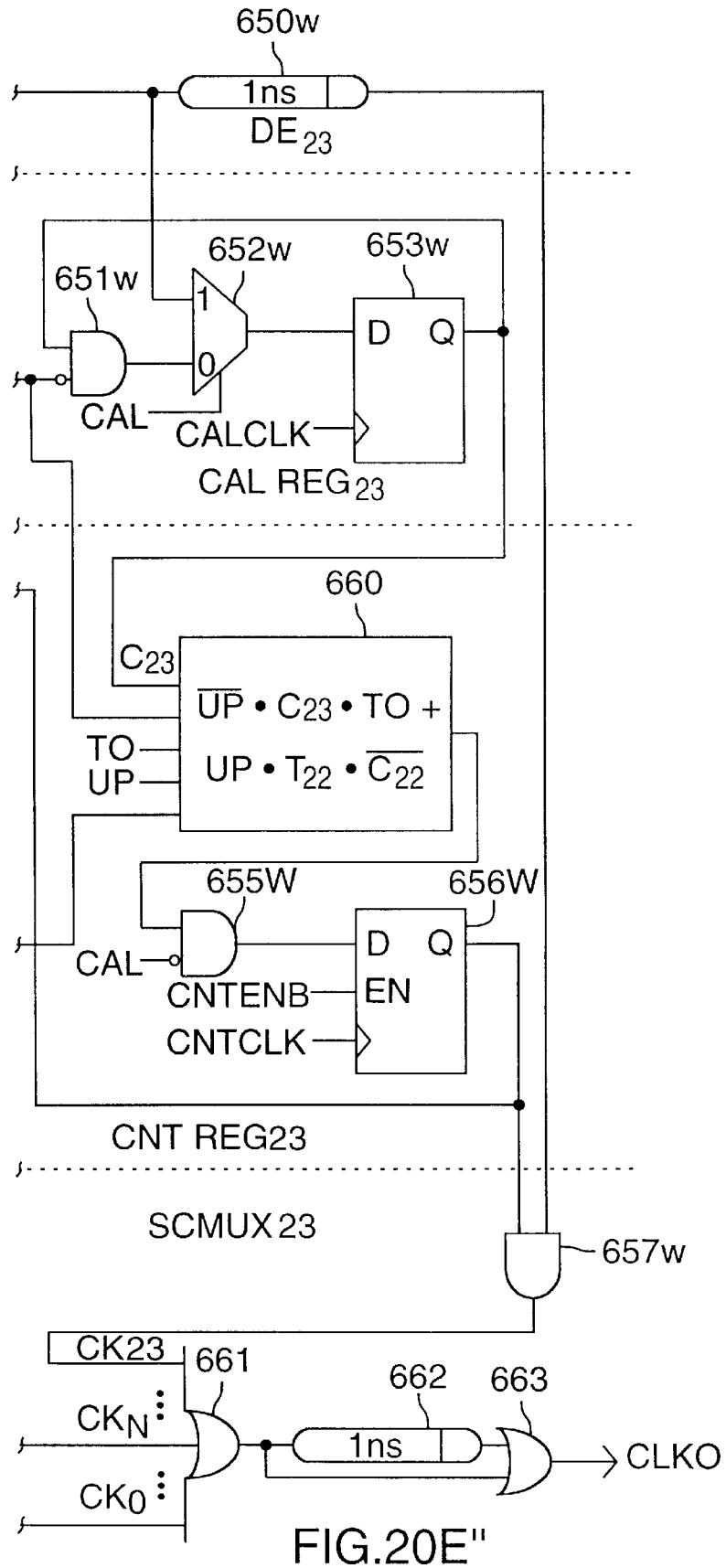
Figure 21A:
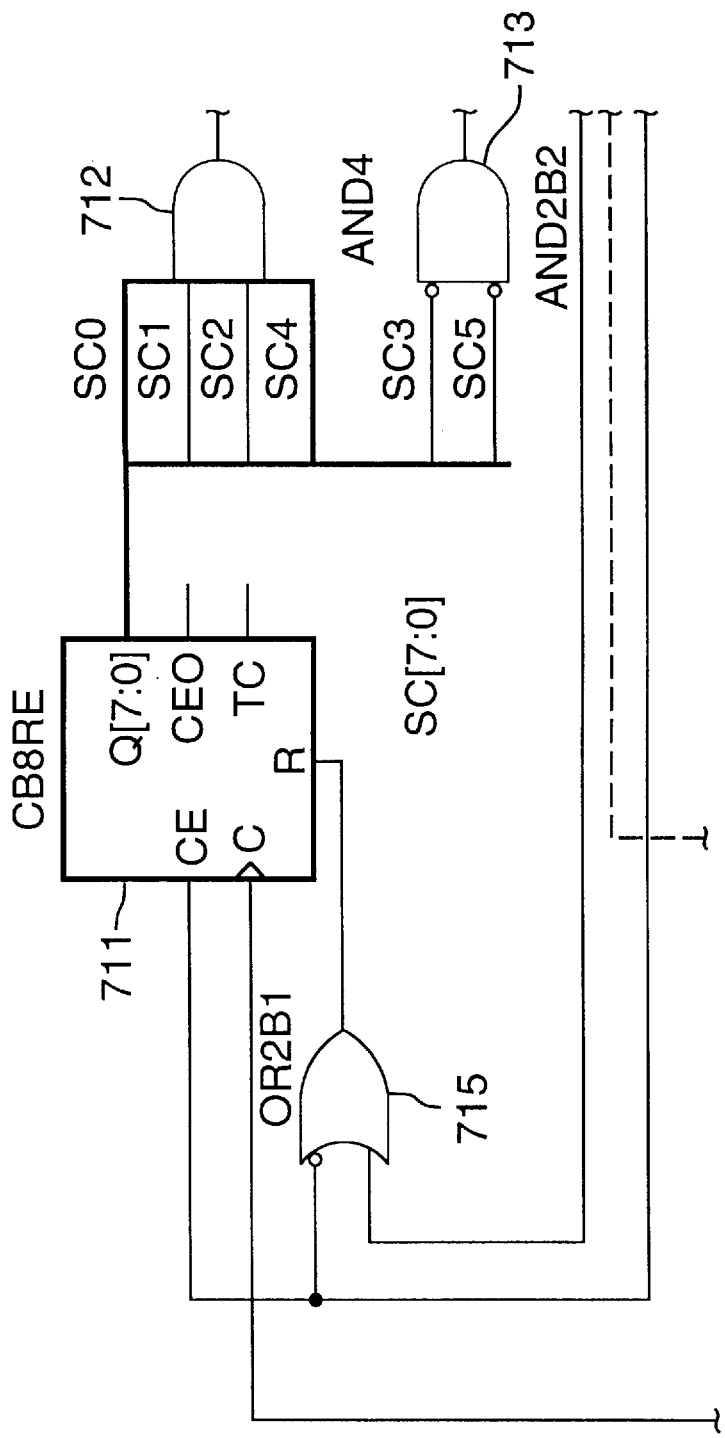
FIG. 21 represents a circuit diagram of the modem core block of the modem according to the invention.
Figure 21B:
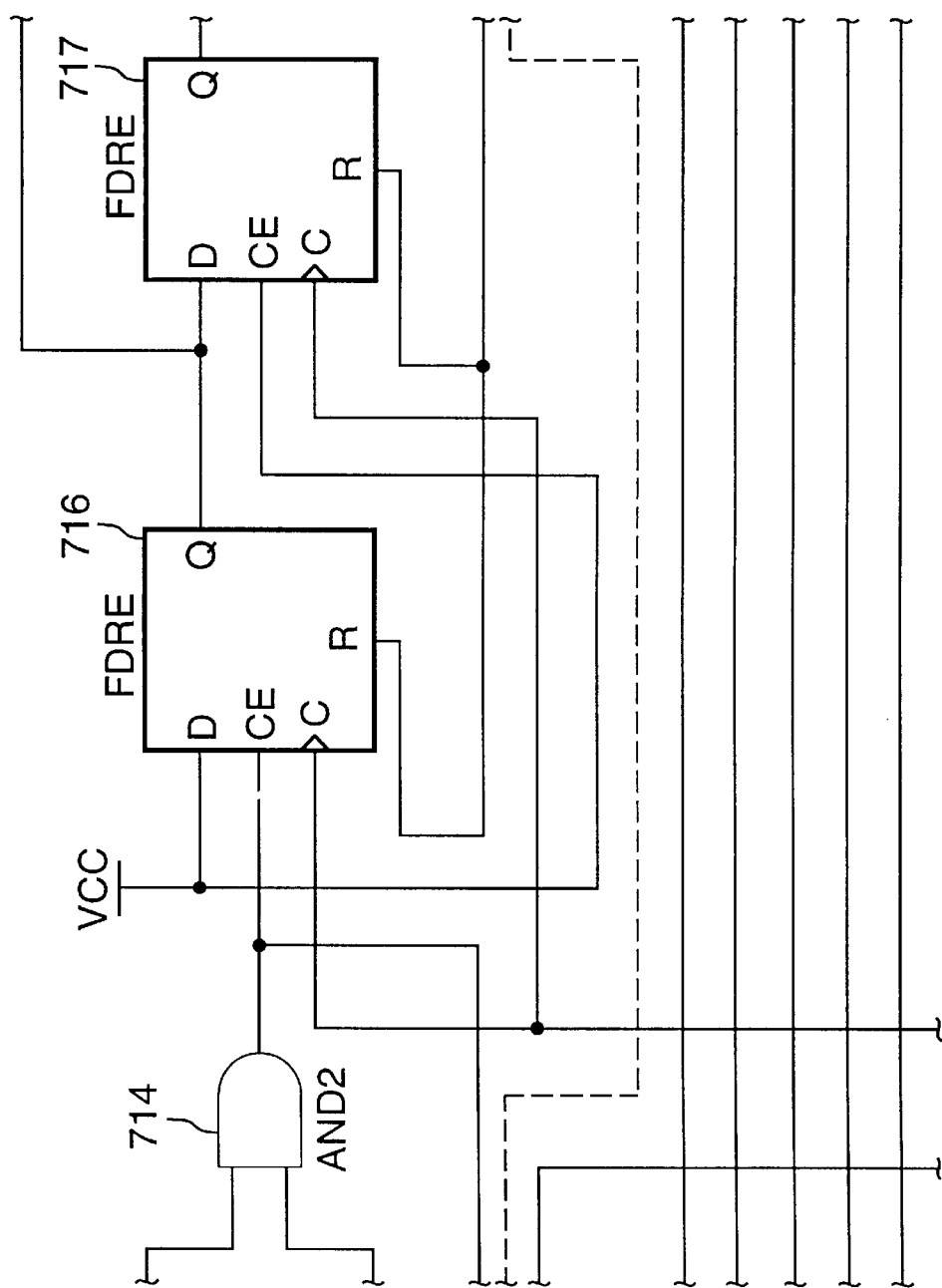
Figure 21C:
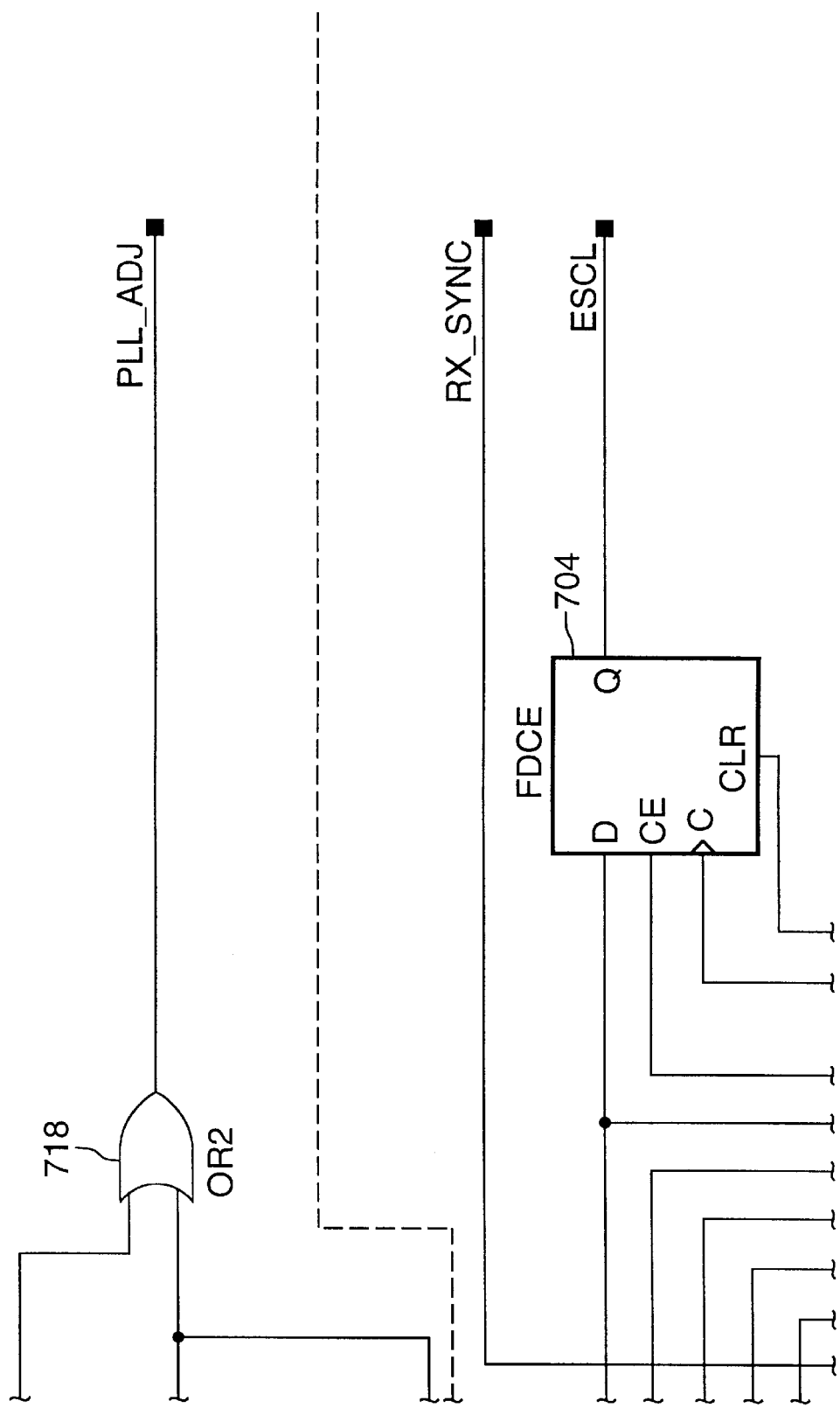
Figure 21D:
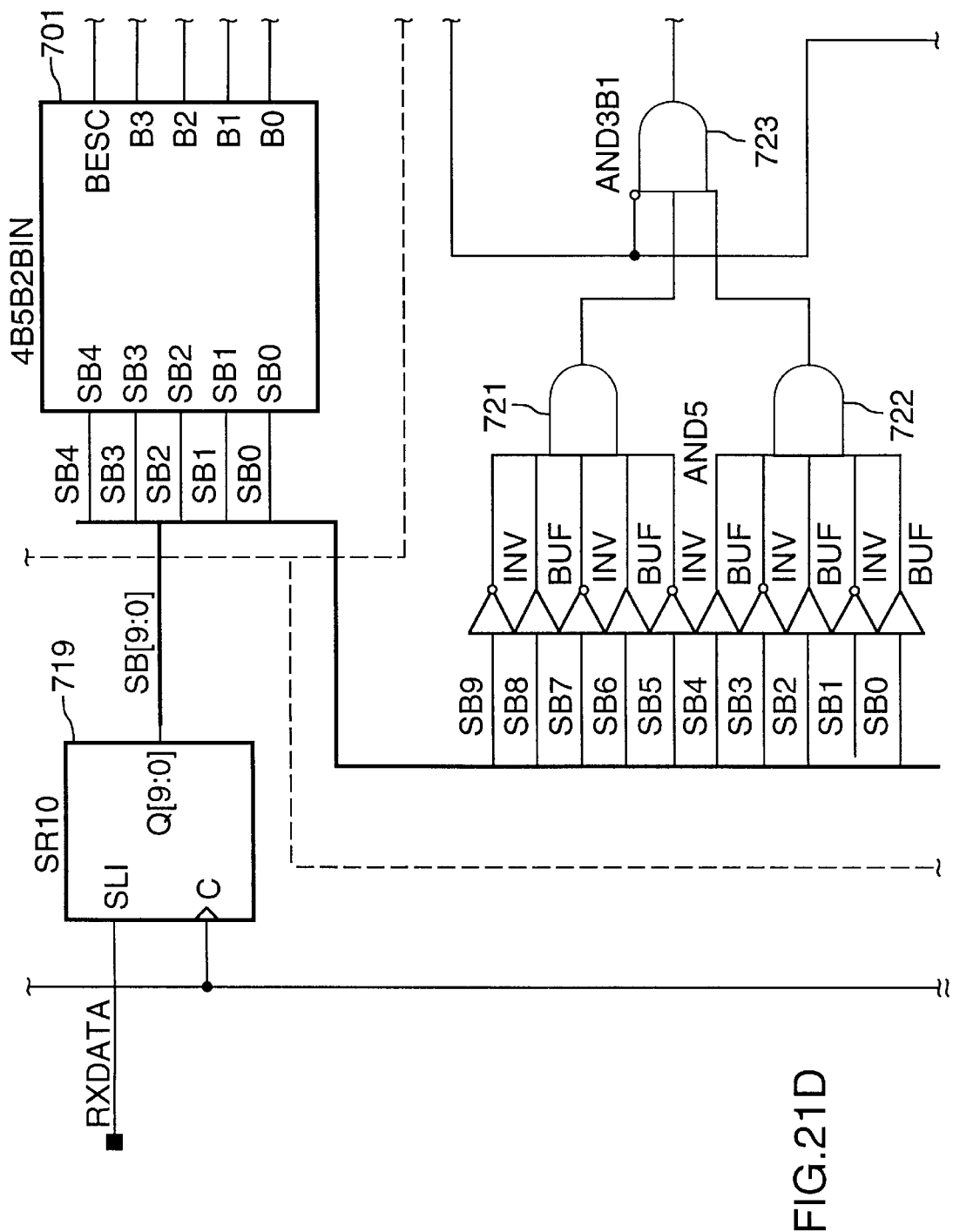
Figure 21E:
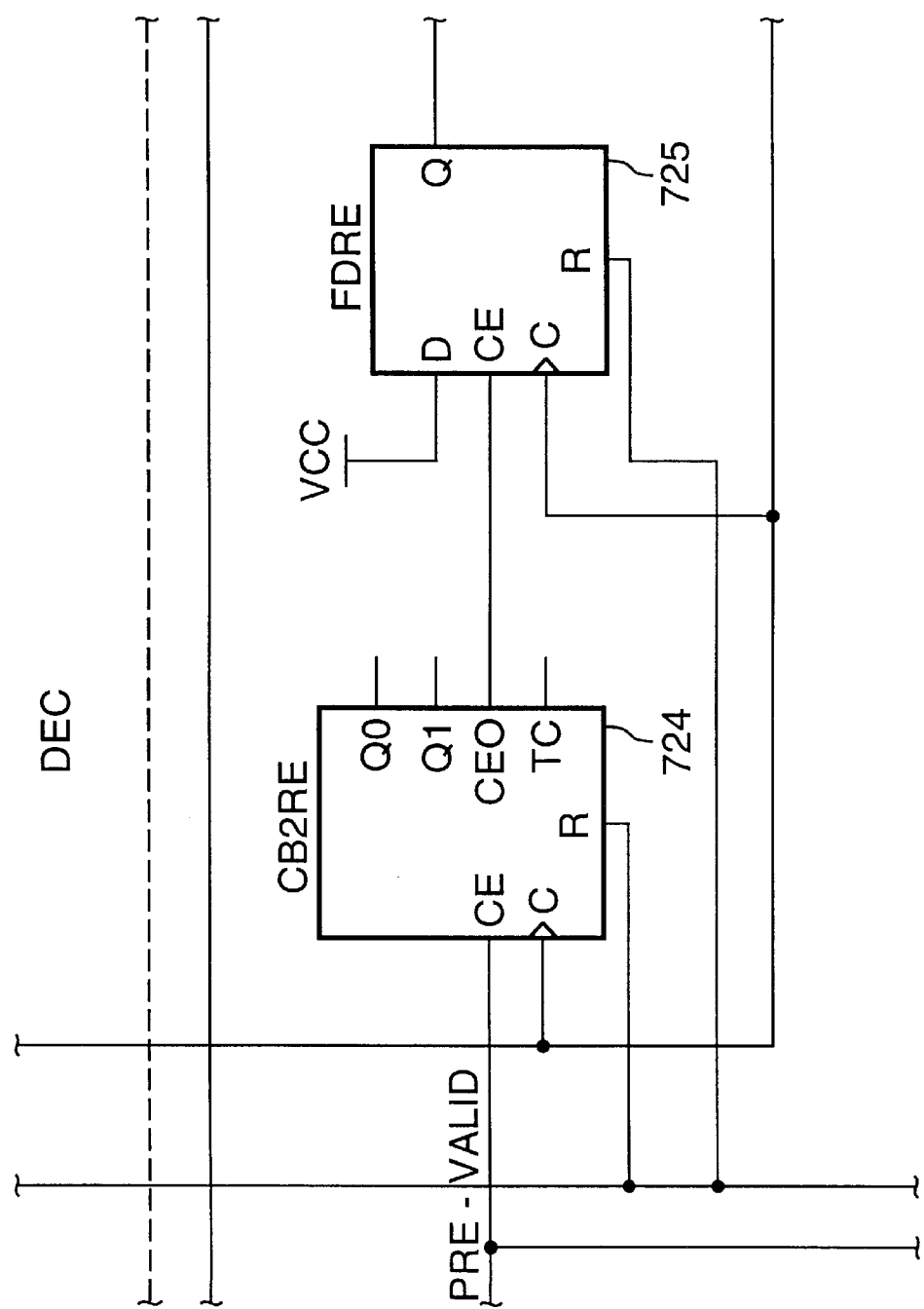
Figure 21F:
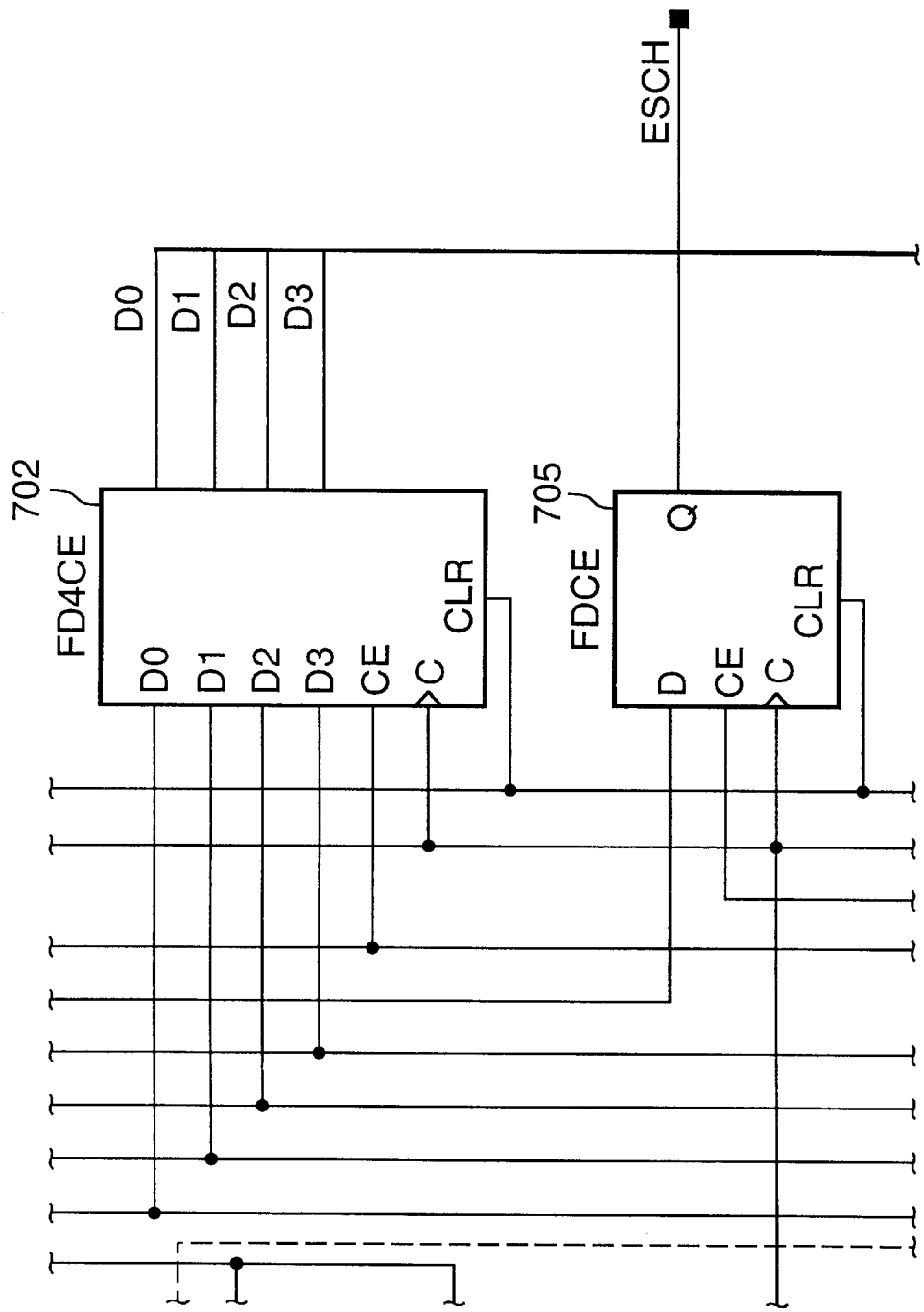
Figure 21G:
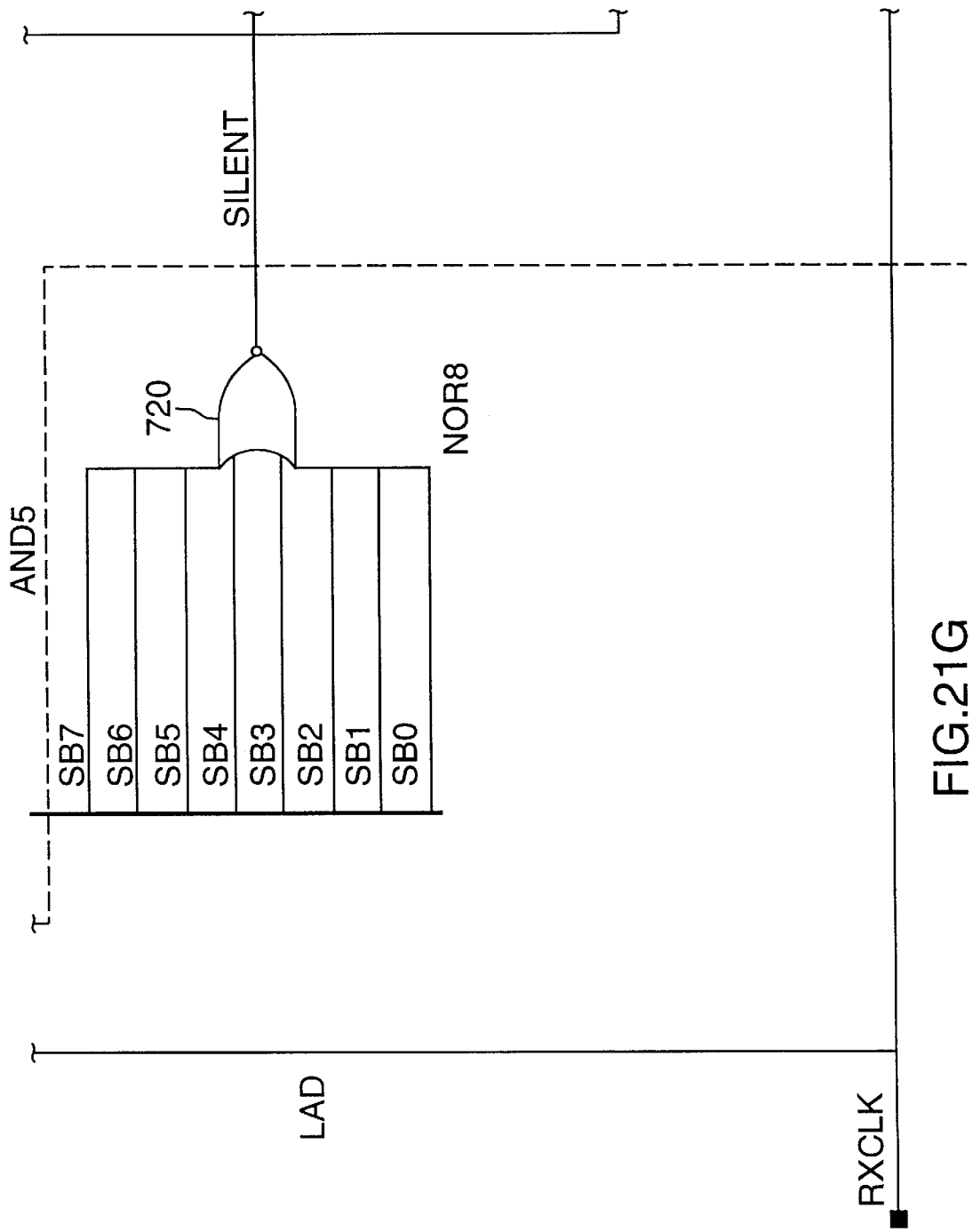
Figure 21H:
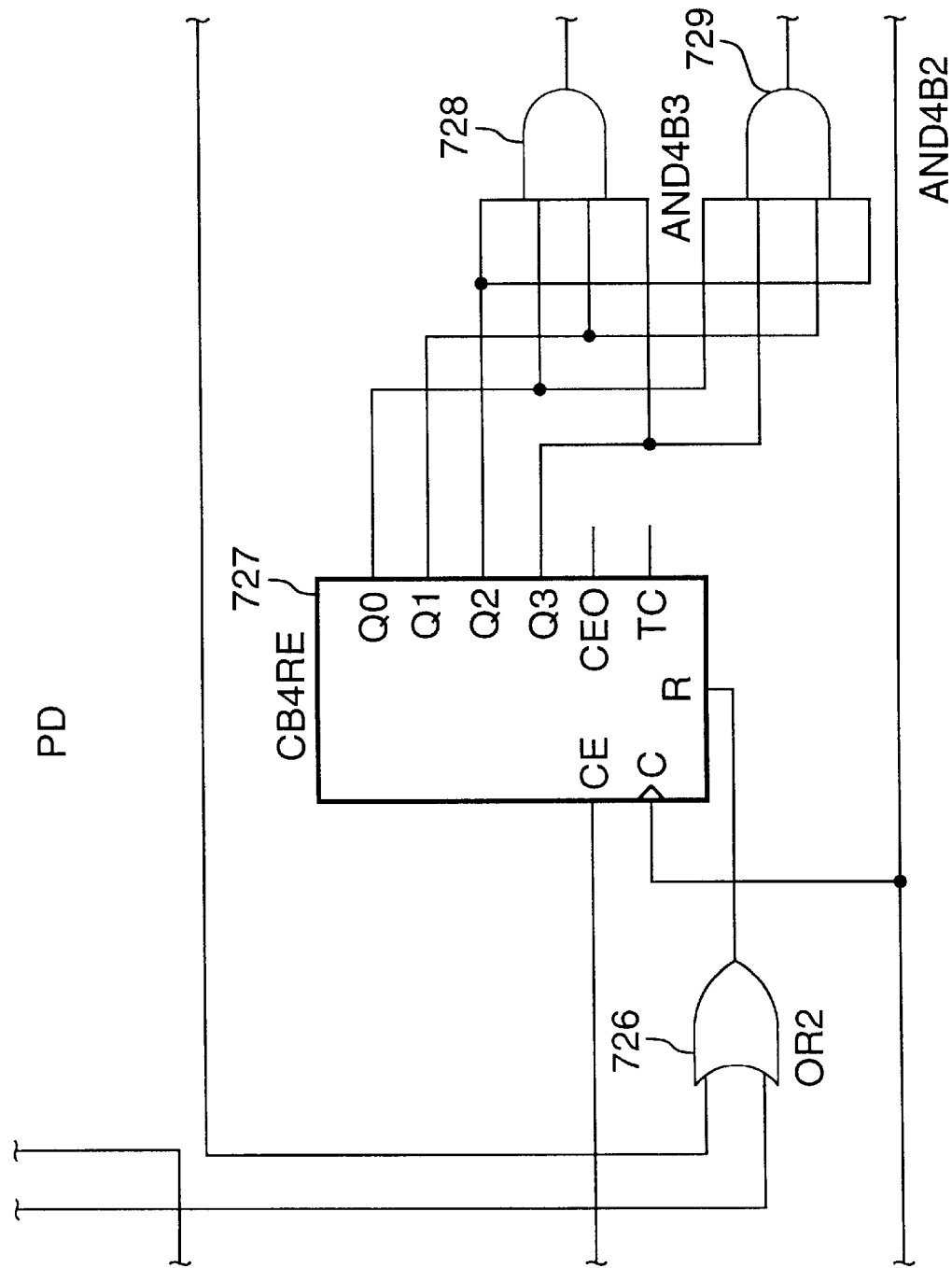

FIG. 19 is a block diagram of the preferred embodiment of the Phase Lock Loop subsystem 78 of the present invention. Its operation is described below.

The PLL comprises of a phase detector (PLLPD) 97, input clock multiplexer/divider (PLLCLK) 92, calibration state machine (PLLCAL) 96, calibration register line (CALRL) 94, counter register line (CNTRL) 95, delay line (DLYRL) 93, and synthetic clock multiplexer (SCMUX) 98.

The function of the input clock multiplexer/divider 92 is to feed the delay line 93 a full speed and a half speed clock depending on the mode of operation of the PLL. For calibration, the PLL delay line requires a half speed clock; during steady state operation, the PLL delay line requires a full speed clock.

The function of the calibration state machine 96 is to control various aspects of the PLL's operation during the calibration procedure. During calibration, the PLLCAL assures that the PLL's operation is halted and that clocks of the appropriate frequency are provided to the counter register line and the delay line.

The function of the phase detector 97 is to determine the phase relationship of input data (signal DATA) to the synthetic clock CLKO and to produce control signals to the counter register line 95 which will allow the PLL to reduce the phase error between DATA and CLKO.

The delay line 93 is composed of 24 serially-linked delay elements arranged in a linear chain. The delay line is laid out such that the propagation delay, including wire delays, between each link is of a uniform value. Each delay element comprises of a series of gates which impose a nominal propagation delay of one nanosecond.

The calibration register line 94 is a series of gates and flip-flops which are equal in their number to one less than the count of delay elements. The function of the CALRL is, during a calibration sequence, to determine how many delay elements are required to generate a delay which is equal to the cycle time of the input clock CLKI.

The counter register line 95 is a series of gates and flip-flops which are equal in their number to the count of delay elements. In essence, the counter register line is a bidirectional shift-register in which only one output is ever high. The function of the CNTRL is to, according to to its present state (or count), select one particular delay line tap (or phase of the clock passing though the delay line) and present it as the active phase of the synthetic clock. By providing direction and clocking signals to the counter, the count may be changed up or down, and, subsequently, the phase of the synthetic clock may be advanced or retarded.

The function of the synthetic clock multiplexer 98 is to derive an output clock signal CLKO from one of the taps in the delay line which corresponds with the count value of the counter register line.

FIG. 20A–E is a circuit diagram of the preferred embodiment of the Phase Lock Loop section of the present invention. Its operation is described below.

The PLL comprises of a phase detector (PLLPD) 97, input clock multiplexer/divider (PLLCLK) 92, calibration state machine (PLLCAL) 96, calibration register line (CALRL) 94, counter register line (CNTRL) 95, delay line (DLYRL) 93, and synthetic clock multiplexer (SCMUX) 98.

Input Clock Multiplexer/Divider

The function of the input clock multiplexer/divider 92 is to feed the delay line a full speed and a half speed clock depending on the mode of operation of the PLL. For calibration, the PLL delay line requires a half speed clock; during steady state operation, the PLL delay line requires a full speed clock.

The source clock is generated by an external crystal oscillator which provides a 50 MHz 50% duty-cycle TTL signal referred to as CLKI. A divide-by-two circuit comprising of a D flip-flop 611 reclocking its own inverted output divides CLKI by two and generates half speed clock CALCLK.

Besides switching a half speed/full speed clock to the delay line, the PLLCLK is also required to produce a clock for the counter register line. During steady state operation the CNTRL uses the synthetic clock (referred to as CLKO). However, when the PLL is first powered up and is in an uncalibrated state, the synthetic clock is inactive. For that reason, a special clock referred to as SEEDCLK is generated by the calibration state machine to bootstrap the PLL's synthetic clock.

The PLLCLK thus contains two separate multiplexers 612 & 613, both of which are controlled by a signal referred to as CAL and which is produced by the calibration state machine 96. When signal CAL is high, the multiplexers are switched to produce the clocks required for calibration.

When signal CAL is high, multiplexer 613 switches CALCLK to the delay line and multiplexer 612 switches SEEDCLK to to the counter register line. When signal CAL is low, multiplexer 613 switches CLKI to the delay line and multiplexer 612 switches CLKO to the counter register line.

The signal produced by the output of multiplexer 612 which switches between CLKO and SEEDCLK is referred to as CNTCLK. The signal produced by the output of multiplexer 613 which switches between CLKI and CALCLK is referred to as DLIN.

Calibration State Machine

The function of the calibration state machine is to control various aspects of the PLL's operation during the calibration procedure. During calibration, the PLLCAL assures that the PLL's operation is halted and that clocks of the appropriate frequency are provided to the counter register line and the delay line.

An input signal referred to as ADJ (adjust) is the trigger for calibration activation. The clock used by the PLLCAL is CALCLK and is a free-running clock that is produced by the PLLCLK by dividing CLKI by two.

An edge detector, comprising of a two-bit shift register 621, 622 with the first output ANDed with the inverted second output in device 623 is used to synchronize signal ADJ with CALCLK. The output of the edge detector goes high for one CALCLK cycle when a transition on ADJ is detected. The output of the edge detector is allowed to ripple through a 5-bit shift register 624–628. The calibration process lasts as long as it takes the edge detector pulse to be clocked through to the final stage of the shift register by CALCLK. The edge detector is prevented from firing again while the calibration is in progress by gating the clock enable of the first edge detector flip-flop 621 with a signal that senses that the state machine is active. This blocking signal is an inverted version of signal STOP which is discussed below.

Signal STOP is produced by the PLLCAL while calibration is active by ORing the edge detector output and all five state machine shift register outputs in devices 629 & 630. Besides preventing the edge detector from retriggering during calibration, signal STOP also prevents the phase detector from providing clock enables to the counter register line (see Phase Detector).

Signal CAL is produced by ORing the outputs of PLL-CAL shift register outputs 1, 2, 3 and 4 in device 631. CAL is used to control the PLLCLK and the calibration register line.

Signal SEEDEN is produced by ORing the outputs of PLLCAL shift register outputs 2 and 3 in device 632. SEEDEN is used to enable counter register line clock enables by the phase detector during a specific interval in the calibration procedure (see Counter Register Line).

Signal SEEDCLK is produced by the third output of the PLLCAL shift register 626. SEEDCLK is a rising edge produced during the interval that SEEDEN is active to clock an inital post-calibration count value into the counter register line (see Counter Register Line).

The PLLCAL is in state 0 when idle and transitions in sequence through states 1 to 6 before returning to state 0. The state of the various output signals during each state are tabulated below.

TABLE 2

Calibration State Machine

| State | STOP | CAL | SEEDEN | SEEDCLK |
|---|---|---|---|---|
| 0 | 0 | 0 | 0 | 0 |
| 1 | 1 | 0 | 0 | 0 |
| 2 | 1 | 1 | 0 | 0 |
| 3 | 1 | 1 | 1 | 0 |
| 4 | 1 | 1 | 1 | 1 |
| 5 | 1 | 1 | 0 | 0 |
| 6 | 1 | 0 | 0 | 0 |

Phase Detector

The function of the phase detector is to determine the phase relationship of input data (signal DATA) to the synthetic clock (CLKO) and to produce control signals to the counter register line which will allow the PLL to reduce the phase error between DATA and CLKO.

The ideal phase relationship towards which the phase detector strives is one in which CLKO rises one half CLKO cycle after the rising edge of DATA. During normal (i.e. phase-locked) operation, CLKO is routed to CNTCLK. This relationship between CLKO and CNTCLK must be considered during the following operational description.

A D flip-flop 641 that is clocked by DATA and which samples inverted CNTCLK produces a counter direction signal. This signal is synchronized by reclocking it through a flip-flop 644 using CNTCLK. The resultant output is a signal referred to as UP and is active high. The UP signal is used in the counter register line and determines in which direction the count proceeds.

A one-shot, comprising of two flip-flops 640 & 643, detects rising edges on signal DATA by clocking a high into the first flip-flop using DATA as a clock and then clocking that high into the second flip-flop while using CNTCLK as a clock. The output signal of flip-flop 643 asynchronously clears flip-flop 640 and synchronously clears the second flip-flop via device 642. The one-shot thus produces a one CNTCLK cycle-long high every time that there is a rising edge on the DATA signal. The output of the one-shot, subject to some gating which is discussed below, is referred to as CNTENB and is used as a clock enable for the flip-flops in the counter register line.

When calibration is being performed and signal STOP is active, CNTENB is blocked to prevent phase adjustments during calibration. Signal stop asynchronously presets flip-flop 645 which is clocked by CNTCLK and whose input is tied low. The output of flip-flop 645 is ORed with STOP in device 646 to disable AND gate 647 which gates CNTENB.

The blocking action of STOP on CNTENB is overridden by ORing SEEDEN with the final CNTENB signal in device 648. This allows SEEDCLK to clock the counter register line when SEEDEN is active during a specific period within the calibration procedure (see Calibration State Machine).

Delay Line

The delay line DLYRL 93 is composed of 24 serially-linked delay elements 650a–650w arranged in a linear chain. The delay line is laid out such that the propagation delay, including wire delays, between each link is of a uniform value. Each delay element comprises of a series of gates which impose a nominal propagation delay of one nanosecond.

The beginning of the delay line is fed with signal DLIN which is produced by the PLLCLK 92. Signal DLIN is a free-running clock that runs at either the speed of input clock CLKI during steady state operation or at half the speed of CLKI during calibration.

Connection points between delay elements are referred to as Delay Line Taps and are numbered in ascending magnitude from the input to the delay line. Taps are individually sampled by the flip-flops of the calibration register line and the multiplexing gates of the synthetic clock multiplexer.

Calibration Register Line

The calibration register line (CALRL) 94 is a series of gates and flip-flops which are equal in their number to one less than the count of delay elements. The function of the CALRL is, during a calibration sequence, to determine how many delay elements are required to generate a delay which is equal to the cycle time of the input clock CLKI.

The manner in which a CLKI cycle time is measured and stored is by dividing CLKI by two, propagating the half-speed clock through the delay line, and then latching the crossing point of the slower clock.

The calibration state machine 96 controls the calibration sequence by first issuing signal STOP (state 1) which halts the PLLPD 97 and prevents clocking of the counter register line. Each calibration state lasts two CLKI cycles since CALCLK is used to clock the calibration state machine. State 2 involves application of the signal CAL which switches DLIN to a half-speed clock and forces each calibration register line flip-flop 653b–653w to sample the delay line tap immediately before it through a multiplexer 652b–652w. (Note that the leftmost calibration register line flip-flop 653a, if included, would have no tap to sample and is therefore left out with a fixed level of '0' being substituted for its output).

Each calibration register line flip-flop 653b–653w is gated by a two-input multiplexer 652b–652w. When signal CAL is high, the multiplexer switches the output of the tap to the left to the input of the flip-flop. Conversely, when CAL is low, the multiplexer switches in a signal from AND gate 651a–651w which ANDs the output of the flip-flop, $C_N$, with the inverted output of the calibration register line flip-flop immediately to the left, $C_{N-1}$. That has the function of clocking a '0' into the flip-flop if the flip-flop to the left is '1'.

States 3, 4 and 5 of the PLLCAL do not affect the CALRL. During state 6, signal CAL is low and, as described above, the multiplexer 652b–652w flushes a high clocked into the flip-flop during calibration if the flip-flop to the left also clocked a high during calibration. In that manner, only one flip-flop in the calibration register line remains high and marks the position in the delay line where the half-cycle crossing of CALCLK occurred.

During state 0, signal STOP is deactivated and steady state operation of the PLL commences or resumes.

The solitary CALRL flip-flop which remains high after calibration is used as a reference point by the counter register line to determine at what count of the counter chain to wrap back and forth between zero and 360 degrees phase of the synthetic clock (see below).

Counter Register Line

The counter register line (CNTRL) 95 is a series of gates 654b–654v, 655b–655w, 658–660 and flip-flops 656a–656w which are equal in their number to the count of delay elements. In essence, the counter register line is a bi-directional shift-register in which only one output is ever high. The function of the CNTRL is to, according to its present state (or count), select one particular delay line tap (or phase of the clock passing through the delay line) and present it as the active phase of the synthetic clock. By providing direction and clocking signals to the counter, the count may be changed up or down, and, subsequently, the phase of the synthetic clock may be advanced or retarded.

It is critical to the proper operation of the PLL that only one CNTRL flip-flop be high at any given time and also that at least one flip-flop has a high output. The calibration procedure assures that the counter register line comes up into a legal state after the PLL is powered up.

When CAL is high, the input of flip-flop 656a is forced high by OR gate 659 while the inputs to flip-flops 656b–656w are forced low by AND gates 655b–655w. During state 3 of the calibration sequence, while signal CAL is high, the calibration state machine activates signal SEEDEN which forces signal CNTENB high through OR gate 648. During states 2, 3, 4 and 5, signal CAL causes the PLLCLK 92 to switch CNTCLK, the clock signal used by the CNTRL, to use SEEDCLK instead of CLKO. During state 4 of the calibration sequence, the CSM issues a rising edge on SEEDCLK which causes the leftmost CNTRL flip-flop 656a to clock in a '1' and all the other CNTRL flip-flops 656b–656w to clock in a '0'. This procedure 'seeds' the counter chain with a count value of '1'.

The initial count value of '1' is arbitrary; however, being the lowest legal count of the counter chain, it assures that the initial count position does not exceed the count position of the calibrated wrap-around point in the calibration register line.

The termination of the calibration sequence causes CNTCLK to revert to CLKO and allows the phase detector to once again issue clock enable (CNTENB) to the CNTRL.

The CNTRL consists of flip-flops 656a through 656w along with logic blocks 654b–654v, 658 and 660, as well as AND gates 655b–655w and OR gate 659 (described above). During steady state operation, CAL is '0' so AND gates 655b–655w and OR gate 659 have no effect and the state of the inputs to the flip-flops is determined solely by the logic blocks. The counter consists of unique leftmost and rightmost elements and 22 identical middle elements.

When the clock enable signal, CNTENB, is high the CNTRL will count up (shift right) if the direction signal UP is high and count down (shift left) if UP is low.

Counting up (UP='1') entails transferring the high bit in the counter chain from its present position to the flip-flop to the right. If the present count position coincides with the calibration register line flip-flop that contains a high, then the counter chain high bit is transferred instead to the leftmost counter chain flip-flop 656a.

The exact process of counting up is identical for elements Cnt Reg 1 through Cnt Reg 23. The bottom term of the equation in logic blocks 654b–654v and 660 forces a '1' into the flip-flop only if the output of the flip-flop immediately to the left ($T_{N-1}$) is high AND its corresponding calibration register line flip-flop output ($C_{N-1}$) is low (it is not the end of the counter). This same term forces the counter flip-flop that is currently '1' (hot) to a '0'. The leftmost flip-flop 656a requires different logic since it can only go high when the count "wraps around". Wrap around occurs when the calibration register line flip-flop associated with the currently 'hot' counter flip-flop is a '1'. When this occurs, flip-flop 656a is forced high by one of the bottom 23 logic terms in logic block 658.

Counting down (UP='0') entails transferring the high bit in the counter chain from its present position to the flip-flop to the left. When the present count position is '1' (flip-flop 656a is high), then the high bit is transferred instead to the counter chain flip-flop that coincides with the position of the calibration register line flip-flop that contains a high.

The exact process of counting down is identical for elements Cnt Reg 1 through Cnt Reg 23. The top term of the equation in logic blocks 654b–654v and 660 handles the wrap around condition and forces a '1' into the flip-flop only if its corresponding calibration register line flip-flop is high ($C_N$) AND the leftmost flip-flop 656a ($T_0$) is high. The normal count down process is handled by the top term of logic block 658 and the middle terms of logic blocks 654b–654v. This term forces a '1' into the flip-flop only if the output of the flip-flop immediately to the right ($T_{N+1}$) is high. Logic block 660 does not contain this term since there is no flip-flop to its right of flip-flop 656w.

In the manner described above, the counter register line counts in a circular manner and the count of the elements in the ring equals the count of delay elements that comprise one cycle of the input clock CLKI.

Synthetic Clock Multiplexer

The function of the synthetic clock multiplexer (SCMUX) 98 is to derive an output clock signal CLKO from one of the taps in the delay line which corresponds with the count value of the counter register line.

Each delay line tap output is ANDed in gates 657a–657w with its corresponding counter register output, $T_0$–$T_{23}$. All signals thus produced are ORed together by OR gate 661 and fed to a pulse stretcher consisting of delay element 662 and OR gate 663. The pulse stretcher serves to absorb the glitch caused when the counter counts up, switching to the next tap to the right. The resultant composite signal at the output of gate 661 is the synthetic clock CLKO whose phase may be adjusted by changing the count value of the counter register line under the control of the phase detector.

FIG. 21

The modem core comprises of an encoder/decoder (ENDEC), preamble detector, line activity detector and associated TX/RX clock generators.

Decoder

The implementation of the ENDEC is as per the description in and requirements of the ATM-25 Physical Layer Specification.

The decoder 701 converts 4B5B line code into NRZ format and descrambles the data. The resultant 4-bit nibbles are assembled into byte-wide format by flip-flops 702 & 703. Presence of an escape sequence detected in each nibble is indicated by flip-flops 704 & 705.

Line Activity Detector

The purpose of the line activity detector (LAD) is to sense whether data is present on the Receive Data (RXDATA) line of the modem. The RXDATA line is sourced by the output of the Receive Comparator in the Analog Front End circuit. An absence of receive data is indicated by an absence of data pulses on signal RXDATA for a specific period of time.

Besides generating the signal BUS_QUIET for use by the MAC to monitor receiver activity, another function of the LAD is to determine when it is appropriate to calibrate the phase-locked loop (PLL).

The PLL requires calibration from time to time to compensate for changes in operating conditions. It is not possible to calibrate the PLL while a data packet is being received, and thus the LAD monitors RXDATA and signals the PLL when it is safe to calibrate. That window is typically in the minumum two microseconds of idle time between the transmission of packets. The line is deemed to be idle when four octet times (or 40 clocks) elapse without the appearance of any data pulses on RXDATA.

A 6-bit binary counter 711 that is clocked by the receive symbol clock (RXCLK) is reset to zero whenever a data pulse appears on RXDATA. If the count reaches 40 as determined by comparator 712, 713 & 714, the counter is reset by OR-gate 715 and a one-shot 716 issues a two cycle long signal, generated by devices 717 & 718. Said signal, referred to as ADJ, is issued to the PLL to trigger recalibration.

Preamble Detector

The function of the preamble detector is to filter out bad receive data and prevent synchronization on line burst noise. Only when four successive preamble patterns have been found does the detector activate signal RX_SYNC which informs the ENDEC that searching for the Start Delimiter pattern may commence.

The Line Activity Detector 720 resets a 2-bit Preamble Incidence counter 724 & 725 and deactivates the RXSYNC signal whenever its inactivity counter times out.

RXDATA is RXDATA is clocked into a 10-bit shift register 719 using RXCLK. The outputs of the shift register are gated with a preamble pattern recognition circuit 721, 722 & 723 which issues signal PRE_VALID when a preamble octet is detected. Signal PRE_VALID increments the Preamble Incidence counter 724 & 725 and resets via device 726 the preamble search state machine 727, 728 & 729 to allow it to detect another preamble octet.

If the PRE_VALID signal is issued while the Preamble Incidence counter 724 & 725 has reached its terminal count of 3, then signal RXSYNC is activated and remains active until the Line Activity Detector 720 detects the end of the packet.

Figure 22:
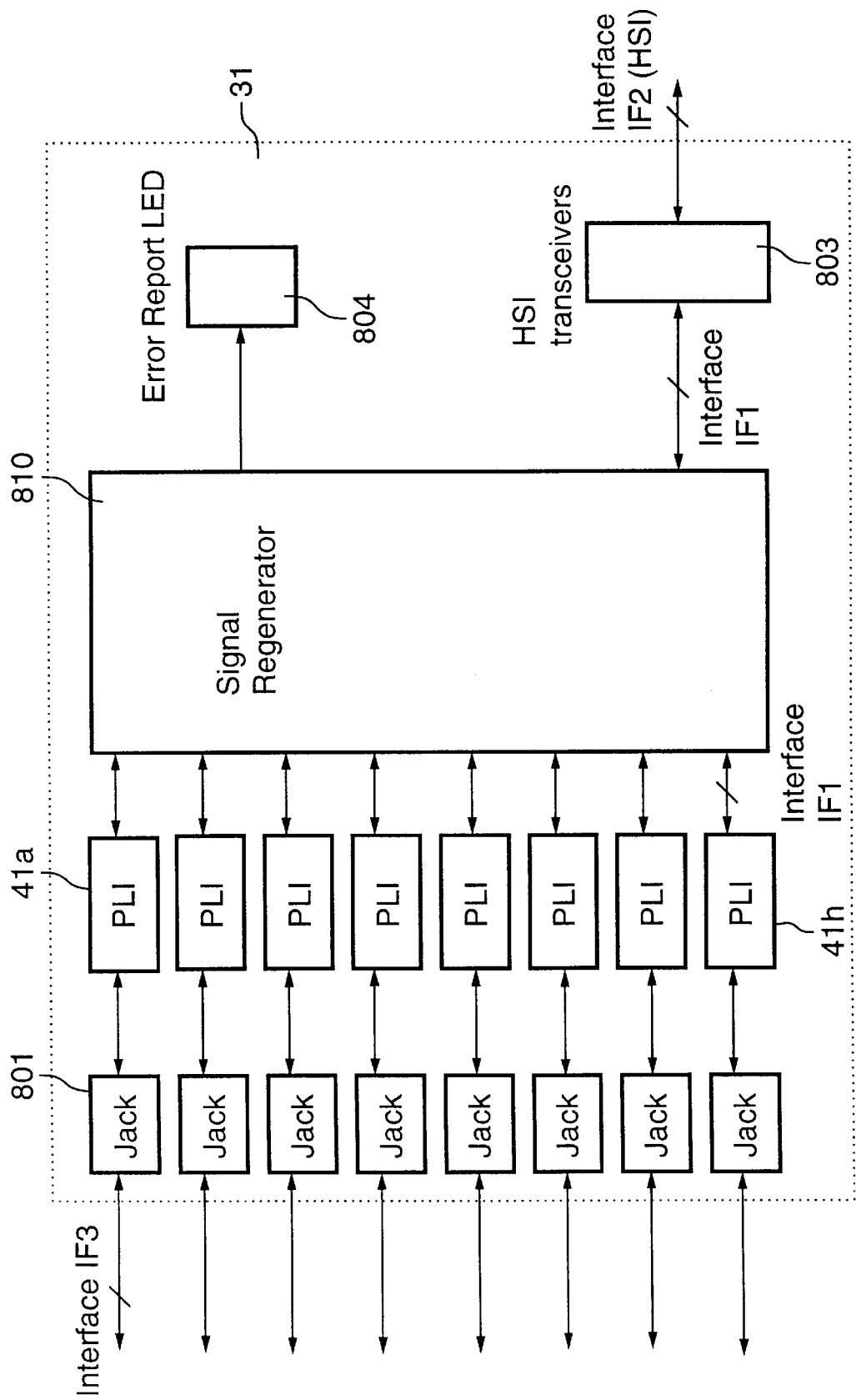
FIG. 22 represents a block diagram of a central hub subsystem according to the invention.

FIG. 22 is a block diagram of a preferred embodiment of the Central Hub subsystem 31 of the present invention. This particular embodiment is configured for single-pair signal distribution. (It will be apparent to those skilled in the art that this value is not unique and that other values are possible). Its operation is described below.

The Central Hub 31 serves as the termination point for a plurality of external cables each carrying a digital symbol stream (a value of 8 is chosen in the current invention; it will be apparent to those skilled in the art that this value is not unique and that other values are possible). Each port on the hub is composed of a cable jack 801 and a PLI 802. Each PLI is connected to a separate port on the Signal Regenerator 810. Each port and PLI combination provides bi-directional communication to the external cable. An additional port 803 is provided for limited distance communication to co-located devices such as additional Central Hubs.

Digital symbols present on the external cabling are amplified by the PLI and passed to the Signal Regenerator which retimes and regenerates the signal using digital means before broadcasting the resultant signal to the appropriate ports for retransmission over the external cabling.

Figure 23A:
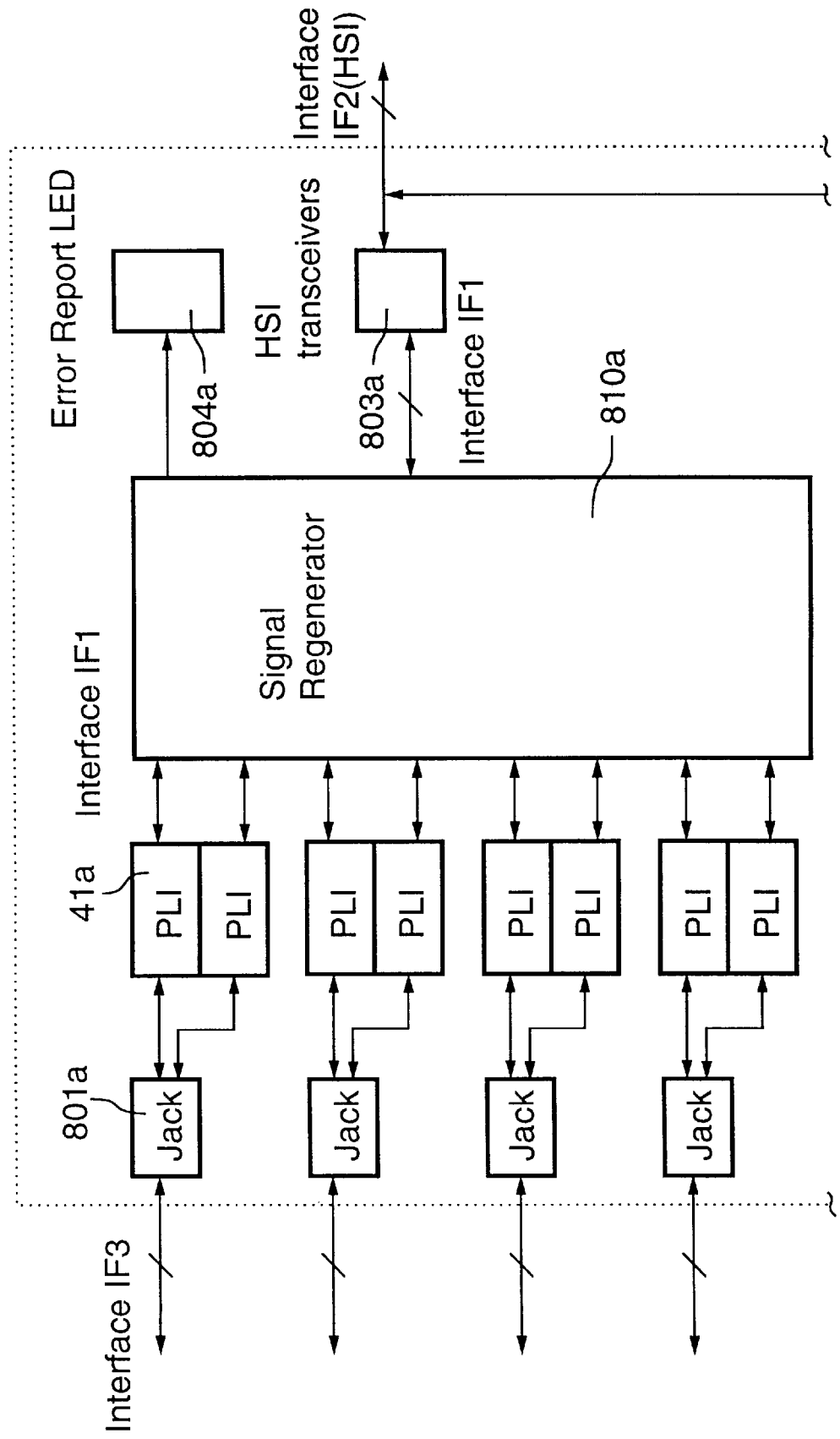
FIG. 23 represents a block diagram of an alternative embodiment of a central hub subsystem according to the invention.

FIG. 23 is a block diagram of an alternative embodiment of the Central Hub subsystem of the present invention. This particular embodiment is configured for dual-pair signal distribution. (It will be apparent to those skilled in the art that this value is not unique and that other values are possible). Its operation is identical to that of FIG. 22 with the following additions.

In this embodiment, 2-pair transmission is supported. Each individual jack 801a–h is connected to two PLI sections 41a–p. Each PLI is connected to the Signal Regenerator 810 as described in FIG. 22. The Signal Regenerator is operated in a mode such that it selects the signals originating from individual channel-pairs (such as 41a–b), and replicates said signals to all other channel pairs, including the HSI transceiver section 803.

In order to maintain the port capacity of the unit, an additional Signal Regenerator 810b is included, along with associated jacks and PLIs. Each Signal Regenerator 810a–b drives a common bus (IF2) via HSI Transceiver blocks 803a–b. This common bus enables high portcount systems to be constructed while retaining a common information space (bandwidth).

Figure 24B:
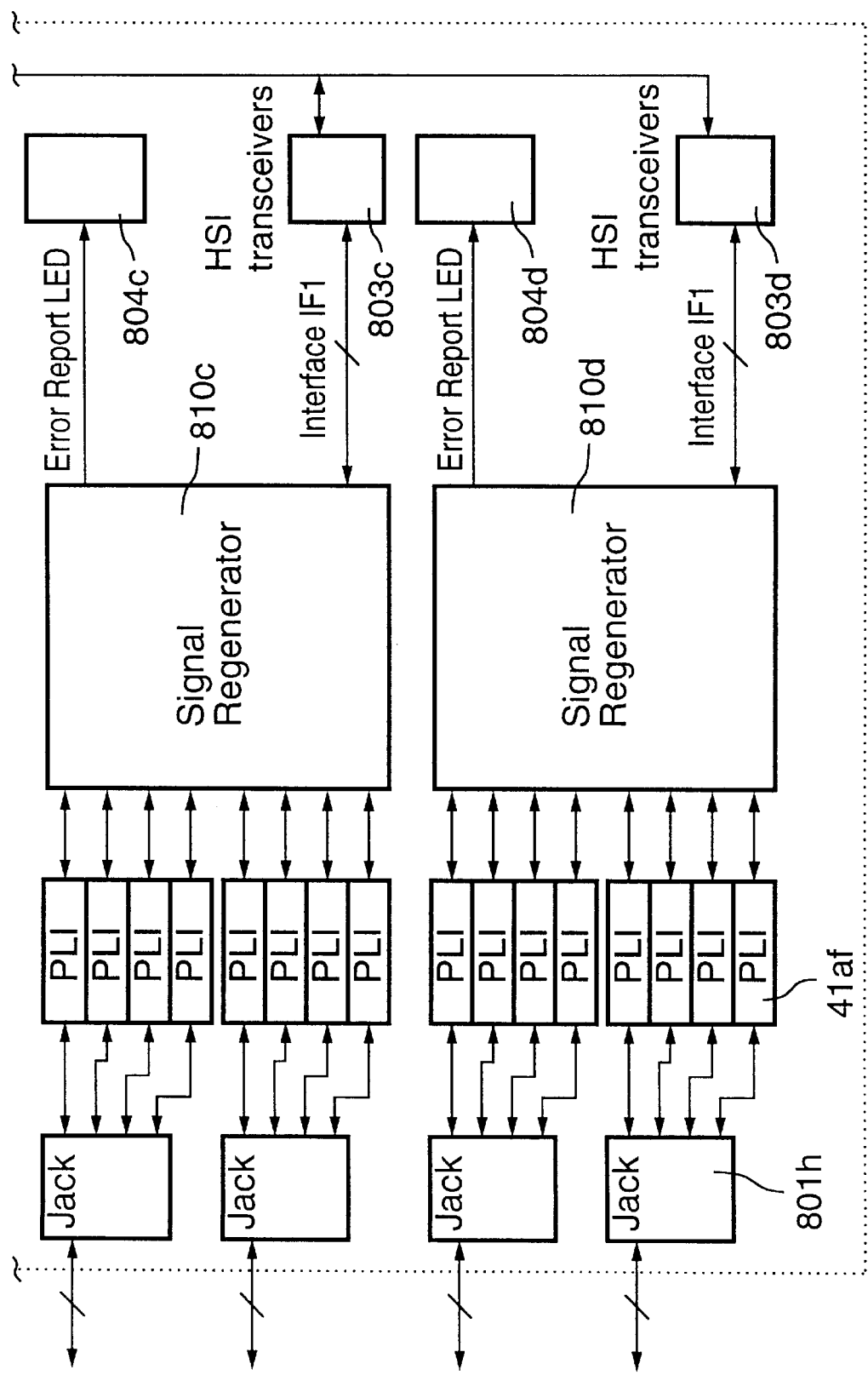
FIG. 24 represents a block diagram of a further alternative embodiment of a central hub subsystem according to the invention.

FIG. 24 is a block diagram of a yet further alternative embodiment of the Central Hub subsystem of the present invention. This particular embodiment is configured for quad-pair signal distribution. (It will be apparent to those skilled in the art that this value is not unique and that other values are possible). Its operation is identical to that of FIG. 22 with the following additions.

In this embodiment, 4-pair transmission is supported. Each individual jack 801a–h is connected to four PLI sections 41a–af. Each PLI is connected to the Signal Regenerator 810 as described in FIG. 22. The Signal Regenerator is operated in a mode such that it selects the signals originating from individual channel-quads (such as 41a–d), and replicates said signals to all other channel quads, including the HSI transceiver section 803.

In order to maintain the port capacity of the unit, three additional Signal Regenerators 810b–d are included, along with associated jacks and PLIs. Each Signal Regenerator 810a–d drives a common bus (IF2) via HSI Transceiver blocks 803a–d. This common bus enables high port-count systems to be constructed while retaining a common information space (bandwidth).

Figure 25A:
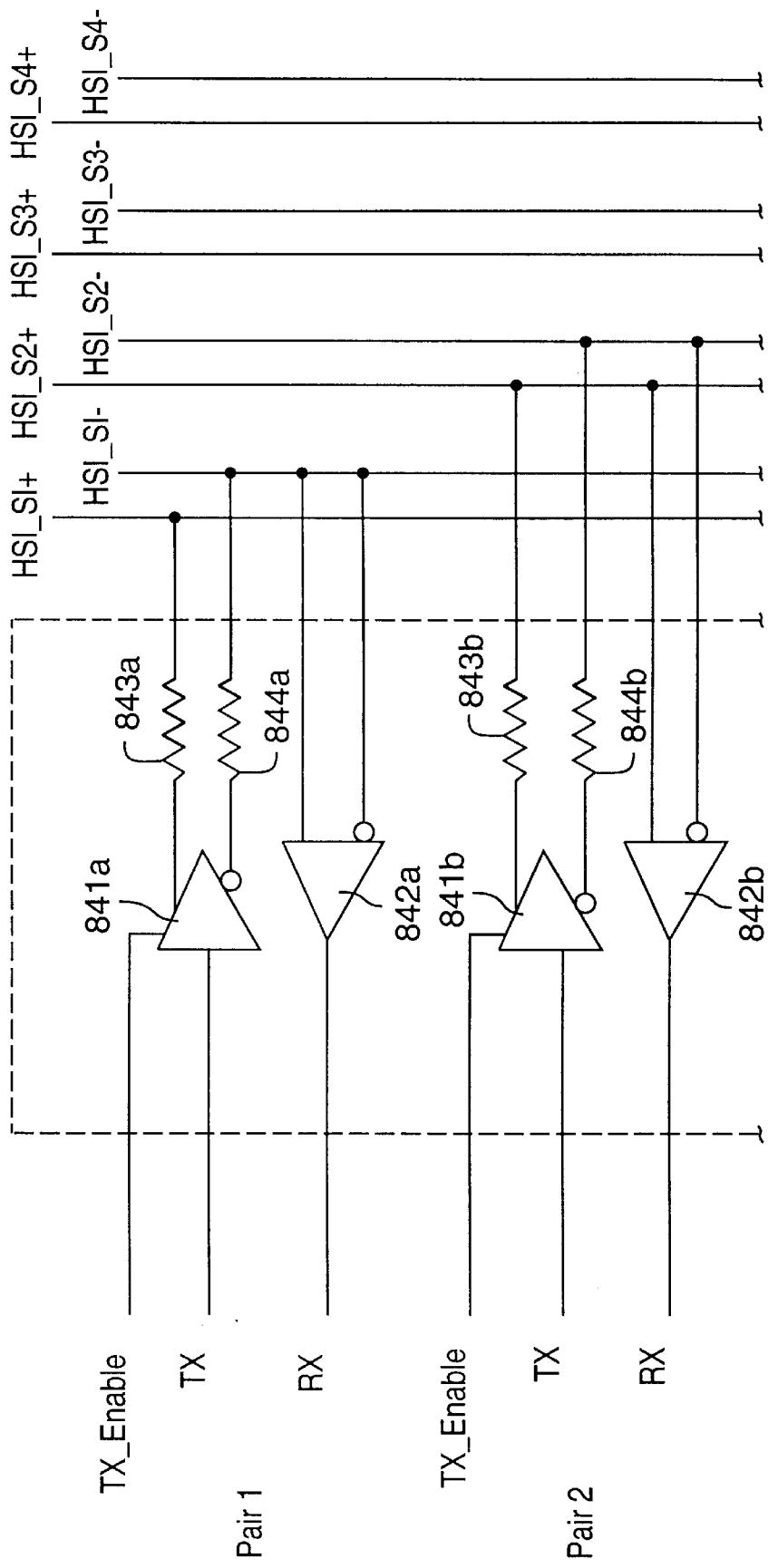
FIG. 25 represents a circuit diagram of the HSI transceiver section of a central hub subsystem according to the invention.

FIG. 25 represents a circuit diagram of the HSI transceiver section 803 of a central hub subsystem 31 according to the invention. It may be applied in any of the central hub embodiments described above.

The HSI transceiver section provides capability for multi-pair operation where the actual number of pairs is a value in the range 1 to 4. The operation of each pair is identical; pair-1 will be used as example.

The signal TX selected by the Signal Regenerator 810 is presented to the HSI Transceiver 803. Said signal TX is applied to an RS-485 compliant driver 841a. The output of said driver is gated by signal TX_Enable which is also supplied by the Signal Regenerator. When active, a bipolar signal is driven out to the common bus via resistors 843a–b. Signals present on the bus are detected by differential receivers 842a–d and presented to the Signal Regenerator.

The use of RS-485 drivers provides for a tri-stable differential driver. During normal operation, one driver is active at a given time and all other drivers adopt a high impedance state. This allows the logic level asserted by one active driver to be seen cleanly on the data line. If more than one driver is active and the drivers try to assert different logic levels, the resistors reduce the current flow onto the data lines, thereby protecting the drivers from damage. In addition, RS-485 drivers possess built-in thermal protection against damage under contention situations. During contention, the receivers are unable to interpret a reliable logic level. The higher level MAC protocol handles this situation.

Figure 26A:
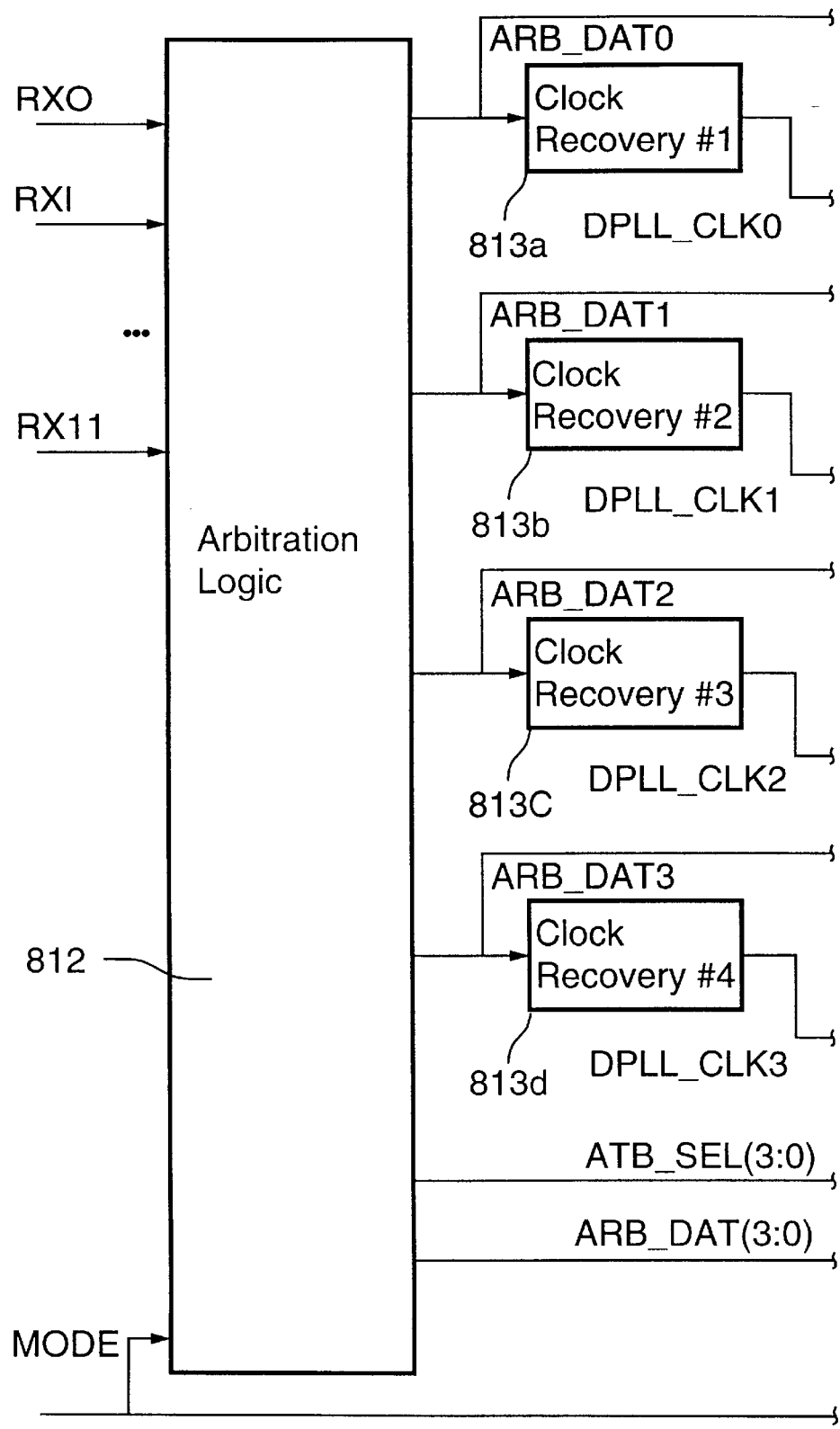
FIG. 26 represents a block diagram of a signal regenerator subsystem contained within the central hub according to the invention.
Figure 26B:
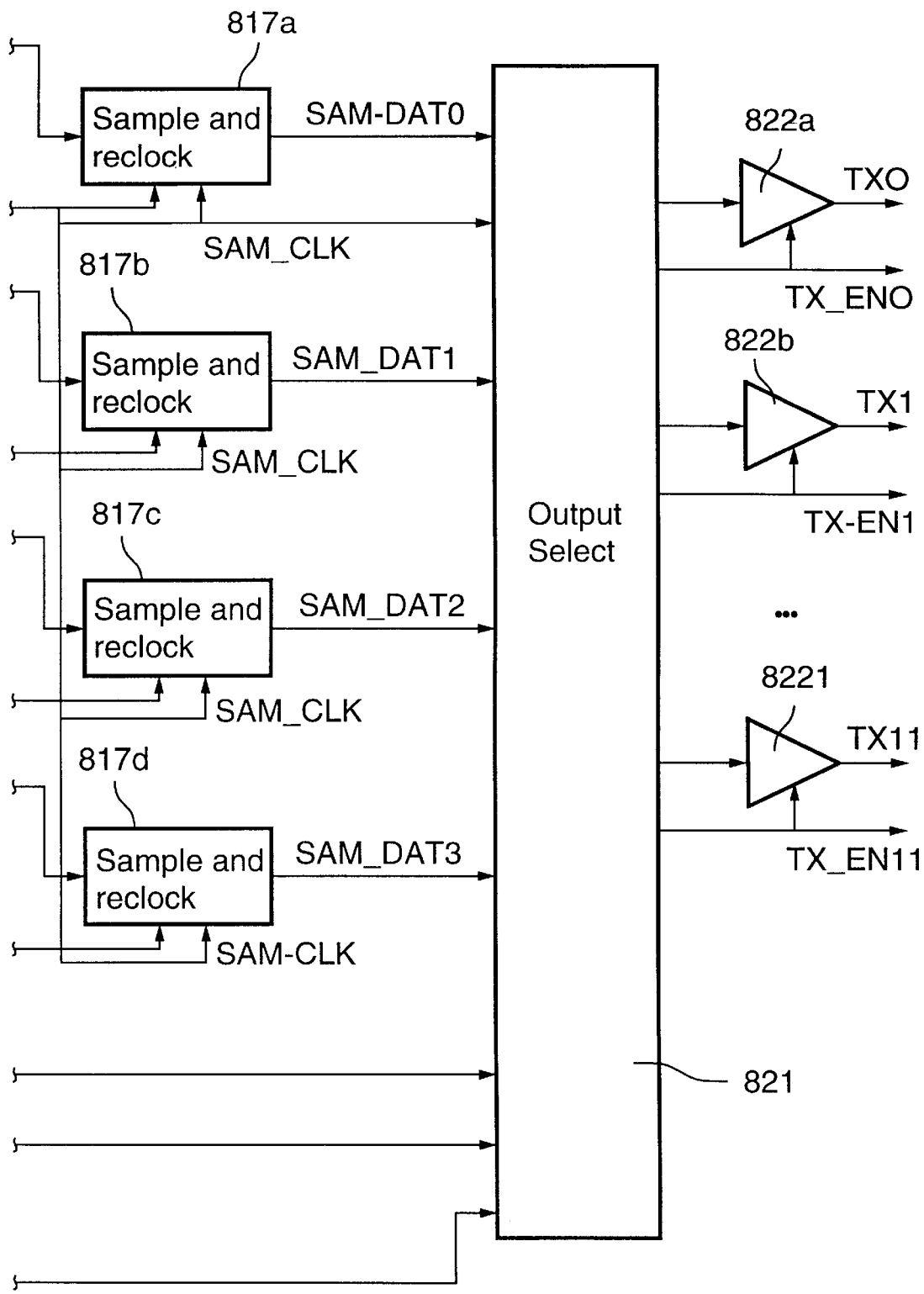

FIG. 26 is a block diagram of the preferred embodiment of the Signal Regenerator subsystem of the present invention. Its operation is described below.

The Signal Regenerator 810 performs signal reclocking and regeneration for a plurality of ports. (A value of 12 is chosen in the present invention; it will be apparent to those skilled in the art that this value is not unique and that other values are possible.) The Signal Regenerator also provides a mechanism to arbitrate the right to transmit between a number of contending ports. It also supports multiple operating modes to enable a number of independent sub-networks to be created under software control. Additional capability is provided to enable a plurality of limited distance ports to be supported.

Operation of the unit will be described by considering the action of channel 0. The digital symbol stream received by the PLI of channel 0 is delivered as the input signal RX0. This signal is delivered to the Arbitration Logic 812. This unit determines whether or not there is activity on each of the lines presented to it. Under normal operating conditions, only one of the lines will be active and this line will be selected by the arbitration unit, simultaneously blocking incoming transmissions from any other line. Under some conditions, contention can occur and in this event the channel with the lowest port number is given control. The selected symbol stream is provided to Clock Recovery #1 813a which uses the phase lock loop techniques described in FIG. 19 to recover the received clock. This clock signal is then used by the Sample and Reclock unit 817a to time the sampling of the received symbol stream. The symbol stream is then reconstructed based on the results of the sampling process.

The reconstructed symbol stream is then passed to the Output Select block 821 which performs the final signal routing to the selected output ports depending on the operating Mode selected. In the present invention, the signal may be routed to either 3 quad-pair ports, or 6 dual-pair ports, or 12 single-pair ports. Final output signals TX0–TX11 are provided by single-ended drivers 822a–l.

Figure 27:
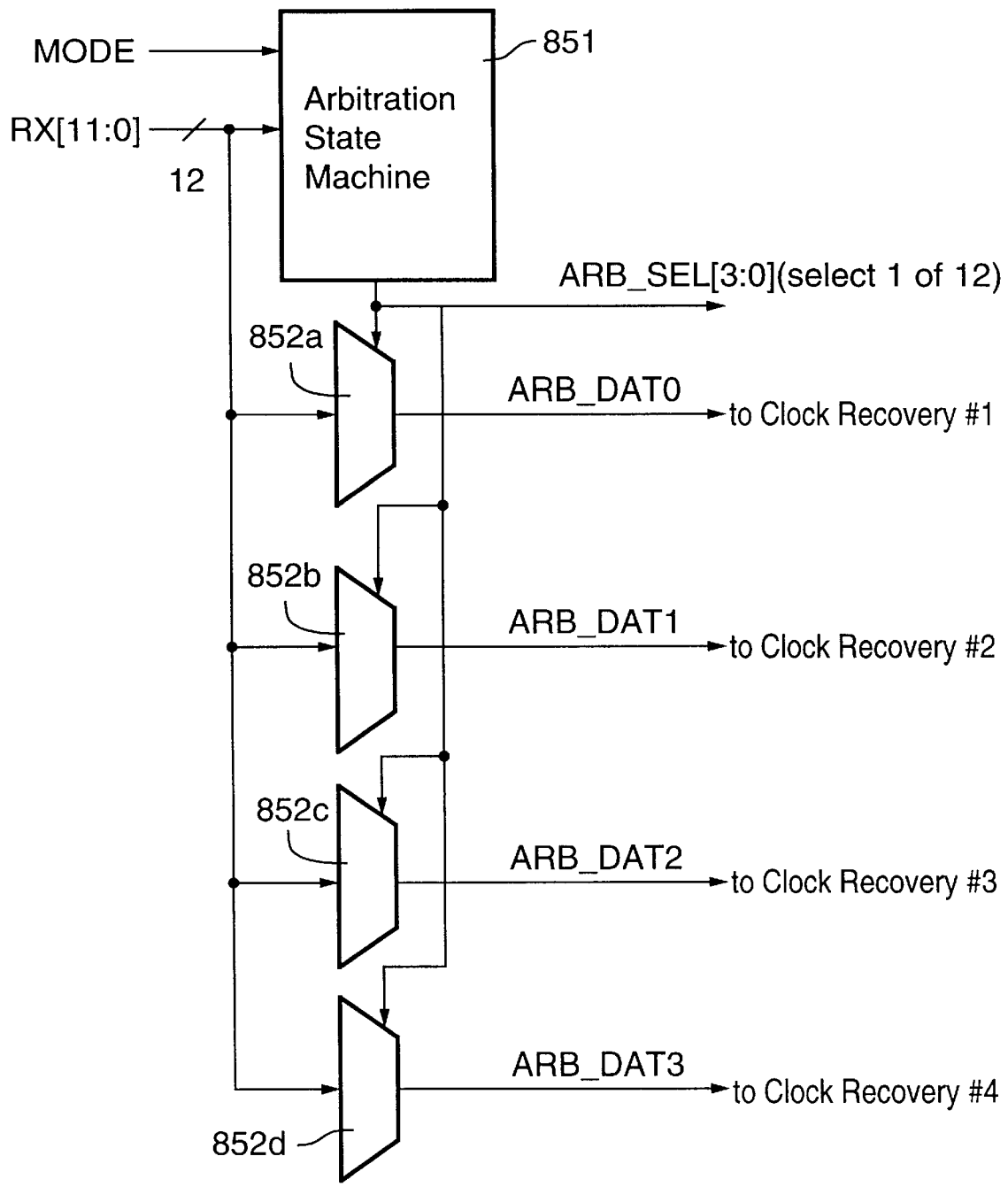
FIG. 27 represents a circuit diagram of the arbitration logic section of a signal regenerator subsystem according to the invention.

FIG. 27 is a circuit diagram of the arbitration logic section of a Signal Regenerator subsystem of the present invention. Its operation is described below.

The function of the Arbitration Logic unit is to select one input line out of a plurality of input lines, and issue a corresponding selection identification signal to the clock recovery (phase lock loop) and output select sections. In the current embodiment the number of input signal lines is 12. (It will be apparent to those skilled in the art that this value is not unique and that other values are possible). All of the input lines are presented to the Arbitration State Machine 851. This section determines which line is to be selected according to the algorithm described in FIG. 28.

The Arbitration Logic unit operates in 3 discrete modes in order to support single-pair, dual-pair and quad-pair operation. In single-pair mode, one of the input lines is selected as active and this signal is repeated to the 11 remaining output lines. In dual-pair mode, the 12 input lines are arranged in 6 groups of 2 lines each, one group being selected as active and repeated to the remaining 5 output groups. In quad-pair mode, the 12 input lines are arranged in 3 groups of 4 lines each, one group being selected as active and repeated to the remaining 2 output groups. The selection is communicated from the Arbitration State Machine 851 to the individual Line Selectors 85a–d by signal ARB_SEL.

Each Line Selector 852a–d is presented with all 12 input lines RX[11:0] and signal. Depending on the value of ARB_SEL[3:0], one of the input lines is selected and delivered to the corresponding clock recovery section of FIG. 26. In single-pair mode, only one clock recovery section is active (813). In dual-pair mode, the first 2 clock recovery sections 813–814 are active. In quad-pair mode, all 4 clock recovery sections 811–816 are active.

Figure 28:
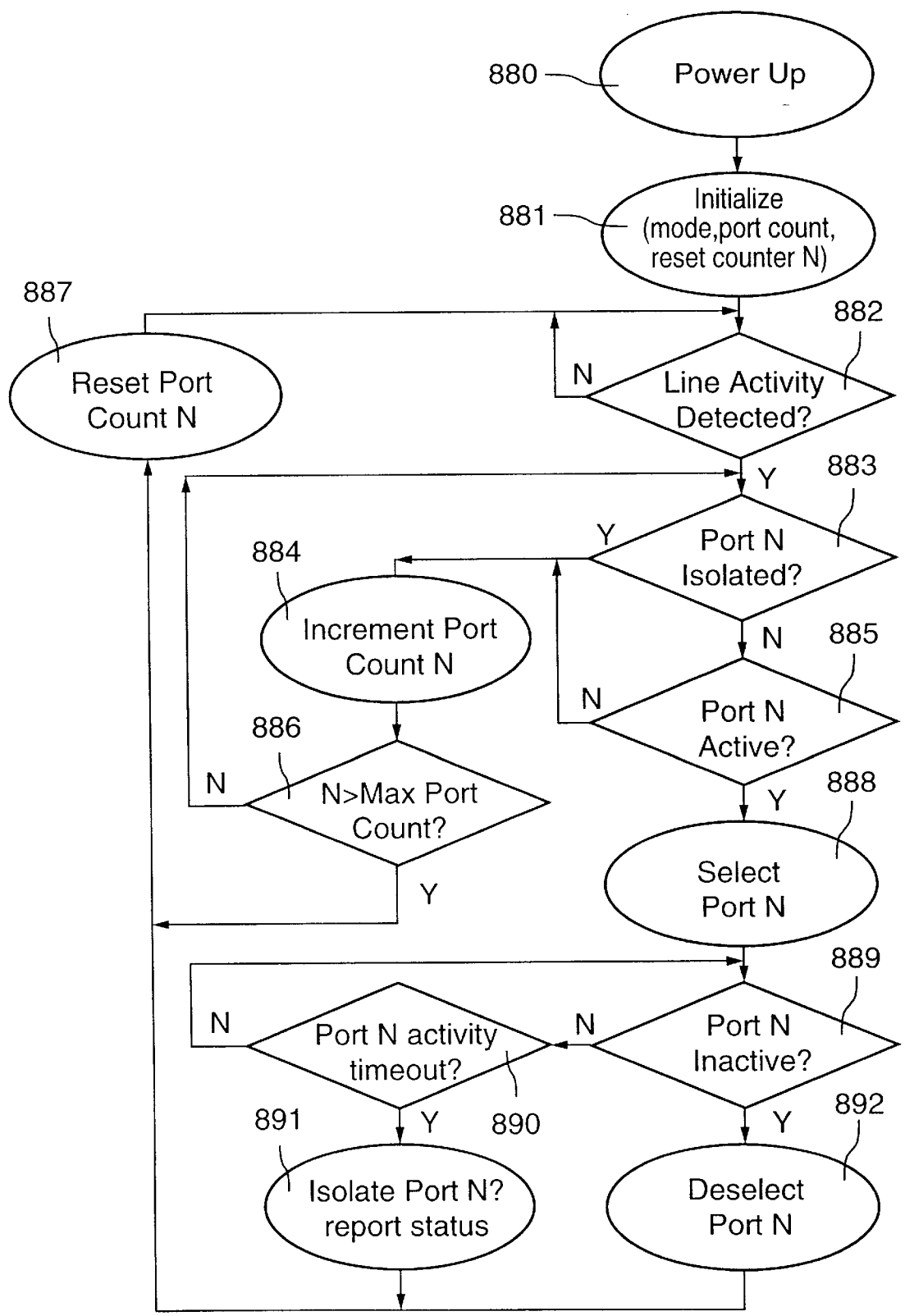
FIG. 28 represents a flow chart of the arbitration state machine implemented by the signal regenerator subsystem according to the invention.

FIG. 28 is a flow chart of the arbitration state machine of a signal regenerator subsystem according to the invention. Its operation is described below.

Upon power up from state 880 the process is initialized in step 881 at which point the hub mode and port configuration are selected and operating conditions (counter N) reset. "Mode" defines the number of "communication planes" supported by the signal regenerator (mode 0 defines 1 plane of 12 ports, mode 1 defines 2 planes of 6 ports each and mode 3 defines 4 planes of 3 ports each). Modes 1 and 2 define multiple instances of communication planes which operate in parallel and are controlled by a single instance of the above flow chart for group 0. Reset conditions set port count pointer N to 0.

All input ports are first examined for activity in step 882. If no activity is present, the process loops. If activity is present the process continues.

The next process 883 examines the current count port (N) for isolation status. If the port is flagged as isolated, the current port count is incremented 884, the process loops as long as the maximum port count is not exceeded 886, and the next sequential port isolation status is checked by step 883. Isolation occurs when a port is deselected such as occurs during a signal activity timeout (step 890). Isolation may also be selected via program control. If the port is non-isolated, the process continues.

The next process 885 examines the current count port (N) for line signal activity. If the port is not active the process loops via steps 884 & 886 to check whether the port count (N) has reached the maximum as per the mode selected. If the maximum has not been exceeded the process loops and the next sequential port isolation status is checked in step 883. If the maximum has been reached, the process loops to reset the port count counter in step 887 and resumes at the beginning in step 882. If the current port count (N) has activity, the process continues.

The current count port (N) is selected as the valid active input in step 888. The outputs of the LSR are also appropriately configured and selected at this point. The process continues.

The current count port (N) is next examined for signal inactivity at step 889 to determine whether the selected port has ceased transmission. Inactivity is determined by a minimum period of inactivity. If the port is not inactive the process loops to examine the port for a signal activity timeout condition in step 890. If the signal activity does not exceed the timeout condition, the process loops to continue looking for line inactivity via step 889. If the signal activity exceeds the timeout condition the process continues on to isolate the offending port in step 891 and to report its status to the system administration software. The process then loops back to reset the port count counter at step 887 and resume processing at the beginning 882. If the port is inactive the process continues.

The current count port (N) is deselected at step 892 and the process loops back to reset the port count counter at step 887 and resumes at the beginning 882.

FIG. 29

Figure 29:
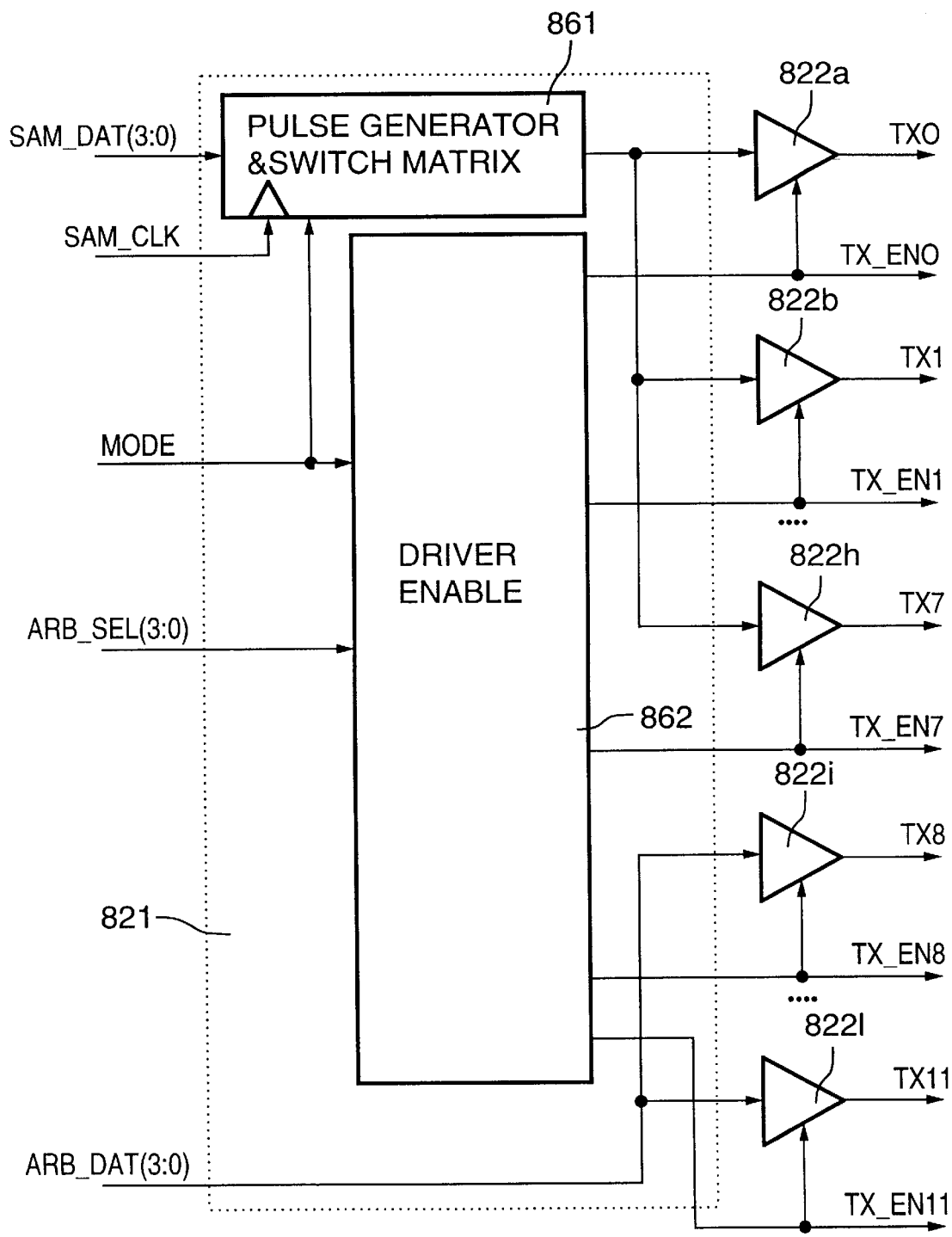
FIG. 29 represents a circuit diagram of the output select section of a signal regenerator subsystem according to the invention.

FIG. 29 represents a circuit diagram of the output select section of a signal regenerator subsystem according to the invention; its operation is described below.

The signals to be output are carried by lines $SAM_{13}$ DAT[3:0]. A raw version of the same signals (i.e. signals which have not been reclocked by the phase lock loop) are carried by lines ARB_DAT[3:0]. The SAM_DAT signals are processed by the Pulse Generator & Switch Matrix unit 861 which produces pulses of the correct amplitude and phase to support the desired encoding scheme (in this case 4B5B encoding is used, this scheme is not unique and other coding schemes are possible). Unit 861 also performs a switching function, selecting one of the four input signals SAM_DAT[3:0] for each of the eight output drivers 822a–l. The switch settings are dependent on the value of the MODE signal which determines whether single-pair, dual-pair, or quad-pair operation is required.

Output drivers 822i–l are fed directly by signals ARB_DAT[3:0] rather than signals SAM_DAT[3:0] in order that multiple, colocated Signal Regenerators and Central Hubs may operate on the same logical LAN segment without increasing the unit-to-unit latency, which would occur if each hub imposed its own phase lock loop function on inter-hub signals.

The Driver Enable unit 862 uses signals ARB_SEL[3:0] and MODE to inhibit the retransmission of a signal on the line from which it was received.

Figure 30:
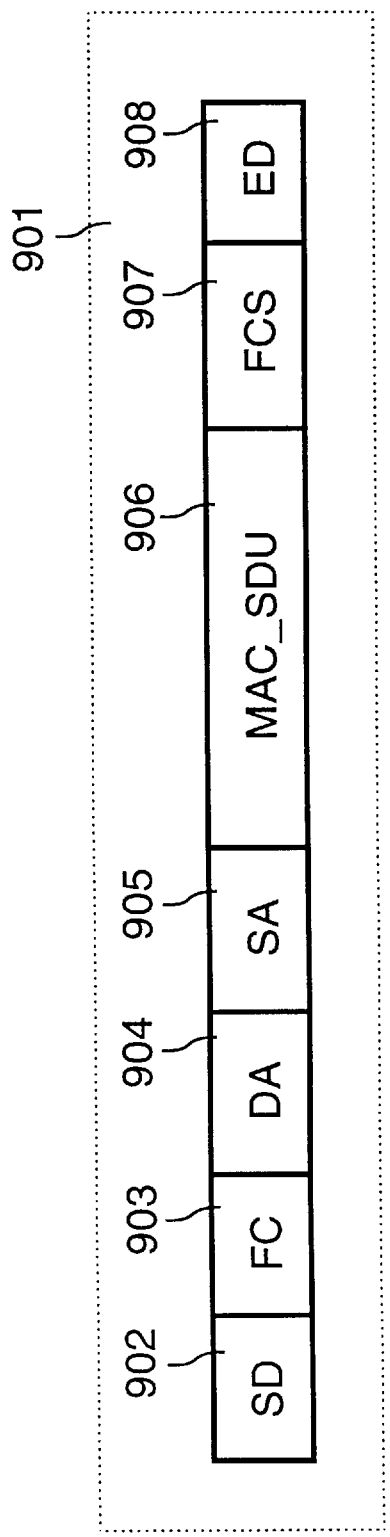
FIG. 30 represents the structure of an information packet at the media access layer according to the invention.

FIG. 30 represents the structure of a data packet at the media access layer according to the invention; its structure is described below.

The MAC layer data packet 901 is composed of 7 sequential fields 902–908, with the order of transmission starting with field 902 and ending with field 908.

Field 902 (SD) is the start of frame delimiter. It is composed of a single octet which provides a unique pattern that the RxM 915 can use to mark the beginning of a frame.

Field 903 (FC) is the frame control field. It is composed of a single octet which defines the type of frame being sent and also encodes the priority of the frame.

Field 904 (DA) is the destination address. It is composed of a single octet which identifies the recipient of a packet. The destination address may correspond to an individual station address, a group address or a broadcast address.

Field 905 (SA) is the source address. It is composed of a single octet which identifies the sender of a packet. The source address must correspond to an individual station address.

Field 906 (MAC_SDU) is the service data unit. It is composed of a plurality of octets which contain the data for the next higher logical layer (network layer). In the current embodiment the number of octets comprising the MAC_SDU is permitted to be 2, 3 or 53. (It will be apparent to those skilled in the art that these values are not unique and that other values are possible.) A MAC_SDU of 2 is used for normal token packets. A MAC_SDU of 3 is used for token packets which include a network synchronization time-stamp. A MAC_SDU of 53 is used for normal data (application) packets.

Field 907 (FCS) is the frame check sequence. It is composed of two octets which provide a cyclic redundancy check computed over fields 903, 904, 905 & 906.

Field 908 (ED) is the end frame delimiter. It is composed of a single octet which provides a unique pattern that the RxM 915 can use to mark the end of a frame.

It will be apparent to those skilled in the art that, with the exception of the SD and ED fields, the remaining fields described above may be transmitted in any order.

Figure 31:
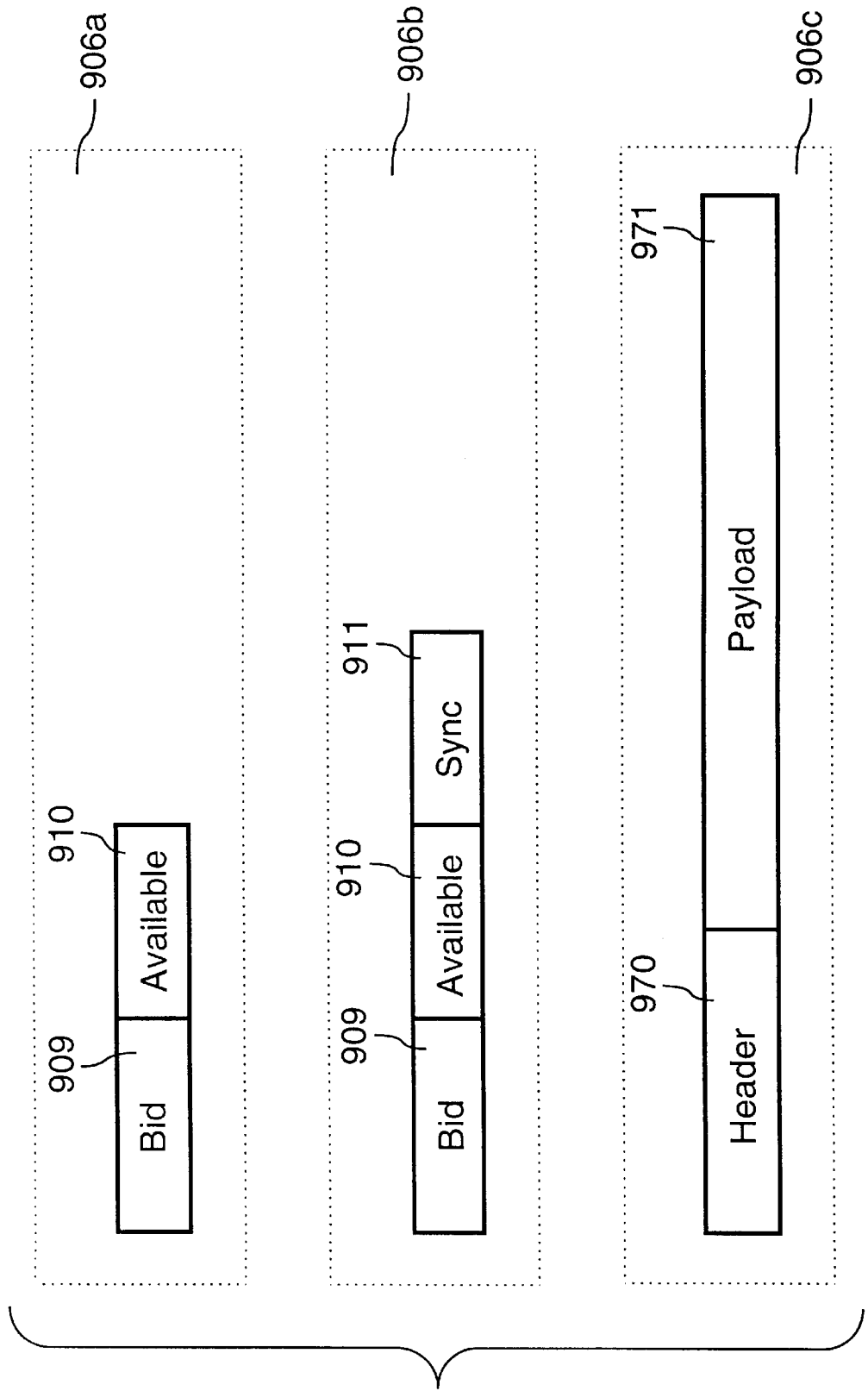
FIG. 31 represents the structure of the service data unit contained within the media access layer information packet according to the invention.

FIG. 31 represents the structure of the service data unit (SDU) 906 contained within the MAC-layer information packet of FIG. 30; its structure is described below.

Three variants 906a–c of the SDU are defined. (It will be apparent to those skilled in the art that these variants are not unique and that additional variants could be constructed.) Variants 906a & 906b constitute tokens which are passed from one node to another. Reception of a token by a node indicates that said receiving node is now permitted access to the shared communication medium and may transmit a prescribed number of packets.

Variant 906a contains two fields; a Bid field 909 and an Available field 910. The Bid field is composed of a single octet which contains a counter that is used by individual nodes to request an additional allocation of bandwidth (packets to transmit). The Available field is composed of a single octet which provides all nodes with an indication of how much bandwidth in the system (number of packets) is currently unused and available for allocation.

Variant 906b contains the same two fields as variant 906a plus an additional Sync field 911. The Sync field is composed of a single octet which is used by a specific node or nodes to broadcast clock synchronization information to the network. This synchronization information is required by certain forms of isochronous traffic (such as telephony) to maintain a constant rate of information generation and consumption between participating nodes.

Variant 906c represents the structure of an SDU which carries application-specific information. In order to conform to ATM standards, the packet is divided into a Header 970 (of 5 octets in length) and a Payload 971 (of 48 octets in length). (It will be apparent to those skilled in the art that these values are not unique and that alternative values could be adopted.)

Figure 32:
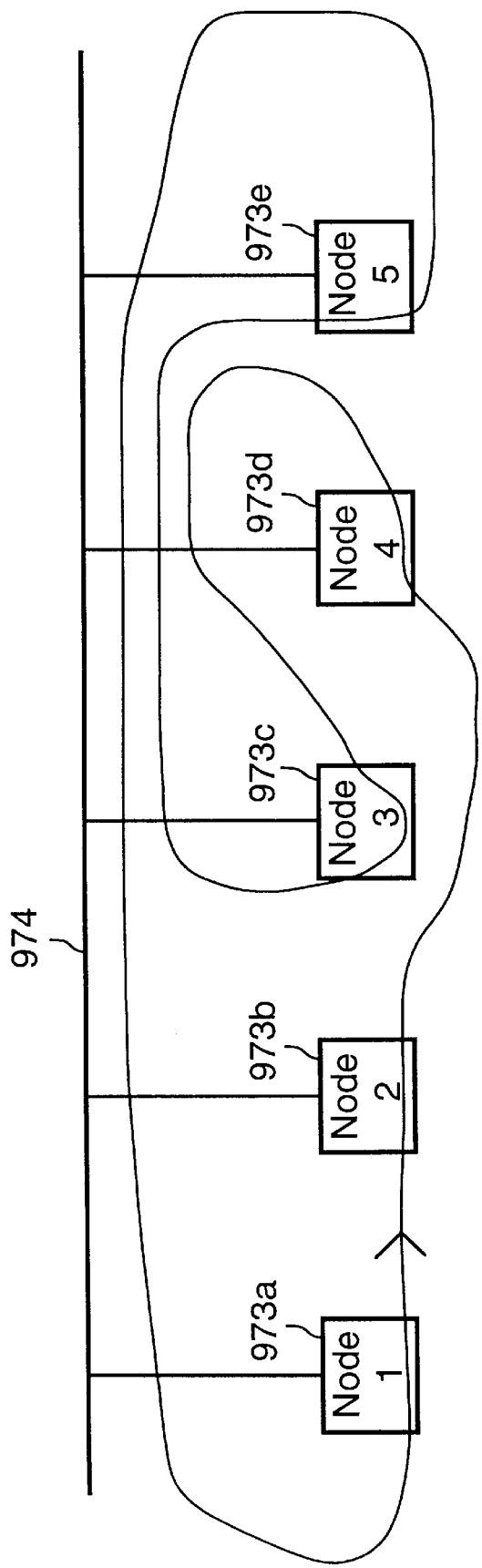
FIG. 32 provides an example of a logical ring supported by a broadcast-type LAN.

FIG. 32 provides an example of a logical ring supported by a broadcast-type LAN; its operation is described below.

The MAC portion of the present invention is a tightly coupled hardware/software system responsible for data movement between nodes. From a high level point of view, a virtual ring is built on top of token bus hardware, with the hardware being responsible for the actual transmission of data and the passing of the token. Part of this responsibility includes the encapsulation of data provided by the next higher protocol layer into a MAC packet. The MAC software can be broken into two major components. One component is strictly concerned with the prioritization, queuing, and addressing at the MAC level, of cells for transmission. The other component of the software is concerned with the maintenance of the virtual ring and sharing of the network bandwidth. Maintenance of the ring and sharing of bandwidth is managed in a distributed fashion, with different nodes running different parts of the algorithm(s) depending upon their role in the system.

The MAC hardware/software combination is designed to:

support isochronous data streams with a wide range of bandwidth needs.

provide good network performance over a wide range of network sizes.

allow non-isochronous traffic to share the network with isochronous traffic while maintaining the quality of service guaranteed to the isochronous traffic.

share the bandwidth of the non-isochronous traffic fairly, both in the amount of bandwidth available to each node and the timing of said availability; (i.e. the node should get some bandwidth on every token rotation as opposed to once every N token rotations. This is particularly important for larger network sizes and helps keep latency down.)

respond quickly to changes in the non-isochronous bandwidth demands.

maintain the ring given node failures, moves and changes, admit new stations to the ring.

From the MAC perspective, a network according to the invention consists of from 1 to 4 central hubs, a Real Time Server (RTS) application if isochronous bandwidth management is needed, and a plurality of device nodes.

Within the network, one node is designated to be the master node and is responsible for soliciting new stations to enter the ring. Part of the solicitation process involves assigning a MAC address to the new node. In one particular embodiment of the invention, only a central hub may be a master node. If a network contains more than one hub, then the hubs resolve amongst themselves which one will be the master. If the master node fails, the role of master is picked up by one of the existing hubs, provided one is available.

In one particular embodiment of the invention, although the ring master is responsible for soliciting new stations, the actual placement of the node in the ring is handled by the hub to which the node is attached. Hubs are also responsible for monitoring their part of the network and removing a node from the ring if it has failed. When a node fails, be it a regular node or a hub, the token must be regenerated quickly enough to keep the network operational.

FIG. 32 presents one specific example of the aforementioned operation in which the network is composed of 5 nodes (in any permutation of hubs and/or devices). Each node 973a–e can communicate directly with any other node via the token bus 974. In this particular example a token ring of sequence Node1, Node2, Node4, Node3, Node5, has been constructed by instructing Node1 to pass the token to Node2, Node 2 to pass the token to Node4, Node4 to pass the token to Node3, Node3 to pass the token to Node5, and Node5 to pass the token to Node1.

FIG. 33

Figure 33:
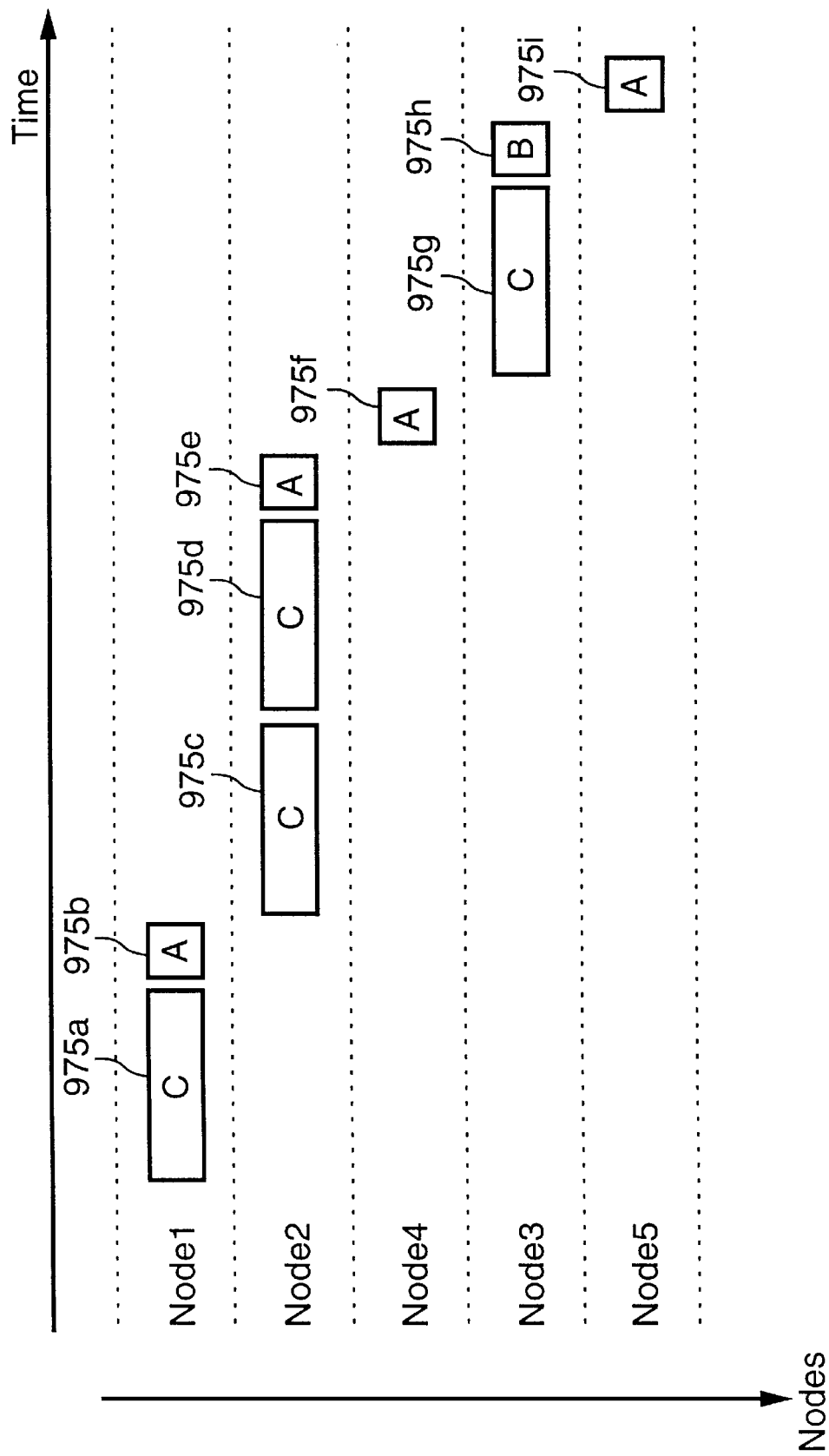
FIG. 33 provides an example of MAC-layer packets transmitted by a plurality of nodes according to the invention.

FIG. 33 provides an example of MAC-layer packets transmitted by a plurality of nodes according to the invention; the example chosen uses the token ring described by FIG. 32.

The diagram shows a sequence of packets 975a–i being transmitted over the network. In this example Node 1 transmits an application packet 975a followed by a token 975b. The token 975b is addressed to Node 2, which then transmits two application packets 975c–d, followed by the token 975e which is passed to Node 4. Node 4 has no application information to transmit and immediately passes the token 975f to Node3. Node 3 transmits one application packet 975g followed by the token 975h. In this case, Node 3 has responsibility for maintaining network synchronization, and therefore uses a type-B token (see 906b). The token is received by Node 5 which has no application information to transmit and therefore immediately passes the token 975i back to Node1.

FIG. 34

Figure 34:
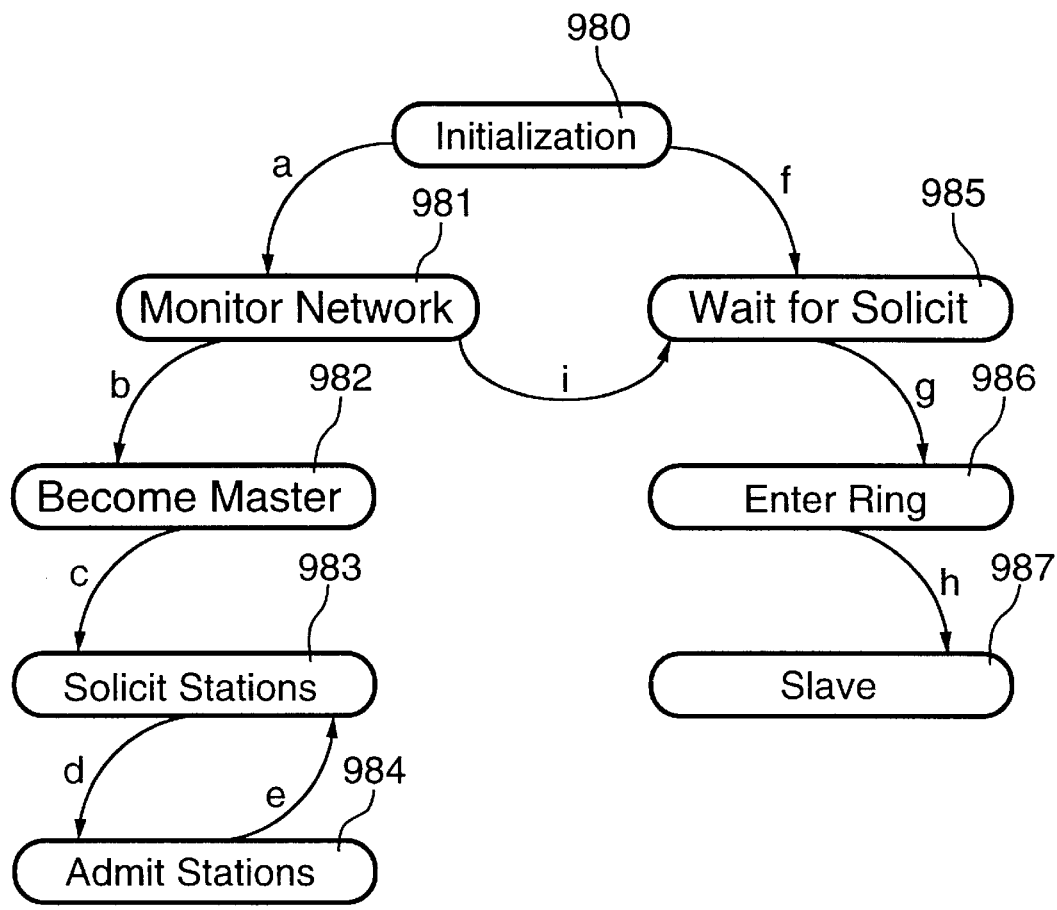
FIG. 34 represents the algorithm used to construct a logical ring according to the invention.

FIG. 34 represents the algorithm used to construct a logical ring according to the invention; its operation is described below.

When a node is first powered up it enters the Initialization state 980. If the node is a candidate to become a master node then it transitions via path (a) to the Monitor Network state 981. If it determines that the network is not idle, then some other node must be performing the duties of the ring master and this node transitions via path (i) to the Wait for Solicit state 985. If the network is idle, however, then the node attempts to assume the role of ring master via path (b) and state 982. Once the role is established, the node transitions via path (c) to the Solicit Stations state 983. The node then alternately solicits for new stations in state 983 and admits those it finds in state 984, transitioning backwards and forwards via paths (d) and (e). (During this period, the other software functions of the node continue to operate normally.)

If the node is not a candidate to become a ring master, then it transitions out of the Initialization state 980 via path (f) and enters the Wait for Solicit state 985. Once solicited to enter the ring by a ring master, the node transitions via path (g) to the Enter Ring state 986. When the entry process is complete, the node becomes a fully operational slave, transitioning via path (h) to state 987.

Note that the ring may collapse due to error conditions while the node is any of the aforementioned states. In this situation the node reverts to the Initialization state 980 and the process is repeated. (For reasons of clarity, these error paths are not shown explicitly in FIG. 34.)

FIG. 35

Figure 35:
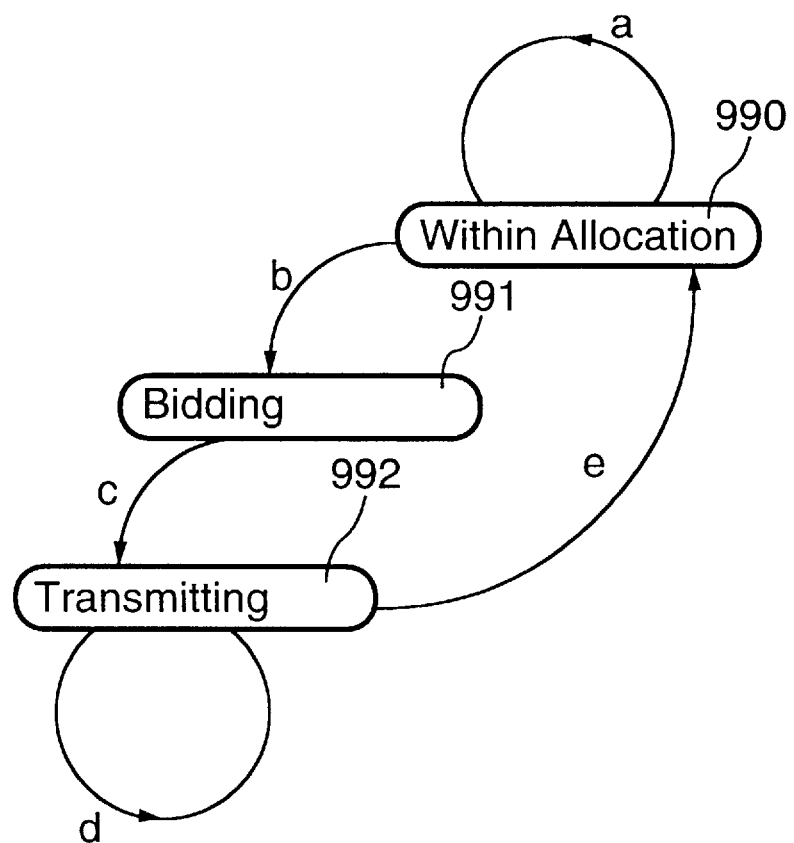
FIG. 35 represents the algorithm used to allocate bandwidth on demand to individual nodes according to the invention.

FIG. 35 represents the algorithm used to allocate bandwidth on demand to individual nodes according to the invention; its operation is described below.

The algorithm recognizes a distinction between reserved bandwidth and low-priority bandwidth. Reserved bandwidth is allocated by a central resource manager and is utilised for the transmission of isochronous data and for certain high priority control functions. Barring error conditions, once a node has been allocated reserved bandwidth, the availability of said bandwidth is guaranteed. In contrast, low-priority bandwidth is not managed centrally but is negotiated by a distributed algorithm using a mechanism of "bidding" for a portion of any currently unused capacity. Low-priority bandwidth is utilized for the transmission of asynchronous information.

Each time a node receives a token, it has the opportunity to transmit cells. The number of cells a node can transmit is controlled by the amount of reserved bandwidth assigned to the node, the amount of low priority bandwidth available, and whether or not this node had bid for low priority bandwidth on the previous token rotation.

Each token contains an indication of the amount of low-priority bandwidth currently available and a count of the number of stations interested in using that bandwidth. The number of stations interested in using the low-priority bandwidth is called the bid count and a station must bid for the low-priority bandwidth before it can use it. If a node had previously bid for bandwidth, then, if the number of stations bidding is N, the node can use up to 1/Nth of the low-priority bandwidth along with any high priority time assigned to it. Each node can change the bid of the token depending upon whether or not it is interested in using any low priority bandwidth.

The amount of low-priority bandwidth available (field 910) is controlled and set by the RTS, and is a function of the number of nodes currently in the network and the amount of reserved bandwidth. If a node has high priority traffic, be it isochronous or regular data, the application can make a request of the RTS to reserve some bandwidth. If the request is granted, the amount of high priority traffic the requesting node can send per token reception is adjusted. When the application no longer needs reserved bandwidth it must inform the RTS of this fact so that the bandwidth can be reclaimed. The RTS must also reclaim reserved bandwidth from nodes that have failed.

The algorithm used by a node to acquire and utilise low priority bandwidth is illustrated in FIG. 35. As long as a node has no more traffic to transmit than it is currently allocated, it remains in the Within Allocation state 990 via transition (a). If it requires additional bandwidth, then it transitions to the Bidding state 991 via path (b). In this state, it increments the value of the Bid Counter 909 by one. On the next occasion that it receives the token, it transitions via path (c) to the Transmitting state 992 where it transmits packets according to the new allocation.

Once a node has completed its turn to transmit and is about to pass the token to the following node, the node tests the status of its bandwidth requirement. The bandwidth allocated to the node has two components; one component based on its requirement for high priority (reserved) bandwidth, and a second based on the remaining bandwidth available and the number of bidders for said bandwidth (as captured in fields 909 & 910). If the node has used only the transmit time allocated for reserved bandwidth, it decrements the bid counter and transitions to state 990 via path (e). If the node has utilised low-priority bandwith, it remains in state 992 via transition (d).

Failure conditions result in a transition to state 990 from any other state. When a node detects a failure, it notifies all other nodes of the occurrence (i.e. via one token rotation), forcing them to return to state 990 and rebid for the bandwidth they require.

Figure 36:
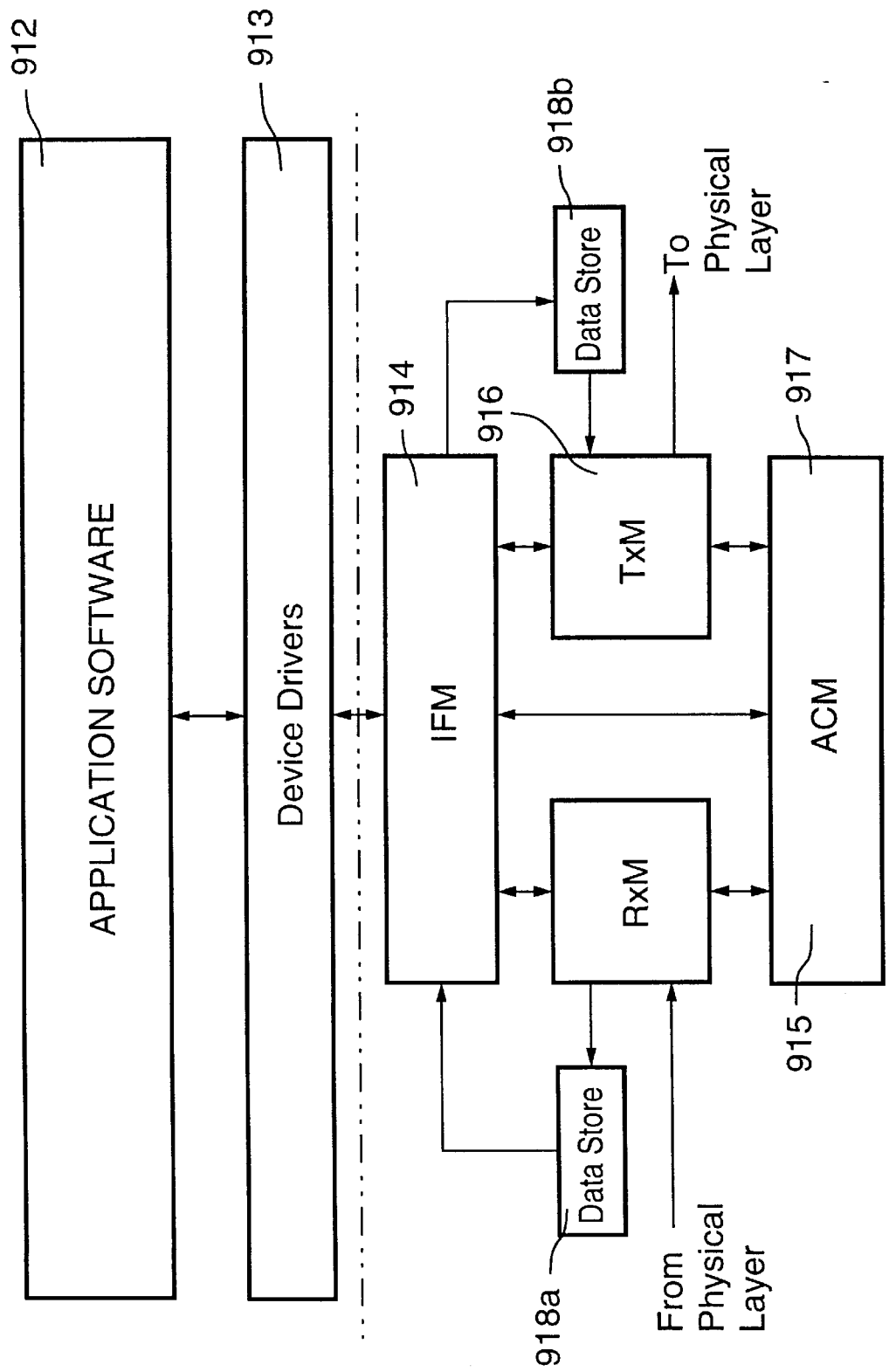
FIG. 36 represents a block diagram of the media access control subsystem according to the invention.

FIG. 36 represents a block diagram of the media access control subsystem according to the invention; its operation is described below.

The MAC protocol is designed to accommodate the physical layer characteristics of the current invention—specifically a multi-point shared wire topology. The selected protocol is based on a packet based token passing scheme.

Packet based token passing protocols make use of a special type of packet called a token to arbitrate access to the transmission media. Stations form a logical ring and pass the token in a circular fashion to give each station an opportunity to transmit. When a station receives a token, it has permission to transmit onto the media. When it has completed transmitting all of its required data packets, it passes the token onto the next logical station by sending the special token packet.

Once the logical ring is established, operation of a token passing scheme is relatively straightforward. Stations get the token, send their data and pass the token on. The main complexities involved with token passing are in setting up the logical ring and to deal with error conditions when stations either lose the token or mistakenly transmit on the media without the token.

The MAC is decomposed into several logical blocks which are identified below:

The Access Control Machine 917 (ACM) contains the arbitration logic that allows multiple stations to share a common communications bus. The ACM implements a token passing protocol.

The Interface Machine 914 (IFM) provides the connection between the external MAC-user entities and the functional elements of the MAC.

The Receive Machine 915 (RxM) accepts symbols from the physical layer and extracts frames for the RxM and the external MAC-user entity. The RxM provides the ACM with control frames directly. It provides the external MAC user entity data frames via a data store 918a that the user entity accesses via the IFM.

The RxM is responsible for ensuring the validity of all incoming frames and indicating this to the ACM and the end MAC-user entity.

The Transmit Machine 916 (TxM) converts the frames to be transmitted into suitable signals for the physical layer to send across the physical media. The external user entity and the ACM provide the frames to be transmitted. The ACM provides the control frames directly and the external user entity provides data packets via a data store 918b accessed through the IFM.

The TxM generates the additional fields to bracket the data payload in forming up a frame for transmission. This includes the start and end delimiters and the frame check sequence.

The Application Software 912 implements higher level functionality required for the MAC protocol. These higher level functions are partitioned into software to allow ease of hardware implementation. The application software is primarily concerned with construction and maintenance of a logical token passing ring.

The Device Drivers 913 provide the interface from the specific processor that the software executes on to the hardware via the IFM. The device drivers are not discussed in this document.

Note that the software/hardware boundary is established between the Device Drivers and the IFM.

Figure 37:
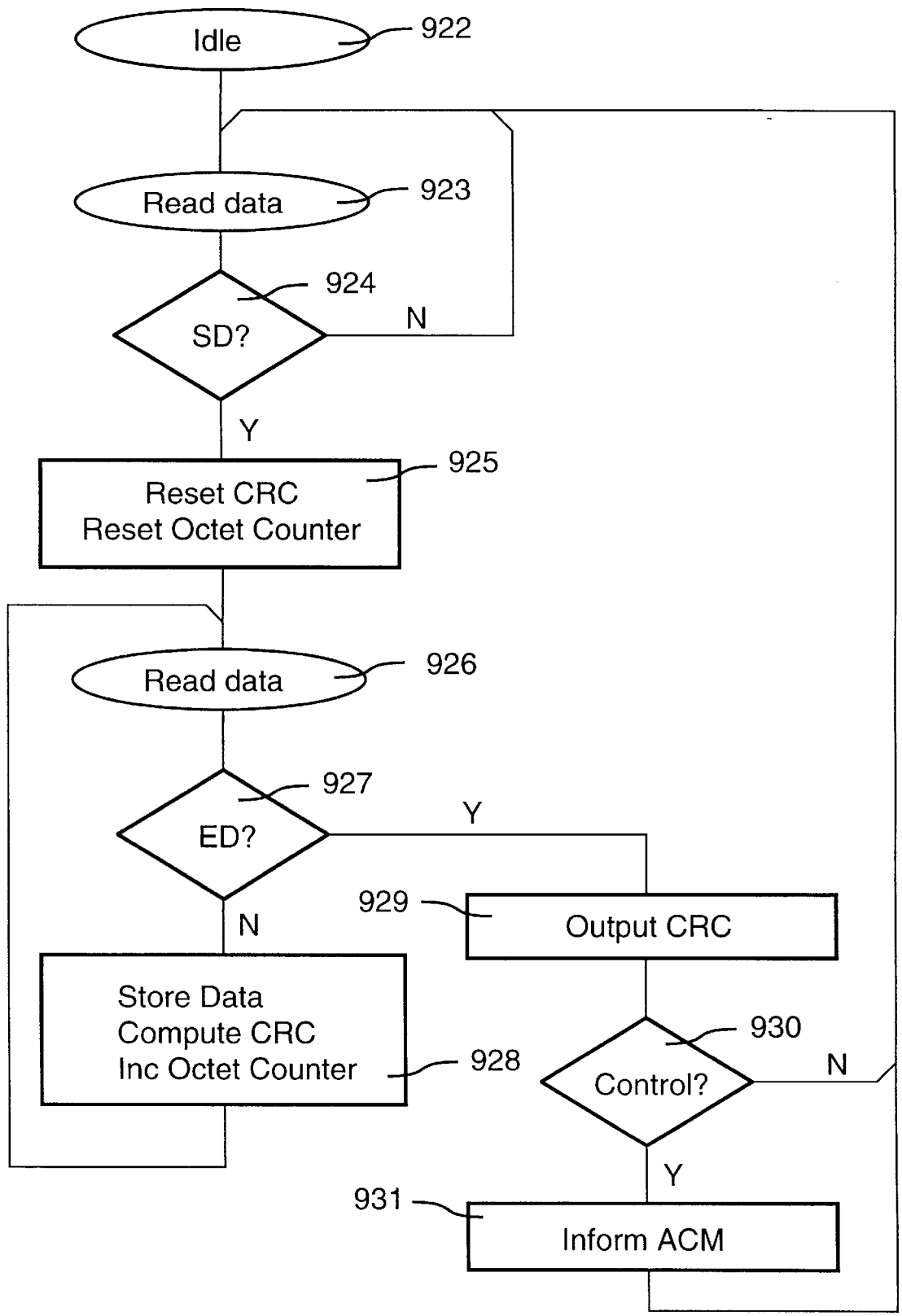
FIG. 37 represents a flow chart of the receive machine according to the invention.

FIG. 37 represents a flow chart of the receive machine 915 according to the invention; its operation is described below.

The Receive Machine (RxM) is responsible for converting the signals from the physical layer to a form usable by the ACM and IFM.

Three major functions are provided by the RxM—data transformation from decoding, packet storage control and ACM Interface The physical layer receive signals are outputs from a 4B5B decoder 75 (FIG. 18). Said outputs include a byte wide data bus, a status line indicating if an escape-escape pattern has been received and a data line indicating if an escape-sequence pattern has been received. These combination of signals are interpreted by the RxM to determine the framing boundaries of each MAC layer packet.

The RxM continuously searches the incoming data stream for the SD at step 923. The SD and ED appear as special combinations of the byte wide input and the two status lines from the 4B5B decoder.

Once the SD is found 924, the octet frame boundary is established and the decoded data 926 can be used for subsequent processing. The data is used by the ACM and is also stored by the RxM as described below. (Note: The data transformation function makes no attempt to interpret the data other than the search for the SD and ED.)

A running CRC is reset 925 when the SD is found and operates continuously on the data 928 otherwise. The CRC computed is based on CRC-16 and is preconditioned to 0x0000 and expects a final residual of 0x0000 when the entire data packet has been passed through.

Once an ED is found 927, the RxM repeats the process looking for another SD. The status of the CRC at the octet time just before the ED is detected represents the computed CRC result 929 for the packet.

The RxM is responsible for managing the storage 928 of data packets as they are received from the physical layer. This involves generating suitable control signals for a either a FIFO or a DMA interface.

The RxM presents control packets to the ACM 930, 931 to allow the ACM to operate the token ring mechanism. The RxM only allows valid control packets to be passed to the ACM. Data packets are flowed directly into storage 928 without being presented to the ACM.

The packet presented to the ACM contains the frame type, the source address, the destination address and the contents of the packet.

Figure 38:
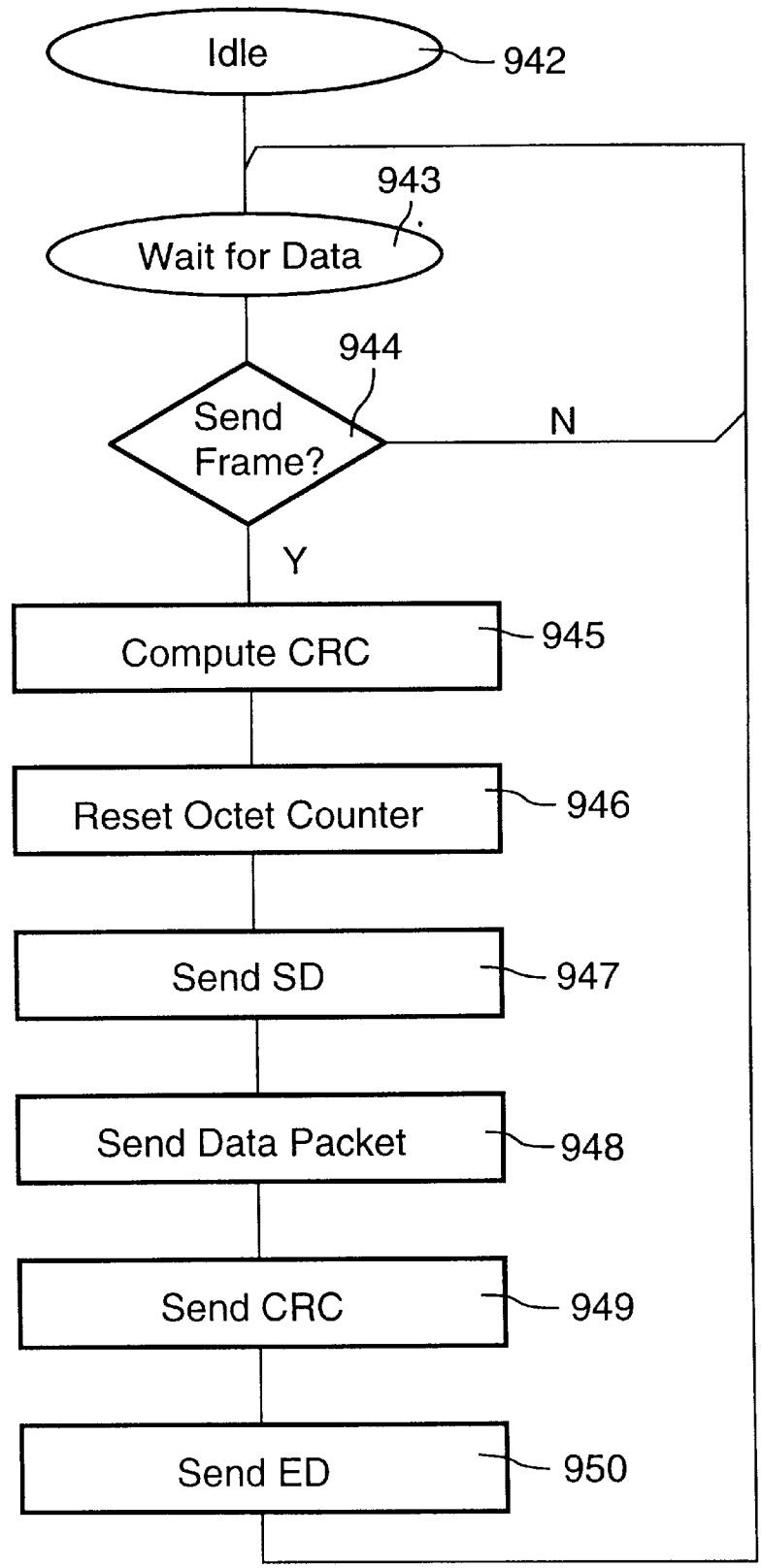
FIG. 38 represents a flow chart of the transmit machine according to the invention.

FIG. 38 represents a flow chart of the transmit machine 916 according to the invention; its operation is described below.

The Transmit Machine (TxM) is responsible for converting the control packets provided by the ACM and the data packets provided by the microprocessor (via the IFM interface) to signals that the physical layer can transmit onto the physical media.

The three major functions are provided by the TxM are—data transformation for encoding, packet extraction control and ACM interface.

The signals provided to the physical layer encoder 72 include a byte wide data bus, 3 control signals and a clock signal. The TxM converts the data packets that are required for transmission into the format suitable for the physical layer encoder.

The TxM is responsible for prepending the SD onto the data packet 947, generating the correct CRC for the packet 945, adding the CRC to the packet 949 and adding the ED to the end of the packet 950.

The CRC computed is based on CRC-16 and is preconditioned to 0x0000. The computed residual value at the end of the last octet in the MAC_SDU field is used as the CRC for transmission.

The TxM issues commands to the physical layer encoder to stay silent when it is not ordered by the ACM to transmit any data packets 943. This allows other stations on the network to transmit.

The TxM is responsible for extracting the contents of data packets that are stored in memory. This involves generating suitable control signals for a either a FIFO or a DMA interface.

The TxM accepts signals from the ACM as to when to transmit a packet 944 and the specific type of packet to transmit. The TxM then presents the data to the physical layer for transmission.

The data packets that are made available to the TxM contains the frame type, the destination address, the source address and the service data unit. These fields are transmitted to the physical layer at step 948.

Figure 39:
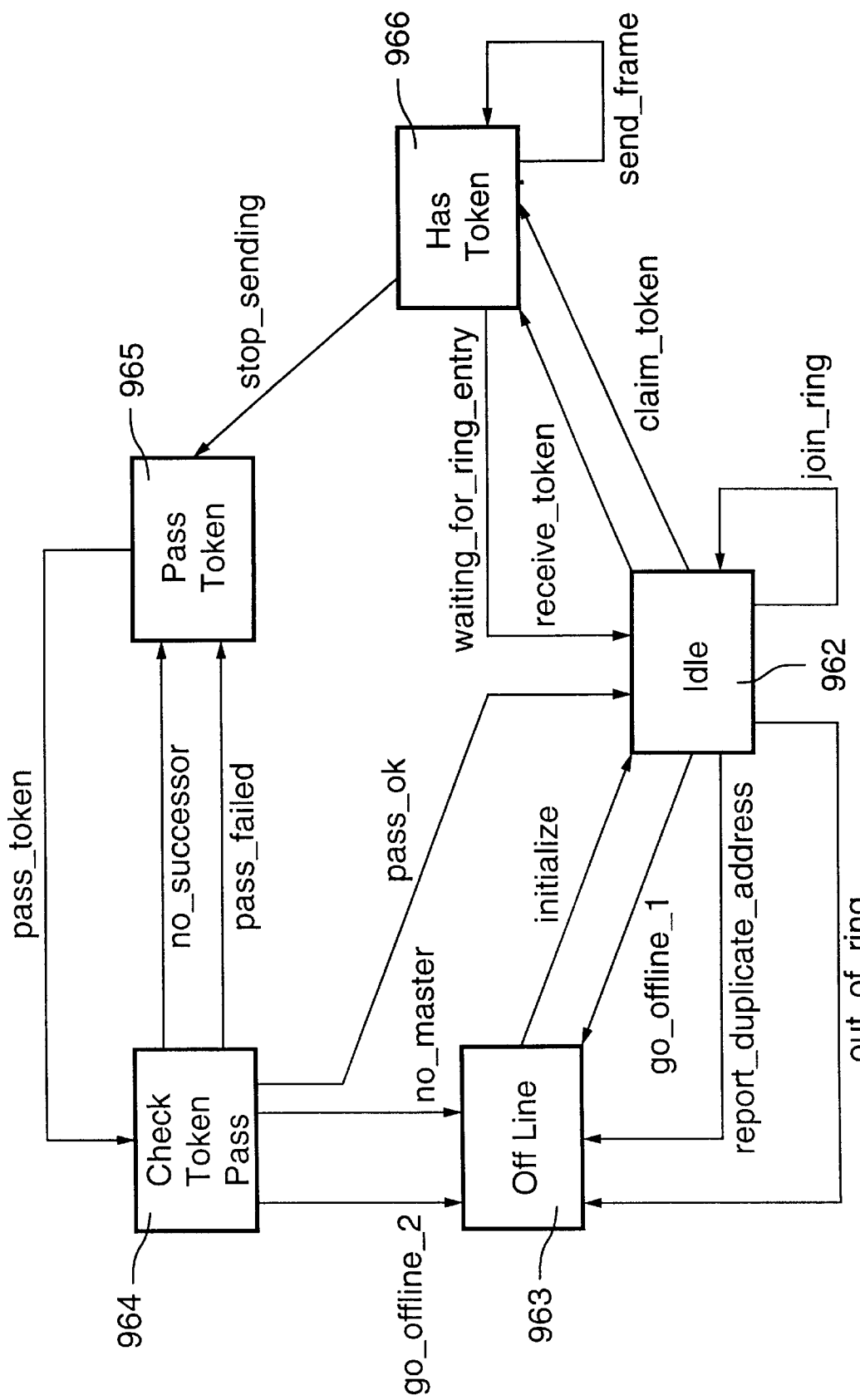
FIG. 39 represents a flow chart of the access control machine according to the invention.
Figure 40:
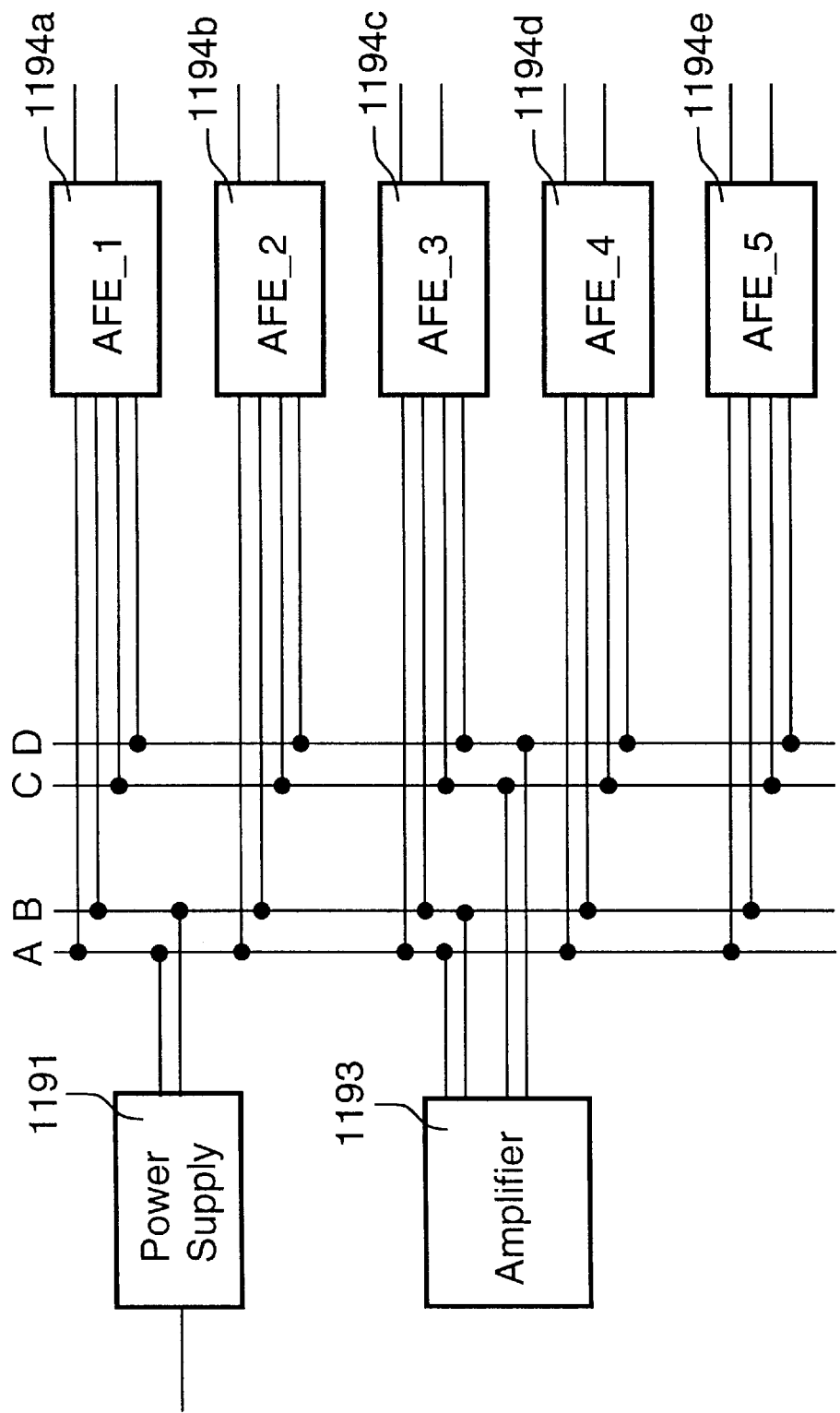
FIG. 40 represents a block diagram of a preferred embodiment of a Line Splitter subsystem according to the invention, said embodiment employing a local source of power.
Figure 41A:
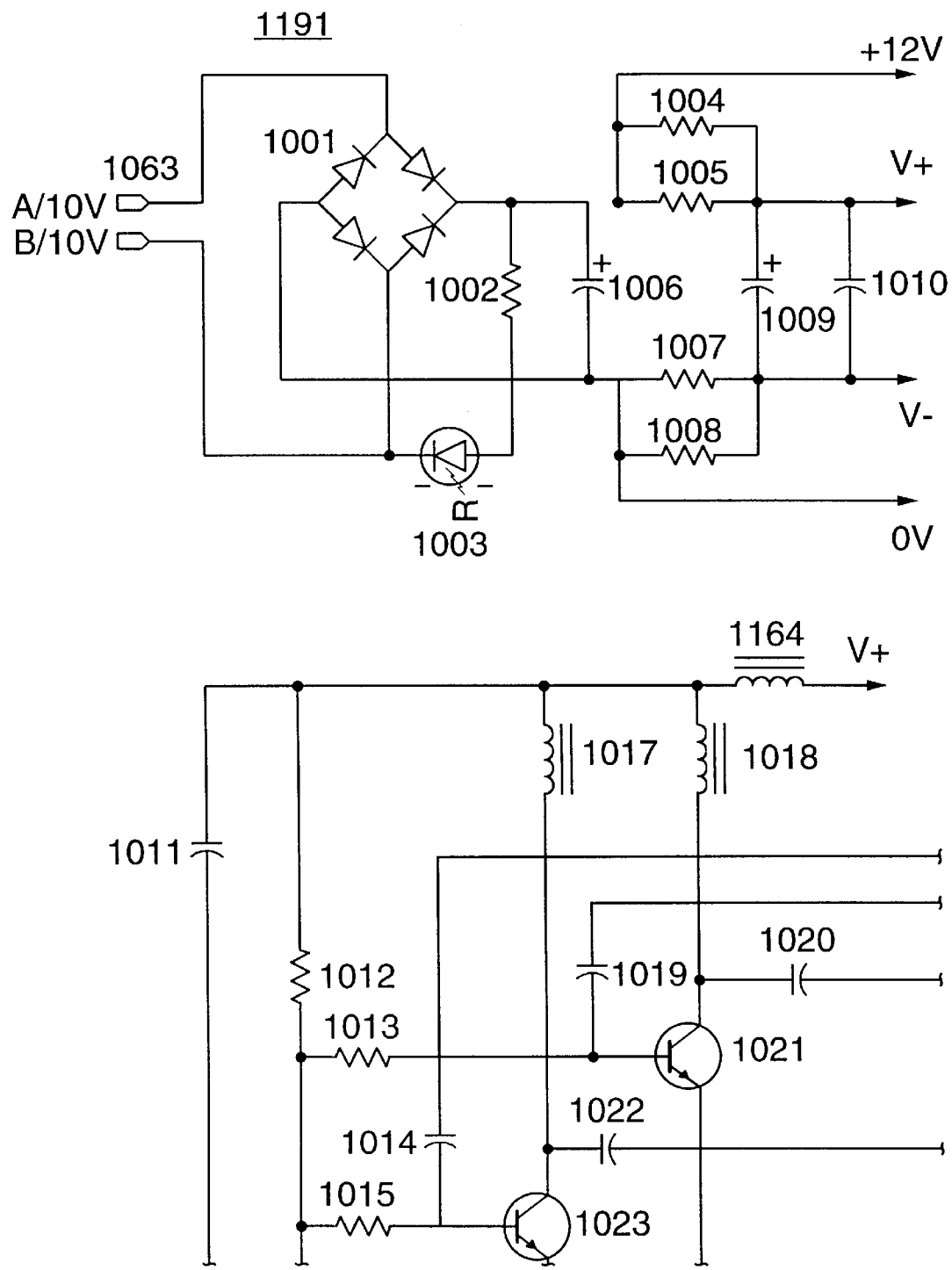
FIG. 41 represents a circuit diagram of a preferred embodiment of a Line Splitter subsystem according to the invention, said embodiment employing a local source of power.
Figure 41B:
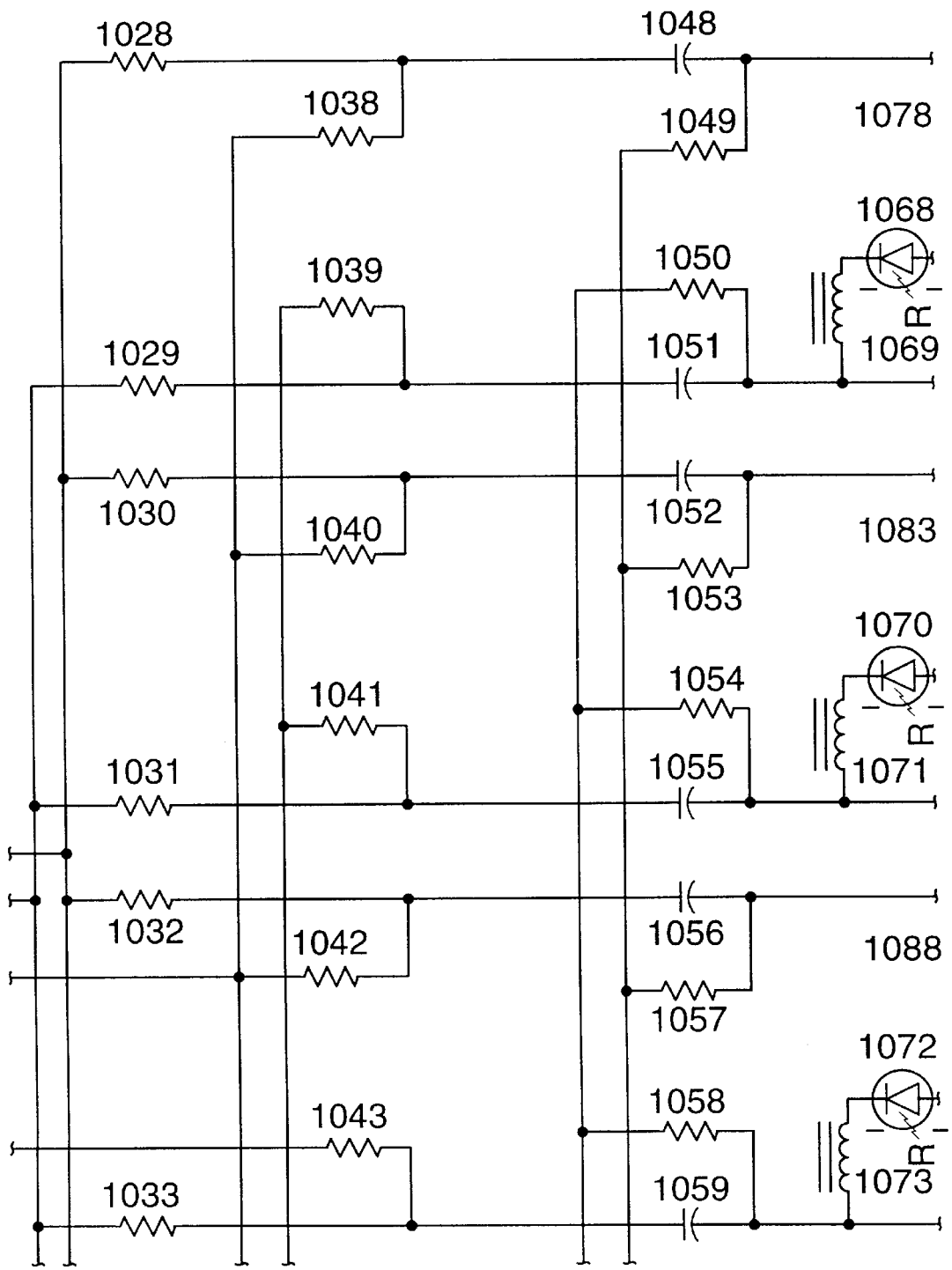
Figure 41C:
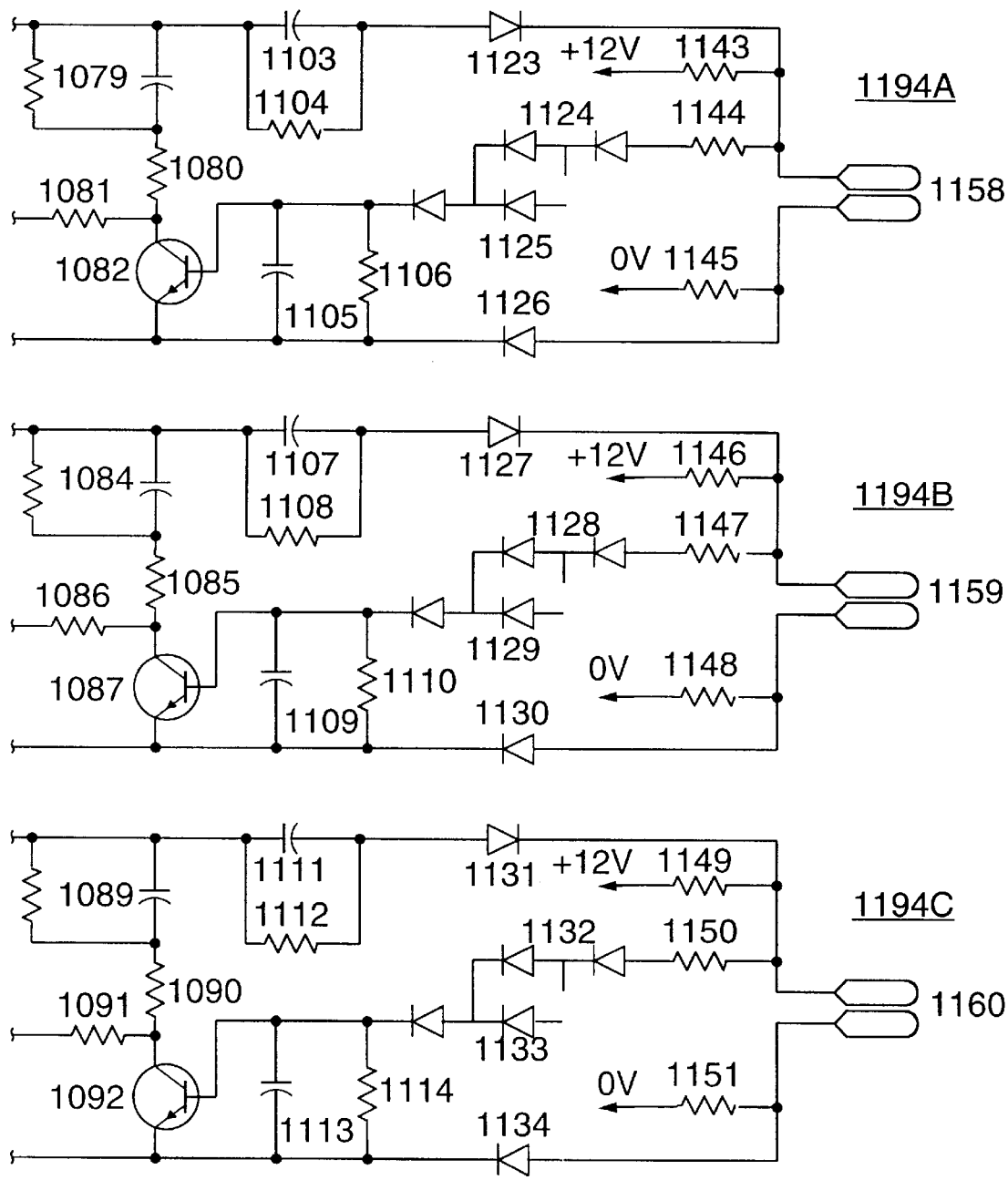
Figure 41D:
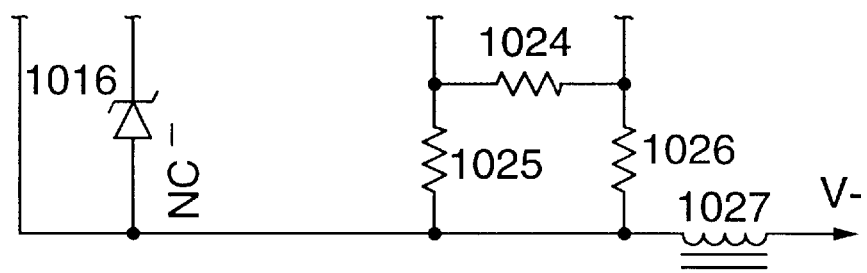
Figure 41E:
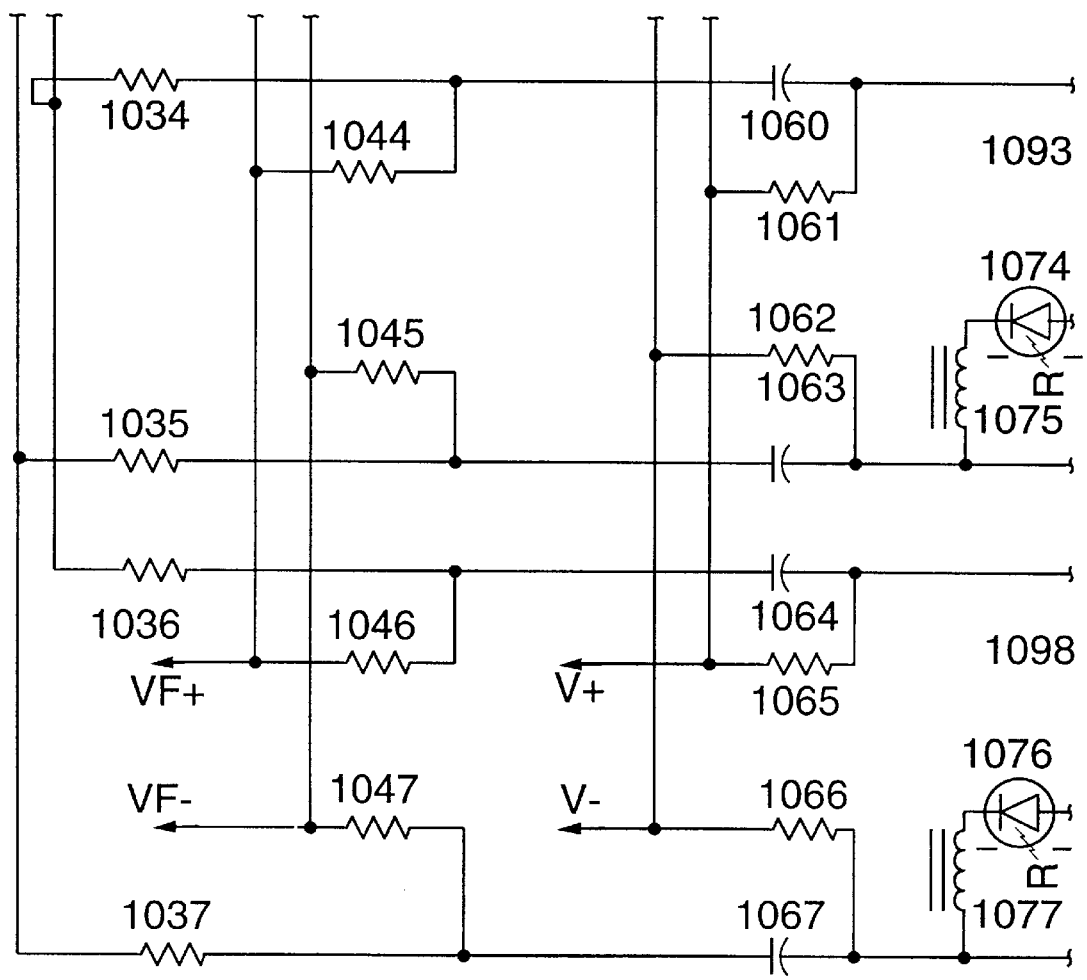
Figure 41F:
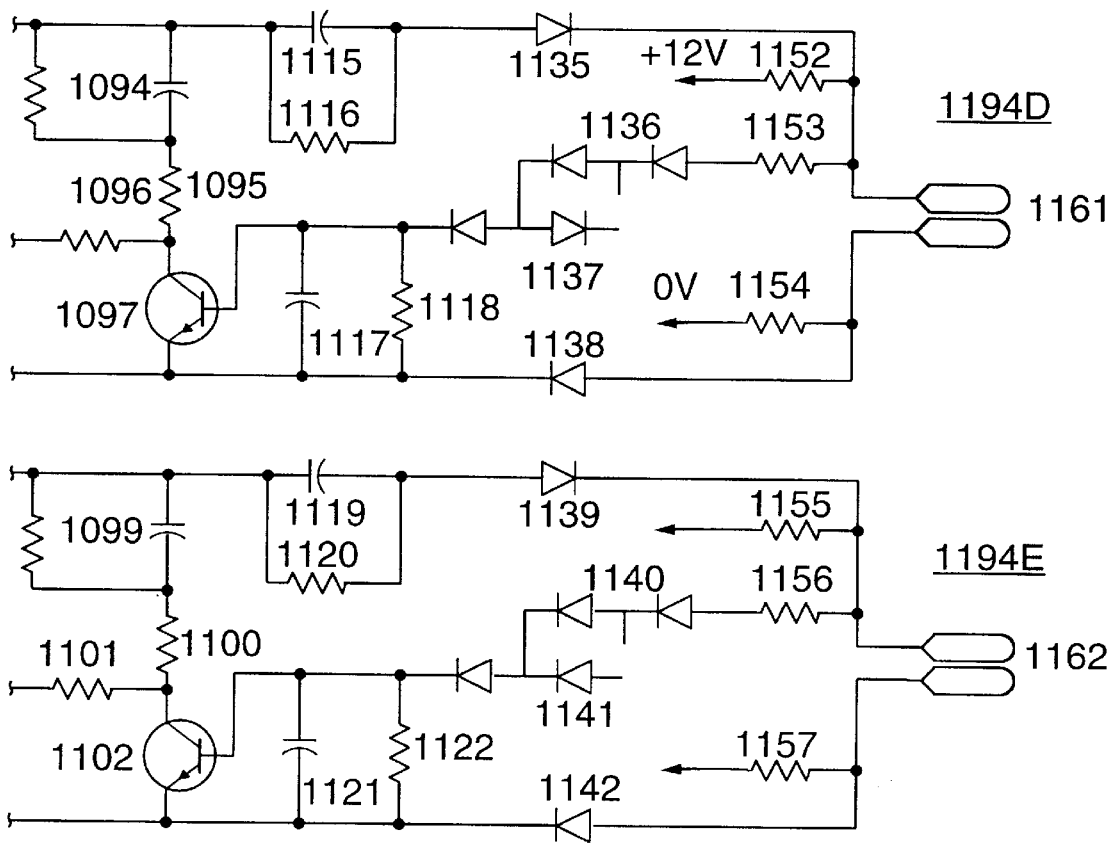

FIG. 39 represents a flow chart of the access control machine according to the invention; its operation is described below.

The Access Control Machine (ACM) determines when a station can transmit onto the network. The right to transmit passes from one station to the next by the use of a special packet called the token. After a station receives the token it may transmit data packets. When it is finished transmitting, the station must pass the token by sending it to the next station. The token passes from station to station to form a ring.

Each station knows the address of the station to which it should pass the token, called its successor or Next Station (NS), as well as the address of a master station (MS). When the station is finished transmitting it first tries to pass the token to its successor. Should this fail it passes the token to the master station. The master station is responsible for setting up and maintaining the logical ring.

The Access Control Machine has five main states 962–966. Some states have substates to allow for delays when interfacing to other state machines, but the substates serve only as a delays, not as separate control states. The external processor can force the ACM into three of the states: Offline 963, Idle 962 and Has Token 966. One aspect of this capability is to enable the processor to force the hardware into test modes where the station will listen for packets, but will not actively participate in the logical ring. Normally, all state transitions are handled entirely by the hardware.

The Offline state 963 is entered immediately following power up or upon demand from the processor. While in the Offline state packets are still received, but tokens are not accepted. The processor must choose whether to examine packets or to ignore them.

Should the processor decide to go online and begin accepting tokens, it can issue a command to move the ACM to the Idle state 962.

The Idle state 962 is the state where the station is listening to the medium but not transmitting.

When a (MAC control frame) token is received, the ACM can move to the Has Token state 966. If the station is the master node, the ACM can also move to the Has Token state if the processor issues the Claim Token command. This is necessary to start the token rotating when the ring is first initialized or when the token becomes lost.

Should the processor decide to go offline, it can issue a command to move the ACM to the Offline state 963. If this command is issued when the ACM is in a state other than Idle or Offline, the ACM will wait until it returns to the Idle state to go offline.

The Has Token state 966 is entered upon receiving a Token (or if the station is the master, a claim token command from the processor). This is the state in which the node can send data frames.

Upon entering the Has Token state, the ACM informs the processor of token arrival and calculates how many packets it may transmit on this occasion. Said number of packets is stored in a counter which is decremented each time a packet is sent. The ACM stops transmitting once there are no more packets to send, or when said packet counter has decremented to zero, whichever occurs first.

To comply with the access protocol, the processor is responsible for prioritizing the outgoing packets. When it is finished with high priority packets, the processor can send low priority packets as long as the packet counter has not decremented to zero.

When the ACM finds no more packets in the transmit buffer or the counter has decremented to zero, it transitions to the Pass Token state 965, unless it is contending for an address assignment (and thus has not yet joined the logical ring), in which case it returns to Idle 962.

The Pass Token state 965 is the state in which the station sends out a special packet to give permission to another station to transmit on the network. This is also the state in which the node determines whether to increment, decrement or leave unaltered the bid counter. After passing the token, the station always enters the Check Token Pass state 964.

The Check Token Pass state 964 is the state in which the station listens to the network to determine if the successor station appears to have accepted the token. The station waits for the lines to settle (to eliminate reflections) and checks for carrier to see if activity is occurring on the network that is originating from another station.

If, after waiting, the successor station is not transmitting, the ACM increments a Token Pass Fail counter. It then transitions back to the Pass Token state 965 if the counter has not yet reached token_pass_fail_limit. If the counter has reached this limit, the ACM checks the first_pass_failed bit. If this bit is not set, the ACM sets the bit so that the Pass Token state will send the token to the second successor station. It then resets the Token Pass Fail counter and transitions to the Pass Token state. If the bit is already set, it transitions to the Offline state 963.

If the station decides that its successor has accepted the token, it clears the Token Pass Fail counter and transitions to the Idle state 962.

FIG. 40

This figure provides a block diagram of a preferred embodiment of the Line Splitter subsystem according to the invention. Its operation is described below:

This particular embodiment is powered by a local power source 1191 and therefore is not required to extract power from the wire pairs used to conduct the digital signals. DC power to the internal modules is distributed by bus AB. Digital signals from the Hub subsystem 31 or from a Device subsystem 33 is received and buffered by one of several identical Analog Front End sections 1194*a–e*. Said received signal is then passed to Amplifier section 1193. After amplification, said signal is redistributed over bus CD to each individual Analog Front End section 1194*a–e* from where it is transmitted over the external twisted pair wiring. FIG. 41

This figure provides a circuit diagram of a locally powered Line Splitter subsystem; its operation is described below:

The operation of each Analog Front End section 1194*a–e* is identical and may be described in terms of both its AC and DC characteristics during both open-loop and closed-loop conditions. Section 1194*a* will be used as the example.

When the circuit is properly terminated, a low impedance DC path is present across connector 1158. A DC path from V+ to V− is created via resistors 1049, 1050 & 1104 and diodes 1123 & 1126. The combined resistance of this path is 480Ω. In this mode, transistor 1082 is turned off, permitting current to flow through LED 1068 via resistors 1078, 1080 & 1081 and inductor 1069. Said current switches on LED 1068 to provide visual confirmation of a correct termination. Inductor 1069 presents a high impedance to AC, thereby preventing the desired signal from being diverted down this path.

When the circuit is unterminated at connector 1158, a DC potential is presented by resistors 1143 & 1145 to the gate of transistor 1082 by RC network 1144, 1106 & 1105, thereby turning on transistor 1082. Said transistor closes the DC loop formed by resistors 1049, 1078, 1080 & 1050, thereby providing automatic termination for the circuit. LED 1068 is turned off to indicate that no external termination is present. Diodes 1124 & 1125 provide protection against interfernce from stray potentials present on the floating connector 1158. The potential supplied by resistors 1143 & 1145 also serves to reverse-bias diodes 1123 & 1126, thereby ensuring that no stray AC path can exist.

When the circuit is properly terminated at connector 1158, an AC path is created via capacitors 1048, 1103 & 1051 and diodes 1123 & 1126.

When the circuit is unterminated, an AC path is provided by capacitors 1048, 1079 & 1051, resistor 1080 and transistor 1082. The value of resistor 1080 is chosen to present the desired termination impedance of 100Ω.

The AC signal present across capacitors 1048 & 1051 is presented to the input of differential amplifier section 1193 via resistors 1028 & 1029 and capacitors 1014 & 1019. Said amplifier provides positive feedback of said input signals, delivering its output via capacitors 1020 & 1022 to resistors 1038 & 1039 in each AFE. The gain of the differential amplifier formed by transistors 1021 & 1023 is controlled by resistor 1024, which in this embodiment is set to 75Ω. Inductors 1027 & 1164 prevent the AC signal from entering the power supply section and hence from being radiated over the AC connection cord.

DC power for the subsystem is supplied by full-wave rectifier 1001 and smoothed by the RC network 1004–1010. LED 1003 provides positive confirmation that power is available; the current that it draws is limited by resistor 1002. Low voltage AC input power is supplied at connector 1063.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

We claim:

1. A method of transmitting multimedia digital signals originating from and being received by a plurality of signal nodes over a network having a plurality of transceiver stations, comprising a first plurality of sending stations and a second plurality of receiving stations connected via twisted pair wiring, said method comprising:

a) feeding input digital signals selected from the group consisting of voice fax, video and data from said signal nodes;

b) controlling allocation of bandwidth to said input digital signals as between said sending stations;

c) providing a source data stream in binary format derived from said allocated input digital signals;

d) converting said source data streams into a digital symbol stream capable of being transmitted over said wiring;

e) driving and filtering said digital symbol stream over said wiring;

f) splitting said filtered digital symbol stream into a plurality of replicated digital symbol streams;

g) amplifying and selecting each of said plurality of replicated digital symbol streams to provide an amplified and selected digital symbol stream;

h) converting said amplified and selected digital symbol stream into a sink data stream in binary format;

i) identifying and selecting desired digital signals of said sink data stream for said plurality of said receiving stations; and j) delivering said identified and selected digital signals to said signal nodes, said method further comprising subjecting one or more of said replicated digital symbol streams to a further replication process as defined by step (f).

2. A method as defined in claim 1 further comprising the repetition of claim 1 step (f) a finite number of times.

3. A method as defined in claim 2 wherein said replicated digital symbol stream is fed directly to said further step (f).

4. A method as defined in claim 1 wherein said splitting said filtered digital symbol stream into a plurality of replicated digital symbol streams of step (f) comprises:

a) feeding a first input digital signal at a selected first voltage and power to an amplifier;

b) amplifying said first input digital signal to a second voltage and power;

c) splitting said amplified digital signal to provide said plurality of replicated digital symbol streams at a third voltage and power; and d) feeding each of said replicated digital symbol streams to an output line.

5. A method as defined in claim 4 wherein each of said replicated digital symbol streams has substantially the same output voltage and power.

6. A method as defined in claim 4 wherein said first voltage and power is substantially the same as said third voltage and power.

7. A method as defined in claim 4 wherein said amplification is effected by feeding said input signals at a selected voltage to an amplifier and feedback resistor, said feedback resistor having a preset resistance value substantially equal to the combined parallel resistance of said input and said output lines carrying said input and output signals, respectively.

8. A method as defined in claim 4 wherein said amplification is effected by feeding said input signals at a selected voltage to an amplifier and feedback resistor, said feedback resistor having a preset resistance value of about 20% greater than the combined parallel resistance of said input and said output lines carrying said input and output signals, respectively, said value of resistor providing protection from unstable operation under failure conditions.

9. A method as defined in claim 1 wherein each of said filtered and said replicated digital symbol streams are conducted along coaxial cable.

10. A method as defined in claim 1 wherein said splitting said filtered digital symbol stream into a plurality of replicated digital symbol streams of step (f) comprises:
   a) feeding said input digital signal at said selected voltage and power to the primary coil of a transformer;
   b) providing said transformer with a secondary coil possessing a centre-tap;
   c) feeding the signal derived from each half of said secondary coil to an output transformer; and
   d) feeding an output digital signal derived from each of said output transformers to an output line.

11. A method as defined in claim 10 further comprising repeating the method as defined in claim 11 to further split said output digital signals comprising:
   a) feeding said output digital signal at a selected second voltage and power to the primary coil of a second transformer having a secondary coil possessing a centre-tap;
   b) feeding the signal derived from each half of said secondary coil to an output transformer; and
   c) feeding an output digital signal derived from each of said output transformers to an output line.

12. A method as defined in claim 1 wherein each of said digital, said filtered and said replicated digital symbol streams of steps (e), (f) and (g), respectively, is transmitted at high symbol rate and wherein said transceiver stations share a common bandwidth.

13. A method as defined in claim 12 wherein each of said transceiver stations can receive a wide dynamic range of signal amplitudes.

14. A method as defined in claim 12 wherein each of said transceiver stations can transmit and receive a wide range of signal bandwidths.

15. A method as defined in claim 12 further comprising squelching of noise signals received by each of said transceiver stations.

16. A method as defined in claim 12 wherein said digital signals are composed of packets of different symbol rates.

17. A method as defined in claim 12 further comprising compensating for variations in received packet amplitudes.

18. A method as defined in claim 12 further comprising the support of full duplex transmission.

19. A method as defined in claim 1 wherein said conversion of said source data stream into said digital symbol stream capable of being transmitted over said wiring of step (d), comprises:
   a) synchronizing said symbol stream to a clock source;
   b) encoding said data stream according to a pre-selected algorithm; and
   c) looping back said symbol stream for diagnostic purposes.

20. A method as defined in claim 19 wherein said symbol streams comprise data packets originating from a plurality of data sending stations.

21. A method as defined in claim 19 wherein said symbol streams comprise data packets having distinct symbol rates.

22. A method as defined in claim 19 wherein said encoding and decoding is effected with a plurality of said encoding and decoding algorithms.

23. A method as defined in claim 1 wherein said conversion of said amplified and selected symbol stream received over twisted pair wiring into a sink data stream in binary format of step (m), comprises:
   a) detecting presence of activity in said symbol stream;
   b) generating a clock rate from said symbol stream;
   c) aligning sampling frequency and phase with said symbol stream; and
   d) decoding said symbol stream into a binary format according to a predefined algorithm.

24. A method as defined in claim 1 wherein said conversion of said source data stream into a digital symbol stream capable of being transmitted over said wiring of step (d) and said conversion of said digital symbol stream received over twisted pair wiring into a sink data stream in binary format of step (h), comprises:
   a) synchronizing said symbol stream to a clock source;
   b) encoding said data stream according to a pre-selected algorithm;
   c) looping back said symbol stream for diagnostic purposes;
   d) detecting presence of activity in said symbol stream;
   e) generating a clock rate from said symbol stream;
   f) aligning sampling frequency and phase with said symbol stream; and
   g) decoding said symbol stream into a binary format according to a pre-defined algorithm.

25. A method as defined in claim 1 wherein said splitting said filtered digital symbol stream into a plurality of replicated digital symbol streams of claim 1 step (f) comprises:
   a) amplifying and selecting said filtered digital symbol stream to provide an amplified digital symbol stream;
   b) regenerating said amplified digital symbol stream to provide a regenerated digital symbol stream;
   c) splitting said regenerated symbol stream into a plurality of replicated digital symbol streams; and
   d) driving and filtering said replicated digital symbol stream over said wiring.

26. A method as defined in claim 25 wherein said regenerating said amplified digital symbol stream of step (b) comprises:
   a) recovering a clock signal from said digital symbol stream;
   b) sampling said data stream to acquire the original data content; and
   c) generating a digital symbol stream from said original data content.

27. A method as defined in claim 25 further comprising regenerating a plurality of digital symbol streams from a plurality of sending stations.

28. A method as defined in claim 1 wherein said transceiver stations are arranged into a plurality of logical transceiver groups.

29. A method as defined in claim 28 wherein said plurality of logical transceiver groups is an integer selected from 1 through 16.

30. A method as defined in claim 1 wherein said plurality of replicated digital symbol streams is an integer selected from 1 through 16.

31. A method as defined in claim 1 further comprising applying arbitration to limit the number of said replicated digital symbol streams regenerated simultaneously.

32. A method as defined in claim 1 further comprising providing a minimum guaranteed bandwidth and a maximum guaranteed response time to each of said sending stations.

33. A method as defined in claim 32 further comprising detecting the addition or removal from said network of said sending and said receiving stations.

34. A method as defined in claim 32 further comprising negotiating the provision of additional guaranteed bandwidth to said sending stations.

35. A method as defined in claim 32 further comprising allocating unreserved bandwidth to said sending stations.

36. A network for transmitting multimedia digital signals originating from and being received by a plurality of signal nodes, said network having a plurality of transceivers stations, comprising a first plurality of sending means and a second plurality of receiving means connected via twisted pair wiring, said network comprising:
   (a) circuitry constructed and adapted to feed input signals selected from the group consisting of voice, fax, video and data from said sending stations along said wiring;
   (b) circuitry constructed and adapted to control allocation of bandwidth to said digital signals as between said sending stations;
   (c) circuitry constructed and adapted to provide a source data stream in binary format derived from said allocated input digital signals;
   (d) circuitry constructed and adapted to convert said source data stream into a digital symbol stream capable of being transmitted over said wiring;
   (e) circuitry constructed and adapted to drive and filter said digital symbol stream over said wiring;
   (f) circuitry constructed and adapted to split said filtered digital symbol stream into a plurality of replicated digital symbol streams;
   (g) circuitry constructed and adapted to amplify and select each of said plurality of replicated digital symbol streams to provide an amplified and selected digital symbol stream;
   (h) circuitry constructed and adapted to convert said amplified and selected digital symbol stream into a sink data stream in binary format;
   (i) circuitry constructed and adapted to identify and select desired digital signals of said sink data stream for said plurality of said receiving stations; and
   (j) circuitry constructed and adapted to deliver said identified and selected digital signals to said signal nodes, said network further comprising means for subjecting one or more of said replicated digital symbol streams to a further replication process as defined by step (f).

37. A network as defined in claim 36 further comprising circuitry for the repetition of step (f) a finite number of times.

38. A network as defined in claim 37 comprising circuitry for feeding said replicated digital symbol stream directly to said circuitry (f).

39. A network as defined in claim 36 wherein said circuitry (f) for splitting said filtered digital symbol stream into a plurality of replicated digital symbol streams comprises:
   a) circuitry constructed and adapted to feed a first digital input signal at a selected first voltage and power to an amplifier;
   b) circuitry constructed and adapted to amplify said first input digital signal to a second voltage;
   c) circuitry constructed and adapted to split said amplified digital signal to provide said plurality of split output replicated digital signal streams at a third voltage and power; and
   d) circuitry constructed and adapted to feed each of said replicated digital symbol streams to an output line.

40. A network as defined in claim 39 comprising circuitry to provide each of said split output digital signal streams with substantially the same output voltage and power.

41. A network as defined in claim 39 comprising circuitry to provide said first voltage and power to be substantially the same as said third voltage and power.

42. A network as defined in claim 39 wherein said amplification circuitry (b) is effected by circuitry for feeding said input signal at a selected first voltage to an amplifier and feedback resistor, said feedback resistor having a preset resistance value substantially equal to the combined parallel resistance of said input and said output lines.

43. A network as defined in claim 39 wherein said amplification circuitry (b) is effected by circuitry for feeding said input signal at a selected first voltage to an amplifier and feedback resistor, said feedback resistor having a preset resistance value of about 20% greater than the combined parallel resistance of said input and said output lines, said value of resistor providing protection from unstable operation under failure conditions.

44. A network as defined in claim 36 comprising circuitry to conduct each of said filtered and said replicated digital signals along coaxial cable.

45. A network as defined in claim 36 wherein said circuitry (f) for splitting said filtered digital symbol stream into a plurality of replicated digital symbol streams comprises:
   a) circuitry constructed and adapted to feed said input digital signal at said selected first voltage and power to the primary coil of a transformer;
   b) circuitry constructed and adapted to provide said transformer with a secondary coil possessing a centre-tap;
   c) circuitry constructed and adapted to feed the signal derived from each half of said secondary coil to an output transformer; and
   d) circuitry constructed and adapted to feed an output digital signal derived from each of said output transformers to an output line.

46. A network as defined in claim 45 further comprising repeating said circuitry (f) to further split said output digital signals comprising:
   a) circuitry constructed and adapted to feed said output digital signal at a selected second voltage and power to the primary coil of a second transformer having a secondary coil possessing a centre-tap;
   b) circuitry constructed and adapted to feed the signal derived from each half of said secondary coil to an output transformer; and
   c) circuitry constructed and adapted to feed an output digital signal derived from each of said output transformers to an output line.

47. A network as defined in claim 36 comprising circuitry for transmitting each of said digital, said filtered and said replicated digital symbol streams at high symbol rate and wherein said transceiver stations share a common bandwidth.

48. A network as defined in claim 47 wherein each of said transceiver stations can receive a wide dynamic range of signal amplitudes.

49. A network as defined in claim 47 wherein each of said transceiver stations can transmit and receive a wide range of signal bandwidths.

50. A network as defined in claim 47 further comprising circuitry constructed and adapted to squelch noise signals received by each of said transceiver stations.

51. A network as defined in claim 47 comprising circuitry constructed and adapted to provide said digital signals composed of packets of different symbol rates.

52. A network as defined in claim 47 further comprising circuitry constructed and adapted to compensate for variations in received packet amplitudes.

53. A network as defined in claim 47 further comprising circuitry constructed and adapted to support full duplex transmission.

54. A network as defined in claim 36 wherein circuitry (d) for converting said source data stream into a digital symbol stream capable of being transmitted over said wiring, comprises:
 a) circuitry constructed and adapted to synchronize said symbol stream to clock source;
 b) circuitry constructed and adapted to encode said data stream according to a pre-selected algorithm; and
 c) circuitry constructed and adapted to loop back said symbol stream for diagnostic purposes.

55. A network as defined in claim 54 comprising circuitry constructed and adapted to provide said symbol streams data packets originating from a plurality of data sending stations.

56. A network as defined in claim 54 comprising circuitry constructed and adapted to provide said symbol streams in data packets having distinct symbol rates.

57. A network as defined in claim 54 wherein said encoding and decoding circuitry comprises a plurality of said encoding and decoding algorithms.

58. A network as defined in claim 36 wherein said circuitry (m) for converting amplified and selected said digital symbol stream received over twisted pair wiring into a sink data stream in binary format, comprises:
 a) circuitry constructed and adapted to detect the presence of activity in said symbol stream;
 b) circuitry constructed and adapted to generate a clock rate from said symbol stream;
 c) circuitry constructed and adapted to align sampling frequency and phase with said symbol stream; and
 d) circuitry constructed and adapted to decode said symbol stream into a binary format according to a pre-defined algorithm.

59. A network as defined in claim 36 wherein said circuitry (d) for converting said source data stream into a digital symbol stream capable of being transmitted over said wiring and said circuitry (h) for converting said digital symbol stream received over twisted pair wiring into a sink data stream in binary format, comprises:
 a) circuitry constructed and adapted to synchronize said symbol stream to clock source;
 b) circuitry constructed and adapted to encode said data stream according to a pre-selected algorithm;
 c) circuitry constructed and adapted to loop back said symbol stream for diagnostic purposes;
 d) circuitry constructed and adapted to detect presence of activity in said symbol stream;
 e) circuitry constructed and adapted to generate a clock rate from said symbol stream;
 f) circuitry constructed and adapted to align sampling frequency and phase with said symbol stream; and
 g) circuitry constructed and adapted to decode said symbol stream into a binary format according to a pre-defined algorithm.

60. A network as defined in claim 59 comprising circuitry constructed and adapted to digitally align sampling frequency and phase.

61. A network as defined in claim 36 wherein circuitry (f) comprises:
 a) circuitry constructed and adapted to amplify and select said plurality of replicated digital symbol streams to provide a first amplified and selected digital symbol stream;
 b) circuitry constructed and adapted to regenerate one of said first amplified and selected digital symbol streams to provide an enhanced replicated digital symbol stream to extend transmission wiring distance;
 c) circuitry constructed and adapted to split said enhanced replicated digital symbol stream into a plurality of replicated enhanced replicated digital symbol streams; and
 d) circuitry constructed and adapted to drive and filter said enhanced replicated digital symbol stream over said wiring.

62. A network as defined in claim 61 wherein circuitry (b) comprises:
 a) circuitry constructed and adapted to recover a clock signal from said digital symbol stream;
 b) circuitry constructed and adapted to sample said data stream to acquire the original data content; and
 c) circuitry constructed and adapted to generate a digital symbol stream from said original data content.

63. A network as defined in claim 61 comprising circuitry constructed and adapted to regenerate a plurality of digital symbol streams from a plurality of sending stations.

64. A network as defined in claim 36 wherein said transceiver stations are arranged into a plurality of logical transceiver groups.

65. A network as defined in claim 64 wherein said plurality of logical transceiver groups is an integer selected from 1 through 16.

66. A network as defined in claim 36 wherein said circuitry (f) comprises circuitry constructed and adapted to provide an integer selected from 1 through 16 of said plurality of replicated digital symbol output streams.

67. A network as defined in claim 36 comprising circuitry constructed and adapted to apply arbitration to limit the number of said replicated digital symbol streams regenerated simultaneously.

68. A network as defined in claim 36 further comprising circuitry constructed and adapted to provide a minimum guaranteed bandwidth and a maximum guaranteed response time to each of said sending stations.

69. A network as defined in claim 68 further comprising circuitry constructed and adapted to detect the addition or removal from said network of said sending and said receiving stations.

70. A network as defined in claim 68 further comprising circuitry constructed and adapted to negotiate the provision of additional guaranteed bandwidth to said sending stations.

71. A network as defined in claim 68 further comprising circuitry constructed and adapted to allocate unreserved bandwidth to said sending stations.

* * * * *